US006972786B1

(12) United States Patent  (10) Patent No.: US 6,972,786 B1
Ludwig  (45) Date of Patent: Dec. 6, 2005

(54) MULTIMEDIA SERVICES USING CENTRAL OFFICE

(75) Inventor: Lester F. Ludwig, Hillsborough, CA (US)

(73) Assignee: Collaboration Properties, Inc., Redwood Shores, CA (US)

( * ) Notice: Subject to any disclaimer, the term of this patent is extended or adjusted under 35 U.S.C. 154(b) by 0 days.

(21) Appl. No.: 09/471,577

(22) Filed: Dec. 23, 1999

Related U.S. Application Data

(63) Continuation of application No. 08/842,745, filed on Apr. 16, 1997, now Pat. No. 6,081,291, which is a continuation of application No. 08/367,976, filed on Dec. 30, 1994, now Pat. No. 5,751,338.

(51) Int. Cl.⁷ .............................................. H04N 7/14
(52) U.S. Cl. ............................... 348/14.11; 348/14.07; 348/14.13
(58) Field of Search ........................ 348/14.01, 14.02, 348/14.08, 14.09, 14.1, 14.11, 14.07; 379/93.14, 379/93.21, 202, 114.2, 93.2, 202.01; 725/132, 725/106; 370/260–265; 715/753; 709/204

(56) References Cited

U.S. PATENT DOCUMENTS

| | | | |
|---|---|---|---|
| 3,456,206 A | 7/1969 | Kwarytiroff | 330/32 |
| 3,519,744 A | 7/1970 | Dorros et al. | 348/15 |
| 3,530,251 A | 9/1970 | Miyawaki | 348/17 |
| 3,568,100 A | 3/1971 | Tarbos | 333/18 |
| 3,701,849 A | 10/1972 | Stapleton | 348/16 |
| 3,723,653 A | 3/1973 | Tatsuzawa | 348/17 |
| 3,873,771 A | 3/1975 | Kleinerman et al. | 370/204 |
| 3,974,337 A | 8/1976 | Tatsuzawa | 348/17 |
| 4,005,265 A | 1/1977 | Verhoeckx et al. | 358/145 |
| 4,054,910 A | 10/1977 | Chou et al. | 358/86 |
| 4,084,181 A | 4/1978 | Mita et al. | 358/12 |
| 4,210,927 A | 7/1980 | Yumde et al. | 358/12 |
| 4,273,963 A | 6/1981 | Seidel | 379/398 |
| 4,441,180 A | 4/1984 | Schussler | 359/123 |
| 4,650,929 A | 3/1987 | Boerger et al. | 358/86 |
| 4,686,698 A | 8/1987 | Tompkins et al. | 379/53 |
| 4,710,917 A | 12/1987 | Tompkins et al. | 370/62 |

(Continued)

FOREIGN PATENT DOCUMENTS

DE            350715 2        3/1922

(Continued)

OTHER PUBLICATIONS

Transactions of the Institute of Electronics, Information and Communication Engineers of Japan, vol. E74, No. 9, Sep. 1991, Tokyo, Japan pp. 2696-2702.

(Continued)

*Primary Examiner*—George Eng
(74) *Attorney, Agent, or Firm*—Sughrue Mion, PLLC

(57) ABSTRACT

A system for providing video communication services to one or more premises with video communications-services users, comprising a first premises network, a plurality of user workstations interconnected by the first premises network, and a multimedia central office being in communication with the first premise network and a public digital network. The multimedia central office, in use, transceives audio, video and digital data signals for providing at least switching functions originating at or destined for at least one user workstation, to and from the first premises network to provide video communications services. The central office further is coupled to at least one other workstation, not associated with the first premises network, and is configured to combine captured video images, of at least three users including an image from a workstation in the first premises network and an image from a workstation not in the first premises network, into a mosaic image for reproduction at a workstation of at least one user.

39 Claims, 36 Drawing Sheets

U.S. PATENT DOCUMENTS

| | | |
|---|---|---|
| 4,716,585 A | 12/1987 | Tompkins et al. .......... 370/202 |
| 4,752,940 A | 6/1988 | Graham ........................ 375/10 |
| 4,760,442 A | 7/1988 | O'Connell et al. ........... 358/86 |
| 4,800,344 A | 1/1989 | Graham ....................... 333/25 |
| 4,847,829 A | 7/1989 | Tompkins et al. ............ 370/62 |
| 5,010,399 A | 4/1991 | Goodman et al. ............ 358/85 |
| 5,014,267 A | 5/1991 | Tompkins et al. ............ 370/62 |
| 5,065,396 A | 11/1991 | Castellano et al. ........... 370/84 |
| 5,067,018 A | 11/1991 | Sakamoto et al. .......... 348/469 |
| 5,130,793 A | 7/1992 | Bordry et al. ................ 358/86 |
| 5,136,575 A | 8/1992 | Kuroda ........................ 370/30 |
| 5,187,571 A | 2/1993 | Braun et al. .................. 358/85 |
| 5,247,347 A | 9/1993 | Litteral et al. ................ 358/85 |
| 5,247,351 A | 9/1993 | Cho ............................ 358/11 |
| 5,257,306 A | 10/1993 | Watanabe .................... 348/15 |
| 5,283,637 A | 2/1994 | Goolcharan .................. 348/17 |
| 5,347,305 A | 9/1994 | Bush et al. ................... 348/14 |
| 5,374,952 A * | 12/1994 | Flohr ...................... 348/14.08 |
| 5,375,068 A | 12/1994 | Palmer et al. ............... 364/514 |
| 5,382,972 A * | 1/1995 | Kannes .................... 348/14.01 |
| 5,410,343 A | 4/1995 | Coddington et al. .......... 348/12 |
| 5,440,551 A | 8/1995 | Suzuki ........................ 370/60 |
| 5,446,491 A * | 8/1995 | Shibata et al. ........... 348/14.09 |
| 5,467,212 A | 11/1995 | Huber ........................ 359/168 |
| 5,473,363 A * | 12/1995 | Ng et al. .................... 379/202 |
| 5,473,679 A | 12/1995 | La Porta et al. ............ 379/220 |
| 5,490,247 A | 2/1996 | Tung et al. ................. 395/162 |
| 5,491,508 A * | 2/1996 | Friedell et al. .......... 348/14.11 |
| 5,504,808 A * | 4/1996 | Hamrick, Jr. ............ 379/114.2 |
| 5,512,937 A | 4/1996 | Beierle ........................ 348/14 |
| 5,528,281 A | 6/1996 | Grady et al. .................... 348/7 |
| 5,528,286 A | 6/1996 | Goolcharan .................. 348/19 |
| 5,534,914 A | 7/1996 | Flohr et al. ................... 348/15 |
| 5,555,017 A * | 9/1996 | Landante et al. ........ 348/14.09 |
| 5,555,118 A | 9/1996 | Huber ........................ 359/125 |
| 5,555,244 A | 9/1996 | Gupta et al. ................ 370/397 |
| 5,557,442 A | 9/1996 | Huber ........................ 359/179 |
| 5,563,882 A | 10/1996 | Bruno et al. ................ 370/260 |
| 5,566,179 A | 10/1996 | Kobayashi et al. ......... 370/396 |
| 5,572,347 A * | 11/1996 | Burton et al. ................. 398/71 |
| 5,579,143 A | 11/1996 | Huber ........................ 359/130 |
| 5,617,539 A | 4/1997 | Ludwig et al. ............... 348/12 |
| 5,635,979 A * | 6/1997 | Kostreski et al. ........... 725/132 |
| 5,751,338 A * | 5/1998 | Ludwig, Jr. .............. 348/14.11 |
| 6,081,291 A * | 6/2000 | Ludwig, Jr. .............. 348/14.11 |

FOREIGN PATENT DOCUMENTS

| | | |
|---|---|---|
| EP | A 0 244260 | 11/1987 |
| EP | A 352210 | 1/1990 |
| EP | A 0 354370 | 2/1990 |
| EP | A 0 497022 | 8/1992 |
| EP | A 0 617560 | 9/1994 |
| FR | A 0 352210 | 1/1990 |
| GB | A 2282506 | 4/1995 |
| GB | A 2287611 | 9/1995 |
| JP | A 05 268585 | 1/1994 |
| WO | WO 95/13680 A1 | 5/1995 |
| WO | WO 95/34167 A1 | 12/1995 |

OTHER PUBLICATIONS

Proc. of the 1st International Workshop on Community Networking—Integrated Multimedia Services to the Home—Jul. 13-14, 1994, San Francisco (US), pp. 203-209.
AT&T Visual Solutions Multipoint Control Unit. Product Literature. 1993.
Chinon America, Inc., Chinon CX-062, Miniature Micro Color CCTV Board Camera. Product Literature, Apr. 1994.
Commique!. Insoft, Inc. Product Literature.
Article, Infoworld, "Up-Start Insoft Storms Conferencing." Dated Oct. 10, 1994.
Insoft Shared application Resource Environment—Share. Product Literature.
Insoft Opendve. Your Software Development Bridge for Building Collaborative. Fully-Interperable Multimedia Applications. Product Literature.
For-A Company Limited. Operation Manual. Multi-Viewer MV-400 (1st Edition—Rev. 2).
For-A Company Limited. MV-40D Multi Viewer. Product Literature.
For-A Company Limited. MV-40C Multi Viewer. Product Literature.
Lightwave Systems, Inc., Communication Systems. Installation Guide Series 4000 Stanalone Twisted Pair Video System. STD.
Maxim Integrated Products. Excerpt from Engineering Journal. "New Amplifiers Simply Wideband Techniques". Date Unknown.
Maxim Integrated Products. Wideband Transconductance Amplifiers. Max435/Max436. Product Literature. 0042. Rev. 1, Apr. 1993.
Network Video Technologies. NVT Quality Video Over Ordinary Telephone Wire Rackmount Video Transceiver System. Product Literature.
Nuts Technologies. Connect 918., P. 3.15 Desktop Videoconferencing Report and P 3.16 Applied Business Telecommunications. Product Literature.
Picturetel. M-7000 Multipoint Bridge and Control System. Simultaneous. Interactive Videoconferencing Among Three to Sixteen Locatins. Product Literature.
Picturetel Corporation. Article. Multilocation Teamwork is the Key to Success in the Competitive 90s.
Tut Systems. Ethernet or 10Baset. Over one pair Wire. Product Literature.
Tut Systems. Article Tut Transceivers Target Telcos. ATM. by Reinhardt Krause, Journal Unknown. Date Unknown.
Videoserver, Inc. Videoserver Series 2000 MCU. Product Literature.
Videoserver, Inc., Videoserver Series 2000 Conference Scheduling and Reservation Application. Product Literature.
Data Communications, Videoconferencing. Mix-And-Match Videoconferencing, Startup's MCU Allows Videoconferences Among Sites Using Different Vendors' Codecs Aug. 1992.
Videoserver, Inc., Videoserver Series 2000 Multipoint Control Unit. Product Backgrounder. The New Standard for Multipoint Conferencing. Product Literature.
Ameritech Bridged Video Service Press Release. Oct. 11, 1994.
AT&T Accunet Switched Digital Services. Data Networking User Guide. Communications Concert, Jan. 1991.
AT&T Worldwork Network Services. Product Literature.
MCI Telecommunications Corporation. Product Literature.
MFS Communications Company, Inc., Business Plan.
Pacific Bell. A Pacific Telesis Company. "Affordable Multipoint Videoconferencing is Real. California . . . " Product Literature. Oct. 1994.
"Fiber Net to Link Video Production Units: 50 Facilities . . . " Photonics Spectra. Nov. 1991.
"Merrill Tests Video: Brokage Uses Video-Conferencing System Based on Wiltel DS-3 Fiber-Network Service", Communications Week, Apr. 8, 1991. P. *.

Chang, Chen and Messerschmitt. "Video Compositng in the DCT Domain", IEEE Workshop on Visual Signal Processing and Communications. Sep. 1992. pp 138-143.

Lei, Chen and Sun. "Video Bridging Based on H.261 Standard", IEEE Transactions on Circuits and Systems for Video Technology. vol. 4, No. 4, Aug. 1994.

Ludwig. Frontiers in Computer Commnunications Technology. "A Threaded/Flow Approach to Reconfigurable Distributed Systems & Service Primitives Architectures" ACM Sigom 1987.

Ludwig & Dunn. Frontiers in Computer Communications Technoogy "Laboratory for Emulation and Study of Integrated and Coordinated Media Communication" ACM Sigcomm Aug. 1987.

Electronic Engineering Times. A CMP Publication. Issue 821. DSP Kicks ATM onto voice lines, Oct. 31, 1994.

San Jose Mercury News. "New System Locates Site of Gunshots". Nov. 1994 and Redwood City to Install High-Tech Gunfire Sensor.

Yun & Messerschmitt "On Architectures for Video Compositing", Dept. of Electrical Eng. & computer Sciences. Multimedia Systems 1994.

Boyer & Lukacs. The Personal Presence System—A Wide Area Network Resource for the Real Tim Composition of Multipoint Multimedia Communications. ACM Multimedia. Oct. 1994.

Lukacs. "The Personal Presence System—Hardware Architecture." ACM Multimedia Oct. 1994.

Press Release Broadband Technologies, Inc., Dec. 6, 1994.

PC Wook, You May Be Ready Foro ATM, But It isn't Ready For You. Sep. 5, 199_.

The Wall Street Journal. Ameritech Sets Charge of $2.25 Billion for Old Equipment: Loss is Seen for Year. p. A4, Nov. 29, 1994.

Datapoint Corp., News Release, "Datapoint Introduces New Line of Network Video Communications Products". Feb. 15, 1994.

AT&T Multimedia Communicator Dataport 2001, Product Literature.

CLI, Multipoint 2/2M Controllers, Product Literature.

Bell Laboratories, Bell Laboratories Record, Picturephone, pp. 137-141, May/Jun. 1969.

Lake & Pate, A Networrk Environment for Studying Multimedia Network Architecture and Control, 1989.

Ludwig, L.F., Integrating of CAD/CAE with Multimedia Teleconferencing and Messaging Via Broadband Networks and Shared Resource Servers, Bellcore, Undated.

Javelin, Video Transmission System, J411, Product Literature.

Televideo, Instructions, Product Literature.

Network World, "AT&T Looks to Extend Mail APIs with Voice, Fax, Video", p. 6, Oct. 10, 1994.

IM & Werner, Bandwidth-Efficient Digital Transmission up to 155 MB/S Over Unshielded Twisted Pair Wiring, ICC 1993.

Klein, P. "Telekommunikation Von Angesichtzu Angesicht", Siemens AG, 2323 Telecom Report, No. 5, Sep./Okt. 1986, Erlangen, W. Germany.

Ramanathan, Rangan, Vin, & Kappner, "Optimal Communication Architectures for Multiconferencing in Distributed Systems", Proceedings of the 12th International Conference on Distributed Computing Systems, Jun. 9-12, 1992.

Maeno, Sakata, Ohmori, Watabe & Fukuoka "Distributed Desktop Conferencing System (Mermaid) Based on Group Communication Architecture" IEICE Transactions, vol. E74 Sep. 1991.

Weiss, C., "Desk Top Video Conferencing—An Important Feature of Future Visual Communications", Proceedings of IEEE International Conference on Communications.

Audio Engineering Handbook, K. Blair Benson, Ed., McGraw-Hill, 1998, Sect. 4.6.

Satellite Source, Mastermind, Product Advertisement.

Article, "Instant Network Rides On Phone Lines", Electronic Design, Aug. 6, 1987.

Sheets, W. & Graf, R. "Build This . . . Carrier Current Receiver", Radio Electronics Feb., 1989.

Sheets, W. & Graf, R., "Building This . . . Carrier Current Audio Transmitter", Radio Electronics, Jan. 1989.

Teleconcepts, Inc., "Teleconcepts . . . Introduces the "Just Plug It In" Intercom System", Product Literature.

Windmaster Manufacturing, Remote Extender, Owner's Manual, Product Literature.

"A Derring-Do Attitude Propels Wiltel . . . And Creative Expansion", Williams Telecommunications Group Inc. Industry Highlights, Steve Polilli, Apr. 1992.

An Examiner's Search Report in Patent Application No. GB 9520848.4.

Commercial Database Record Including the Patent Family for EP 606837.

* cited by examiner

MULTIMEDIA SERVICES USING CENTRAL OFFICE

RELATED CASES

This is a continuation of U.S. application Ser. No. 08/842,745 filed Apr. 16, 1997 now U.S. Pat. No. 6,081,291, which is a continuation of Ser. No. 08/367,976 filed Dec. 30, 1994, now U.S. Pat. No. 5,751,338.

FIELD

The present invention relates to methods and systems for providing multimedia telecommunications, and more particularly, to methods and systems for providing multimedia telecommunications using existing public telephone system infrastructure and desktop computers.

BACKGROUND

Presently, the cost of both wideband digital transport and interfacing equipment is a deterrent to the widespread usage of multimedia services for collaboration and other business functions. One component of the cost is the tariffs for digital carriers provided by common carriers. Common carriers include public telephone networks registered, regulated, and/or authorized to provide publicly tariffed telecommunication services.

Common carriers discount digital bandwidth according to the amount of bandwidth on a particular digital carrier. Presently, wide-area subscription rates for Fractional T-1 rates typically break even at about half the rate of a full T-1 and rates for eight T-1 carriers typically match that of a T-3 carrier providing approximately 30 times the bandwidth of a single T-1.

The reason for this 2:1 to 4:1 discounting is that bulk bandwidth delivery and wide-area transport employs less common carrier equipment, management, and control than delivery of the same amount of bandwidth in smaller, unbundled parcels. For a telecommunications concern outside the common carriers, private networks can be made far more cost effective if their design leverages these economies of scale in bandwidth purchases from the common carriers.

The transmission of quality audio and video signals to a multimedia workstation at a user premises is essential in providing multimedia services. In practice, satisfactory quality NTSC/PAL/SECAM video and medium fidelity audio can be transmitted relatively inexpensively through an unshielded twisted pair (UTP) link using analog signals.

Methods and systems of transmitting continuous motion (25–30 frames/second) analog video signals over unshielded twisted pair links range from the AT&T Picturephone of the late 1960's to the disclosure in U.S. Pat. No. 5,283,637 to Goolcharan. However, as the distance of the UTP increases beyond an upper limit, typically beyond approximately 2500 feet, crosstalk and attenuation increase very rapidly. This effect is more pronounced for smaller gauge wires (e.g. 26 gauge) than for larger gauge wires (e.g. 20 or 19 gauge).

Typically, an existing public telephone loop plant, i.e. the access portion of a public telephone network which connects a user premises with a first public telephone building, contains UTP having one or more gauge changes at several junctures. Moreover, the length of the UTP between end locations is often much larger than the physical distance between the locations (a factor of 3.5 is not unusual). At longer UTP loop lengths, the multiple junctures and gauge changes combine to create an uneven high-frequency response.

FIG. 1 illustrates the frequency response of a passive UTP metallic loop without bridge taps between two buildings, each separated from a public telephone central office by approximately 1000 feet. This UTP loop involves a 7100 foot wire length with multiple gauge changes. In this example, the frequency response exhibits significant peaks and notches around 1 MHz. In general, the large notches and peaks which result complicate the compensation for the rapid attenuation at high frequencies.

One approach to this problem is to convert the video to a digital signal for transmission over the UTP. Such an approach requires the steps of converting the video to a digital form, compressing the digital form of the video, and transmitting the compressed digital video over the UTP at bit rates whose analog spectra (dictated by pulse shape) is within the bounds of the UTP. Standard state-machine pulse coding and pulse wave-shaping (such as alternate mark inversion) are typically used to reduce the power spectrum only to multiples of the bit rate of approximately 1.5 (i.e., 1 Mbps can be transmitted over a 1.5 MHz baseband bandwidth). Consequently, even at distances of 2500 feet, digital transmission attain only about 3–4 Mbps. As a result, significant compression and cost is required to utilize digital signals for transmitting video over the UTP. Although not as costly or confining as 128–384 kbps Fractional T-carrier channels, deployment of codecs compressing two-way, high-quality, full-motion video and audio to 3–4 Mbps at each desktop is costly and problematic.

SUMMARY OF THE INVENTION

It is an object of the present invention to deliver immediate low-cost, wide-area access of multimedia services to multimedia workstations using unshielded twisted pair links within an existing telephone loop plant.

A further object is to reduce the cost of wide-area, wideband digital transport in a system for providing multimedia services to multimedia workstations utilizing desktop computers.

In carrying out the above objects, the present invention provides a system for providing multimedia telecommunication services to a plurality of multimedia workstations. The system comprises a multimedia central office which includes a digital switch complex coupled to a public digital telephone network, and at least one twisted pair transceiver coupled to at least one twisted pair link in a telephone loop plant. The multimedia central office further includes at least one switch complex operatively associated with the digital switch and the at least one twisted pair transceiver. The multimedia central office transceives a first plurality of signals with a first at least one of the multimedia workstations interfaced to the public digital telephone network, and transceives a second plurality of signals with a second at least one of the multimedia workstations interfaced to the at least one twisted pair link in the telephone loop plant. The first plurality and the second plurality of signals each include audio signals, video signals, and digital data signals used for providing the multimedia telecommunication services.

Embodiments of the present invention provide a network approach for immediate, low-cost deployment of advanced multimedia telecommunications services using current technology. In particular, embodiments of the present invention are advantageously capable of utilizing low-cost technologies such as analog audio/video hardware, telephone loop twisted pair, and existing LAN technologies to provide the multimedia telecommunication services. By utilizing the unshielded twisted pair in the telephone loop plant, embodiments of the present invention do not require the deployment of new ATM and fiber optic systems, which may take a number of years before widespread availability and a full, mature implementation is attained. Consequently, global infrastructure investments in telephone loop plants retain much of their value by being capable of providing advanced multimedia telecommunication services. Further, embodiments of the present invention are capable of supporting advanced multimedia services in a flexible manner so that ATM and fiber optic systems may be utilized when economical.

Embodiments of the present invention are capable of delivering low-cost, high-quality video-capable multimedia services including: (i) real-time collaboration services, such as desktop teleconferencing, window sharing, and full-application sharing; (ii) multimedia messaging services, such as multimedia mail and video mail; (iii) access to multimedia information repositories, such as on-line catalogs and video news clippings; (iv) directory services; and (v) gateways to third-party networks, such as a public telephone network and the Internet.

These and other features, aspects, and advantages of the present invention will become better understood with regard to the following description, appended claims, and accompanying drawings.

BEST MODE FOR CARRYING OUT THE INVENTION

Figure 1:
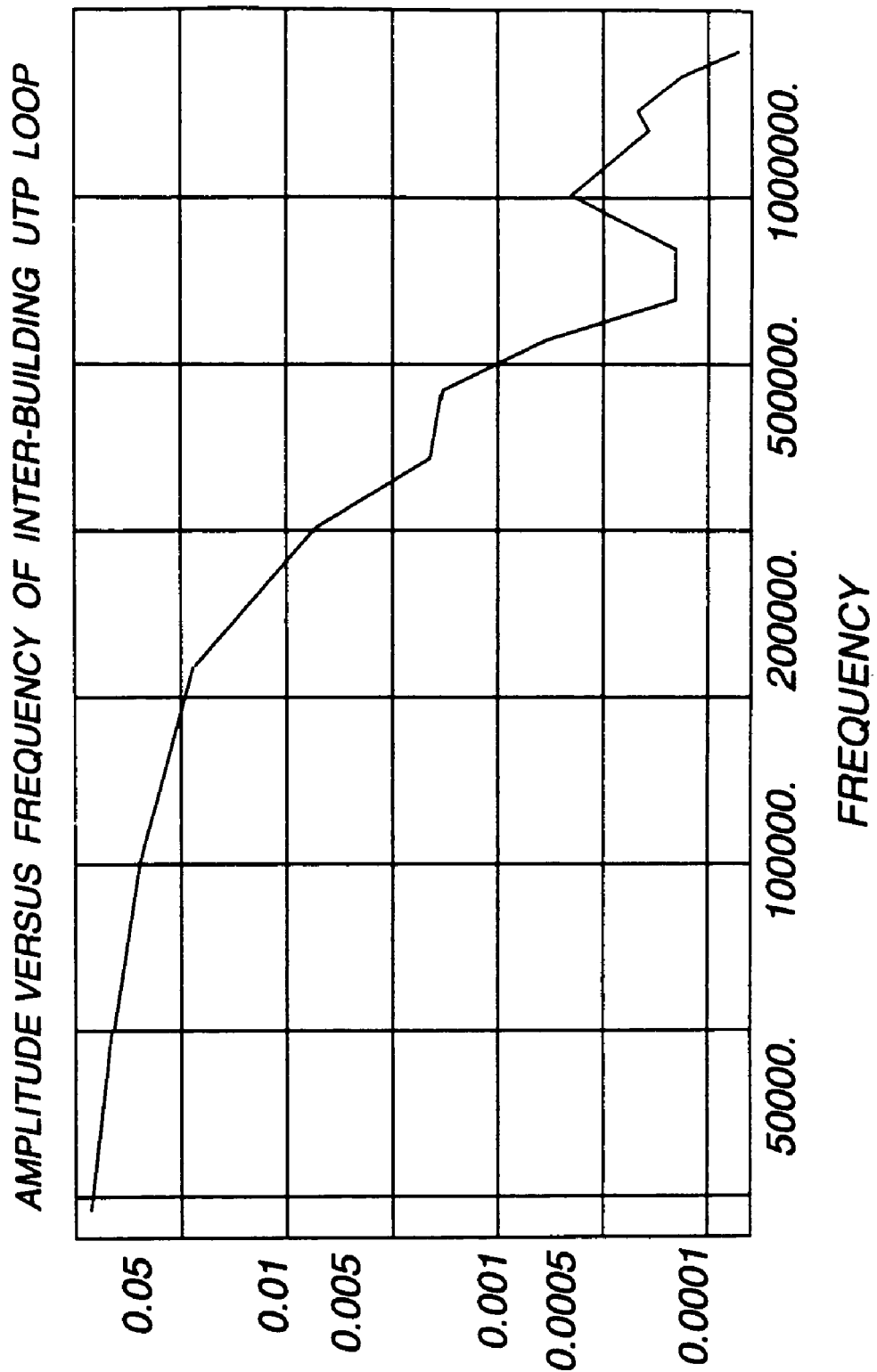
FIG. 1 is a graph of a frequency response of a UTP loop plant.
Figure 2:
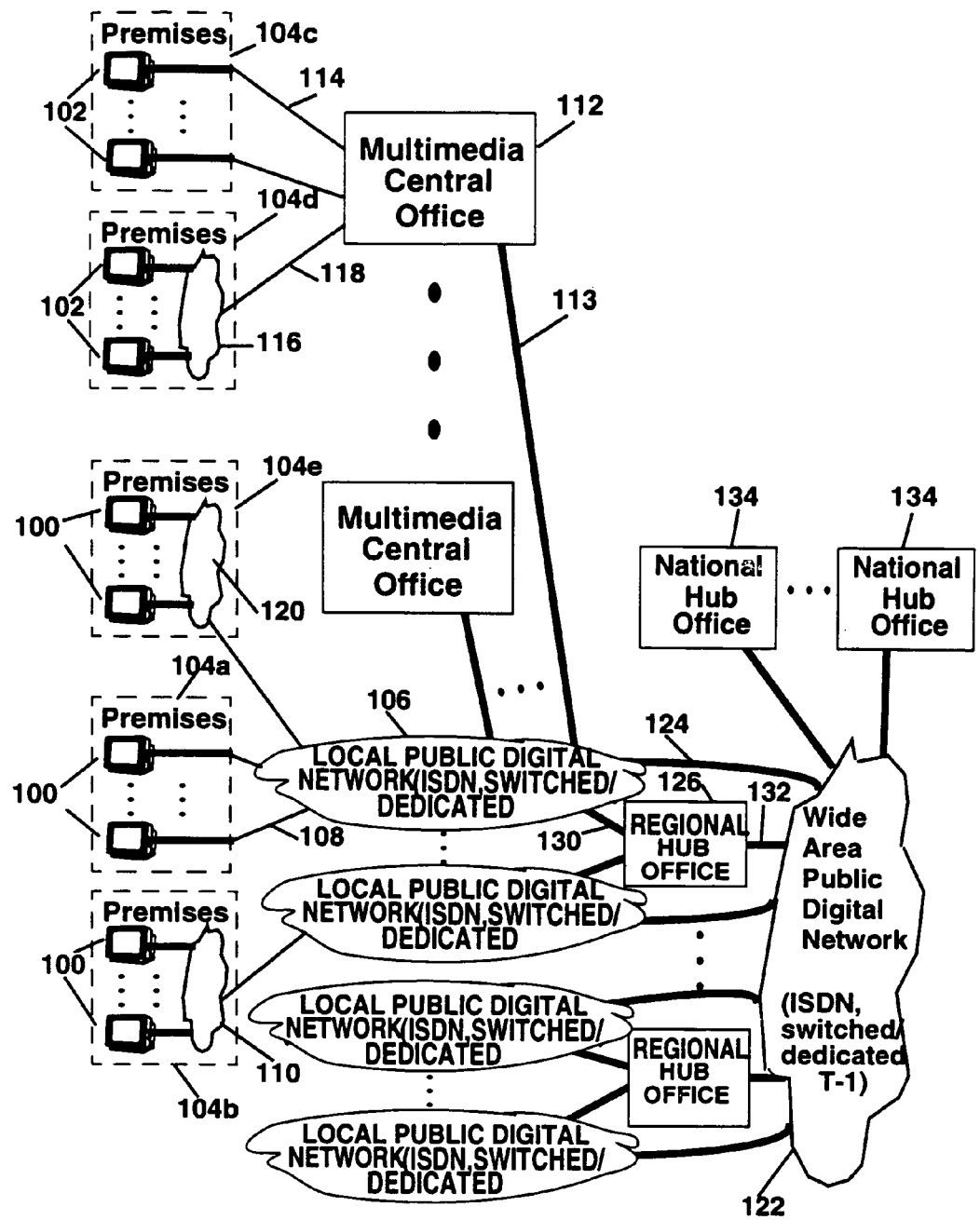
FIG. 2 is a block diagram of an embodiment of a multimedia telecommunication system in accordance with the present invention.

A block diagram of an embodiment of a multimedia telecommunication system in accordance with the present invention is illustrated in FIG. 2. The multimedia telecommunication system is capable of functioning with two types of multimedia workstations or equivalent room-based systems. A first type of multimedia workstation, indicated by reference numeral 100, is one capable of interfacing with a standardized network interface traditionally used in a public digital telephone network. Examples of standardized network interfacing protocols include, but are not limited to, T-1, T-3, ISDN, SONET, X.21, and X.25. A multimedia workstation interface capable of connection to a standardized network interface is herein referred to as a traditional network interface (TNI).

A second type of multimedia workstation, indicated by reference numeral 102, is one having an interface which is not currently supported by the public digital telephone network. A multimedia workstation interface according to this second type is herein referred to as a nontraditional network interface (NTNI). NTNIs are typically designed based upon the particular workstation rather than the public digital network.

The workstations 100 and 102 are illustrated as being located within one of a plurality of user premises 104a–104e. Five different types of user premises are described for the purpose of illustration. The user premise 104a includes one or more workstations each having a TNI. The workstations in the user premise 104a are directly connected to a local public digital network 106 by means of a conventional digital carrier 108.

The user premise 104b includes one or more workstations, each having a TNI, coupled to an internal premise communication system 110. The internal premise communication system 110 communicates with the workstations via TNI, and provides for sharing of access to the local public digital network 106 via TNI. An example is an ISDN PBX or corporate Fractional T-carrier cross-connect switch.

The user premise 104c includes one or more workstations each having an NTNI. These workstations communicate with the local public digital network 106 via a multimedia central office 112 using conventional twisted pair 114 existing within a telephone loop plant. The multimedia central office 112 employs the same NTNI as the workstations coupled thereto. The local public digital network 106 is coupled to the multimedia central office 112 by means of a digital carrier 113 which employs a TNI.

The user premise 104d includes one or more workstations, each having an NTNI, coupled to an internal premises communications system 116. The internal premises communication system 116 communicates with the workstations via an NTNI. Preferably, the internal premises communication system is capable of providing both interconnection and resource sharing functions, such as the sharing of public network access to the multimedia central office 112, using NTNI used to communicate with the workstations. An embodiment of such an internal premises communication system is described in copending U.S. application Ser. No. 08/131,523.

The user premise 104e includes one or more workstations, each having NTNI, coupled to an internal premises communications system 120. The internal premises communications system 120 includes a system for converting NTNI signals to TNI signals. As a result, the internal premises communications system 120 is coupled to the local public digital network 106 via a TNI such as ISDN or a T-carrier. An embodiment of such an internal premises communication system is described in copending U.S. application Ser. No. 08/131,523.

Other types of premises may be realized based upon a combination of the attributes of the above-described premises 104a–104e. For example, for a premise with all workstations or rooms using NTNI, some parts of the public network access may be done via NTNI and other parts via TNI. Moreover, for a premise with some workstations using NTNI and other workstations using TNI, some parts of the public network access may be provided by a multimedia central office via NTNI and other parts by a public local digital network via TNI. Many other combinations are apparent to those having ordinary skill in the art.

The embodiments described thus far illustrate how workstations or rooms may access both a multimedia central office and a local public digital network regardless of whether NTNI or TNI is used for public network access. This results from the use of the digital carrier 113 which links the multimedia central office 112 and the local public digital network 106. A number of multimedia services can be provided by the multimedia central office 112 (and other network offices to be described), as is discussed later.

Access can be provided to a wide area public digital network 122, representative of one or more arbitrary public networks, using many approaches. In a first approach, the local public digital network 106 is linked to the wide area public digital network 122 by means of a digital carrier 124.

In a second approach, the local public digital network is linked to a regional hub office 126 by a first digital carrier 130. The regional hub office 126 is linked to the wide area public digital network by a second digital carrier 132. The regional hub office 126 is capable of providing networking, topology, and/or services functions not provided by the direct digital carrier link 124. For example, the regional hub office 126 may be capable of switching and transmission concentration for the dedicated lines used as the digital carriers with the multimedia central offices. Further, the regional hub office 126 may be capable of directly providing a number of multimedia services. Also, the regional hub office 126 may act as a strategic location for geographically-sensitive functions such as video messaging storage and conference bridge servers. In addition, regional hub offices may be used as gateways to international wide-area telecommunications services.

The use of a regional hub office in a multimedia telecommunications system in accordance with the present invention is optional. Practically, the use of a regional hub office is dictated by the selected features which are to be provided and economics of a particular implementation.

Selected features and economics of an overall implementation of a multimedia telecommunications system may be served by utilizing one or more national hub offices 134 linked to the wide area public digital network. The national hub offices 134 may provide switching and transmission concentration for any dedicated lines used as digital carriers with the regional hub offices or the multimedia central offices. Further, the national hub offices 134 may directly provide some multimedia services, or act as strategic locations for geographically-sensitive functions.

A political nation, i.e. a country, served by embodiments of the multimedia telecommunications system may have zero, one, or a plurality of national hub offices. A plurality of national hub offices may be redundantly employed in a single political nation for the purpose of providing improved reliability of service. National offices can also be used to provide gateways to international wide-area telecommunication services.

The use of regional hub offices and national hub offices allows for a non-common carrier operator of an embodiment of the present invention to implement a multimedia telecommunication system as a private switched network formed from dedicated digital carrier services offered by a common carrier. More specifically, the non-common carrier operator would interconnect the workstations by means of: (i) switched digital carrier services connecting the premises to a multimedia central office; (ii) dedicated lines among one another in a full or partial mesh topology; and (iii) dedicated lines linking multimedia central offices and TNI premises with regional hub offices and national hub offices. It is noted that a common-carrier operator of an embodiment of the present invention need not implement explicit regional or national offices.

In practice, embodiments of the multimedia telecommunications system include one or more multimedia central offices which provide NTNI access to nearby users as well as network-based multimedia services and reduced-cost transport. Typically, a plurality of multimedia central offices are employed, wherein the multimedia central offices are networked together by means of a conventional common carrier service, or by alternative means such as line-of-site microwave, spread-spectrum radio, satellite, or private fibre optic links. In such a network of multimedia central offices, there may be further value in including additional nodes in the network, namely, one or more of the regional hub offices and the national hub offices as described above.

Alternatively, one or more regional hub offices and national hub offices, optionally supplemented by one or more multimedia central offices, may be directly accessed by users using TNI digital carriers provided by a common carrier. This is beneficial in providing network-based multimedia services with a reduced transport cost but without requiring NTNI for access.

Each of the offices and the networking among them are now described. Architectural variations which may be advantageous for using LAN (local area network) switching hubs as real-time switches for packetized video and audio are presented, followed by network topology aspects.

Figure 3:
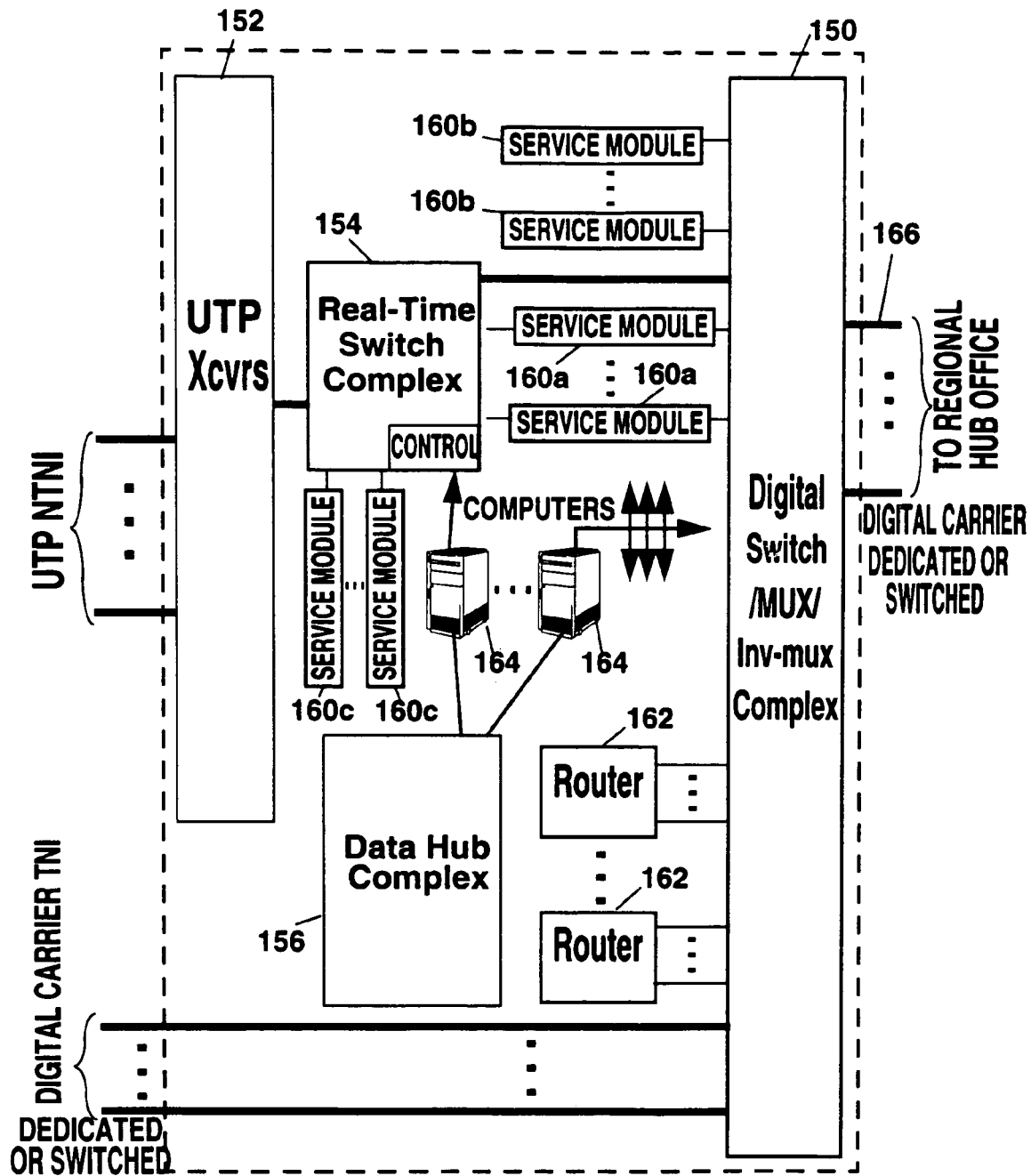
FIG. 3 is a block diagram of an embodiment of a multimedia central office in accordance with the present invention.

FIG. 3 is a block diagram of an embodiment of a multimedia central office in accordance with the present invention. The multimedia central office includes a digital switch complex 150 capable of performing multiplexing and inverse multiplexing functions. Users with TNI which employ switched or dedicated digital carriers to access the multimedia central office are connected directly to the digital switch complex 150.

The multimedia central office further includes one or more UTP transceivers 152, to which users with NTNI are connected via the UTP. The UTP transceivers 152 are capable of transceiving audio, video, and digital signals communicated between the UTP and the multimedia central office. Analog video and audio signals transceived by the UTP transceivers 152 are directed to a real-time switch complex 154. The real-time switch complex 154 may contain, for example, one or more analog switches, DS0 cross-connects, or switched LAN hubs (used in an effectively collisionless mode) therein. Data communication signals, such as Ethernet, in their original logical form are processed by the UTP transceivers 152 for application to a data hub complex 156.

In such an arrangement, various options for processing UTP-transceived signals are available. For example, a UTP carrying a converted V.35 signal or a converted RS-449 signal may be transceived by the UTP transceivers 152 and connected via the real-time switch complex 154. Here, the UTP transceivers 152 may optionally transform the converted signals back into the original V.35 or RS-449 format. In a second example, a UTP carrying a converted V.35 signal or a converted RS-449 signal may be transceived and transformed back into the original V.35 or RS-449 format by the UTP transceivers 152 for application to the digital switch complex 150.

The combination of the digital switch complex 150, the real-time switch complex 154, and the data hub complex 156 is used to route multimedia communications signals within the multimedia central office. The signal routing is used to provide for the interconnection of users attached to the multimedia central office, or as reachable through the digital carrier 113. Interconnection among users terminated on a common multimedia central office may be achieved as follows.

Interconnection of UTP NTNI users employing unlike NTNIs can be provided by the data hub complex 156 using service modules 160a–160c, coupled to either the real-time switch complex 154 or the digital switch complex 150, capable of performing the necessary conversions. In general, the service modules 160a–160c can provide any number of functions. For example, the service modules may be capable of performing video/audio codec functions, such as transforming between analog video/audio and V.35 or RS-449, or storage functions as may be used for video mail.

Interconnection of UTP NTNI users employing converted V.35 or RS-449 signals with TNI users can be provided by the digital switch complex 150. If the UTP transceivers 152 do not provide the transformations needed to present V.35 or RS-449 signals to the digital switch 150, then the signal is routed through an appropriate service module 160a, as available, via the real-time switch 154. Here, the services modules 160a perform the transformations between converted V.35 or RS-449 and true V.35 or RS-449. If the UTP transceivers 152 do provide the transformation, signals may pass directly from the UTP transceivers 152 to the digital switch complex 150 without the use of service modules.

The service modules 160a include those capable of performing compression or other signal conversion functions required by the service modules 160c. These service modules 160a are accessed by the service modules 160c using the real-time switch 154. This allows for shared use of a first pool of service modules 160a across a second pool of service modules 160c. For example, the service modules 160a may include shared video compression devices while the service modules 160c may include conference bridges and video storage servers. Here, the real-time switch 154 permits sharing of the compression devices for conferencing and storage functions.

In addition, accessing the service modules 160a using the real-time switch 154 supports implementation of complex feature combinations. For example, the service modules 160c may include a pool of K analog multi-point conference bridges while the service modules 160a include a pool of high-performance video codecs. The pool of video codecs includes M of a first type and N of a second type. The real-time switch 154 allows for sharing of these codecs across various ports of the conference bridge. This allows for support of extensive combinations of compression types and conference bridge ports while keeping the values of K, M, and N as small as possible.

The service modules 160b are capable of performing similar functions as the service modules 160c, but do not require signal conversion from the service modules 160a.

Embodiments of the multimedia central office may provide data stream networking wherein data streams are provided to the users to serve various purposes. These purposes include: (i) real-time control signaling for connection and services control; (ii) rapid file transfer of image files used in snapshot and application-sharing elements of real-time collaboration; (iii) real-time drawing and pointing commands used in snapshot and application-sharing elements of real-time collaboration; and (iv) general LAN interconnection.

To support data stream networking, the multimedia central office may be employed as follows. Any UTP NTNI user data streams which carry data communications signals in their original logical form are presented to the data hub complex 156 by the UTP transceivers 152. Any UTP NTNI user data streams which carry data communications signals converted to V.35, RS-449, or a similar interface are presented to data routers 162 with a corresponding V.35 interface, an RS-449 interface, or a similar interface via the digital switch complex 150. Any UTP NTNI user data streams which involve processing or action outside the multimedia central office accesses the digital switch complex 150 via the data routers 162 fitted with an appropriate interface, such as V.35 or RS-449. Any UTP TNI user data streams which involve processing or action within the multimedia central office are linked to the data routers 162 (fitted with appropriate interfaces) by means of connections within the digital switch complex 150. Effectively, these variations act to get all data communications into the data hub complex 156 and/or the data routers 162 as necessary.

The data hub complex 156 is coupled to one or more computers 164. It is usually advantageous for the computers 164 to be coupled to other elements within the multimedia central office, typically using either a serial or a parallel interface. The computers 164 may be employed to perform any of the following functions: (i) providing person-based directory services and routing services; (ii) providing resource-based directory services; (iii) providing resource allocation services; (iv) controlling the connections implemented by the digital switch complex 150 and the real-time switch complex 154; (v) controlling hardware systems within the service modules 160a–160c; (vi) implementing any computer-based service feature (such as call forwarding, person locator, and application sharing host); and (vii) administration, usage, and pre-billing processing functions.

In addition to providing interconnection of users terminated on the common multimedia central office, access may be provided as appropriate to one or more other multimedia central offices, a regional hub office, a national hub office, a public digital network, or a private network. Here, the digital switch complex 150 is coupled to these options via a dedicated or switched digital carrier 166. In some circumstances or embodiments, other means for communication, such as analog radio or satellite, may be used.

Figure 4:
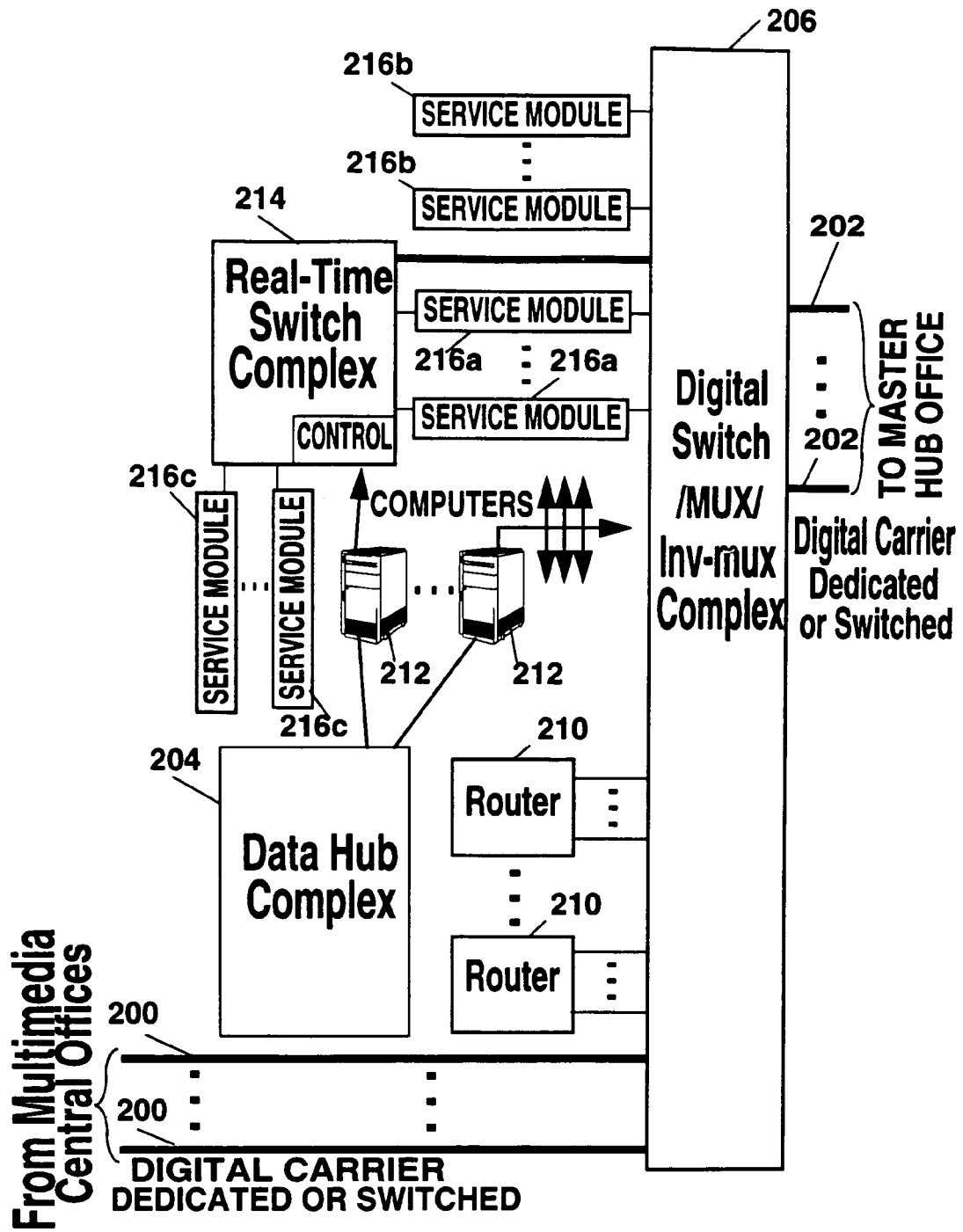
FIG. 4 is a block diagram of an embodiment of a regional hub office in accordance with the present invention.

FIG. 4 is a block diagram of an embodiment of a regional hub office in accordance with the present invention. This embodiment of the regional hub office may be viewed as a simplified version of the multimedia central office in that no UTP or digital carrier user access is supported.

The regional hub office is connected to one or more multimedia central offices via a dedicated or switched digital carrier 200. The regional hub office may optionally connect with one or more national hub offices, other regional hub offices, or other networks via a dedicated or switched digital carrier 202 connected to a wide area public digital network. In some circumstances, other means for communication, such as analog radio or satellite, may be used.

Data switching is performed by a data hub complex 204, which accesses the digital carriers 200 and 202 by switching within a digital switch complex 206 and data routers 210 fitted with appropriate interfaces such as V.35 or RS-449. The data hub complex 204 accesses one or more computers 212 for controlling the digital switch complex 206, any real time switch 214, and other elements of the regional hub office. The computers 212 control the switches 206 and 214, along with other elements of the regional hub office, by means of serial and parallel interfaces. The computers 212 may further provide the above-described functions for the computers 164 in the multimedia central office.

All through routed connections provided by the regional hub office are realized as point-to-point connections within the digital switch complex 206. For cases where the regional hub office provides other services (such as conferencing or video mail), the digital switch complex 206 dynamically connects the digital carriers 200 and 202 with service modules 216a–216c. The service modules 216a and 216b directly access the digital switch complex 206 while service modules 216c require access to service modules 216a via the real-time switch 214. For example, the service modules 216a may include shared video compression devices while the service modules 216c include conference bridges and video storage servers. Here, the real-time switch 214 permits sharing of the compressing devices. Although also true for real-time switches in multimedia central offices, it may be especially advantageous to implement the real-time switches as a backplane hosting service module cards.

The inclusion of the regional hub office in the multimedia telecommunication system may be based upon engineering and economic matters, which include: (i) improved utilization of bandwidth facilities by concentration of the demand; (ii) improved utilization of services resources by concentration of the demand; and (iii) improved reliability and rapid failure recovery by utilizing redundant backup systems. An improved utilization of many types of service resources and minimization of transport costs can result by locating some of the service resources at the regional hub offices.

Figure 5:
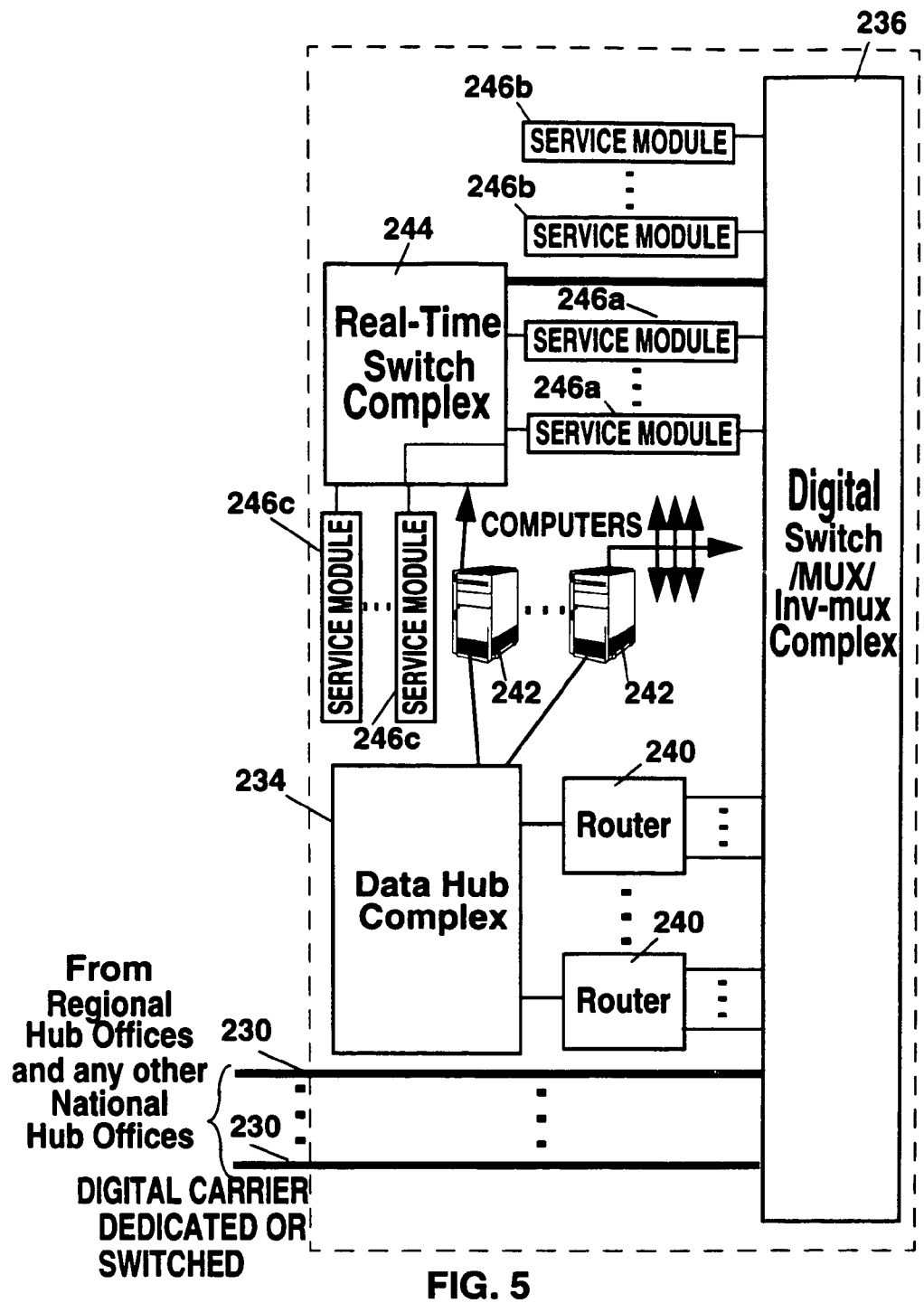
FIG. 5 is a block diagram of an embodiment of a national hub office in accordance with the present invention.

FIG. 5 is a block diagram of an embodiment of a national hub office in accordance with the present invention. The national hub office is connected to one or more regional hub offices and/or one or more multimedia central offices via a dedicated or switched digital carrier 230 connected to a wide area public digital network.

Data switching is performed by a data hub complex 234, which accesses the digital carrier 230 by switching within a digital switch complex 236 and data routers 240 fitted with an appropriate interface such as V.35 or RS-449. The data hub complex 234 accesses one or more computers 242 for controlling the digital switch complex 236 and a real time switch 244. The computers 242 control the switches 236 and 244, along with other elements of the national hub office, by means of serial and parallel interfaces. The computers 242 may further provide the above-described functions for the computers 164 in the multimedia central office.

All through routed connections provided by the national hub office are realized as point-to-point connections within the digital switch complex 236. For cases where the national hub office provides other services (such as conferencing or video mail), the digital switch complex 236 dynamically connects the digital carrier 230 with service modules 246a–246c. The service modules 246a and 246b directly access the digital switch complex 236 while service modules 246c require access to service modules 246a via the real-time switch 244. For example, the service modules 246a may include shared video compression devices while the service modules 246c include conference bridges and video storage servers. Here, the real-time switch 244 permits sharing of the compressing devices.

The inclusion of the national hub office in the multimedia telecommunication system may be based upon engineering and economic matters, which include: (i) improved utilization of bandwidth facilities by concentration of the demand; (ii) improved utilization of services resources by concentration of the demand; and (iii) improved reliability and rapid failure recovery by utilizing redundant backup systems. In some cases, an improved utilization of service resources and minimization of transport costs results by locating some of the service resources at the national hub offices.

It is noted that a single, high-quality video stream may be carried by a dedicated 5–10 Mbps switched data-LAN channel, such as a switched-Ethernet connection. For example, a one-way broadcast-quality JPEG video stream requires approximately 7 Mbps of bandwidth, and an uncompressed 16-bit 20 kHz digital audio requires approximately 600 kbps. In the 1–3 Mbps range, MPEG I and II deliver higher compression at good quality, but require significantly more expensive encoders. As a result, it is possible to carry video and audio in packetized digital form over the UTP using conventional LAN protocols. If this approach is taken, some or all of the real-time switches can be implemented as high-bandwidth switching hubs. In some embodiments, one or more of the following architectural variations may be valuable: (i) carrying some or all network and services control channels within the real-time video and audio stream; (ii) carrying some or all shared image files within the real-time video and audio data stream; and (iii) merging of the real-time switches with the data hub complexes.

Embodiments of the multimedia telecommunication system may be realized by a variety of different interconnection topologies for the multimedia central offices, the regional hub offices, and the national hub offices. The principles used in contemporary wide area digital carrier and telephony networking, both public and private, may be employed in embodiments having more than a small number of multimedia central offices, regional hub offices, and/or national hub offices. The incorporation of these principals is illustrated by the example topologies which follow.

In order to simplify the discussion of the topologies, the following abstractions are used. All types of user premises are represented generically as a user site. All types of access between a user site and its serving multimedia central office are represented as a generic user access. In the case of digital carriers, this includes both switched and dedicated services. The combination of a digital carrier between a multimedia central office and a local public digital network, a dedicated connection (not switched) provided by the local public digital network, and a dedicated services digital carrier to a regional hub office is represented as a generic dedicated link. Similarly, the combination of a digital carrier between a regional hub office and a wide area public digital network, a dedicated connection (not switched) provided by the wide area public digital network, and a dedicated services digital carrier to a national hub office is represented as a generic dedicated link. Thus, generic access involves any type of access used to link a generic user site with its serving multimedia central office, while generic dedicated links represent any kind of dedicated (not switched) links between pairs of offices.

Figure 6:
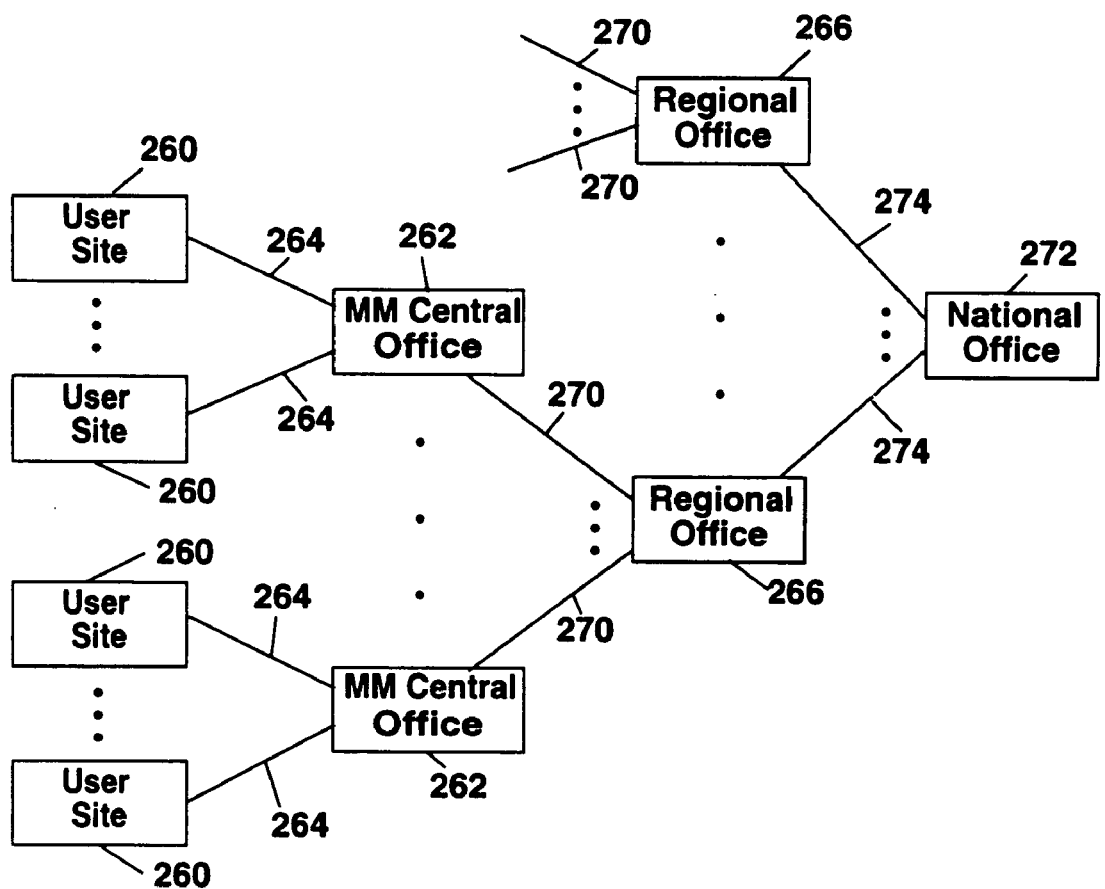
FIG. 6 is a block diagram of an example topology wherein fully dedicated digital carriers are employed between multimedia central offices, regional hub offices, and national hub offices.

FIG. 6 is a block diagram of an example topology wherein fully dedicated digital carriers are employed between multimedia central offices, regional hub offices, and national hub offices. A plurality of user sites 260 are each coupled to a corresponding one of a plurality of multimedia central offices 262 via a corresponding one of a plurality of generic user access links 264. Each of the multimedia central offices 262 is coupled to a corresponding one of a plurality of regional hub offices 266 by a corresponding one of a plurality of generic dedicated links 270. Each of the regional hub offices 266 is coupled to a national office 272 by a corresponding one of a plurality of generic dedicated links 274.

This topology is beneficial in allowing the exploitation of conventional bulk pricing of bandwidth, improving the location of shared service resources, and providing alternative access means for users which use NTNI UTP to communicate with one of the multimedia central offices 262. However, this topology does not provide for redundancy for the purpose of failure immunity. Further, in order to handle heavy traffic, a brute-force approach of increasing the number of trunks in the links 264, 270, and 272 must be employed with this topology.

Figure 7:
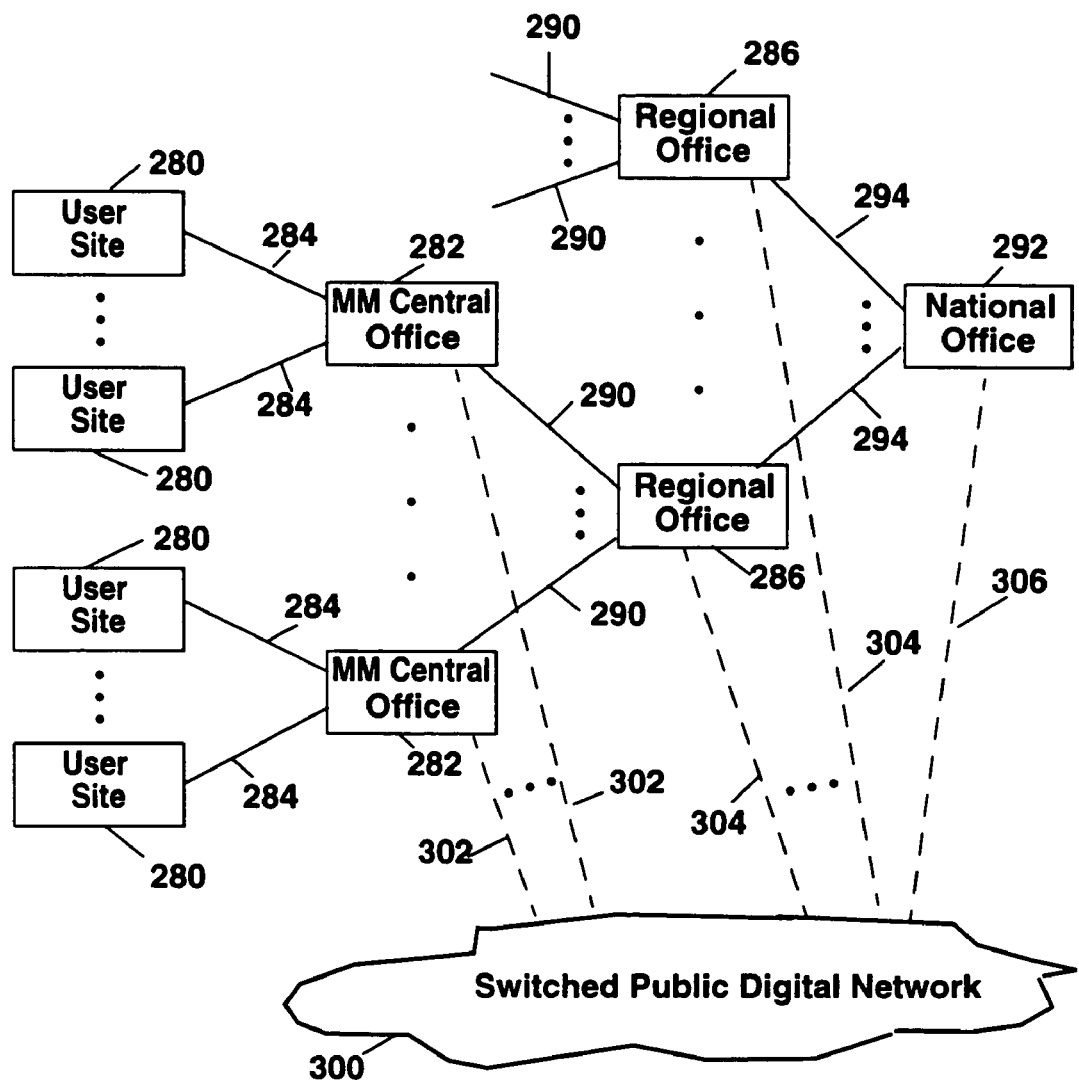
FIG. 7 is a block diagram of an alternative topology which utilizes switched lines.

FIG. 7 is a block diagram of another example topology having provisions for overflow and failure conditions. As with the topology of FIG. 6, a plurality of user sites 280 are each coupled to a corresponding one of a plurality of multimedia central offices 282 via a corresponding one of a plurality of generic user access links 284. Each of the multimedia central offices 282 is coupled to a corresponding one of a plurality of regional hub offices 286 by a corresponding one of a plurality of generic dedicated links 290. Each of the regional hub offices 286 is coupled to a national office 292 by a corresponding one of a plurality of generic dedicated links 294.

Further, a plurality of switched lines are provided by a switched public digital network 300 for handling overflow and failure conditions. Specifically, the multimedia central offices 282 access the switched public digital network via access links 302, the regional hub offices 286 access the switched public digital network via access links 304, and the national office 292 accesses the switched public digital network via an access links 306.

Using this topology, a failure or heavy loading of one of the links 290 can be recovered by any of the following steps: (i) setting up a connection through the switched public digital network 300 using access links 302 and 304; (ii) setting up a connection with an alternate one of the regional hub offices 286 through the switched public digital network 300 using the access links 302 and 304; (iii) setting up a connection with one of the multimedia central offices 282 through the switched public digital network 300 using two of the access links 302; or (iv) setting up a connection with the national hub office 292 through the switched public digital network 300 using the access links 302 and 306.

Similarly, a failure or heavy loading of one of the links 294 can be recovered by any of the following steps: (i) setting up a connection through the switched public digital network 300 using access links 304 and 306; (ii) setting up a connection with one of the multimedia central offices 282 through the switched public digital network 300 using the access links 302 and 304; or (iii) setting up a connection with one of the regional hub offices 286 through the switched public digital network 300 using two of the access links 304.

A failure or heavy loading of one of the regional hub offices 286 can be recovered by any of the following steps: (i) setting up a connection with an alternate one of the regional hub offices 286 through the switched public digital network 300 using access links 302 and 304; (ii) setting up a connection with the national hub office 292 through the switched public digital network 300 using the access links 302 and 306; or (iii) setting up a connection with one of the multimedia central offices 282 through the switched public digital network 300 using two of the access links 302.

Similarly, a failure or heavy loading of the national hub office 292 can be recovered by any of the following steps: (i) setting up a connection with one of the regional hub offices 286 through the switched public digital network 300 using access links 302 and 304; or (ii) setting up a connection with one of the multimedia central offices 282 through the switched public digital network 300 using two of the access links 302.

One having ordinary skill in the art will recognize that the trade-off in cost between switched services, dedicated lines, and minimum cost load balancing of the offices 282, 286, and 292 can be exploited in creating a specific implementation of the present invention. In particular, implementations may be created which stochastically minimize operating costs.

Figure 8:
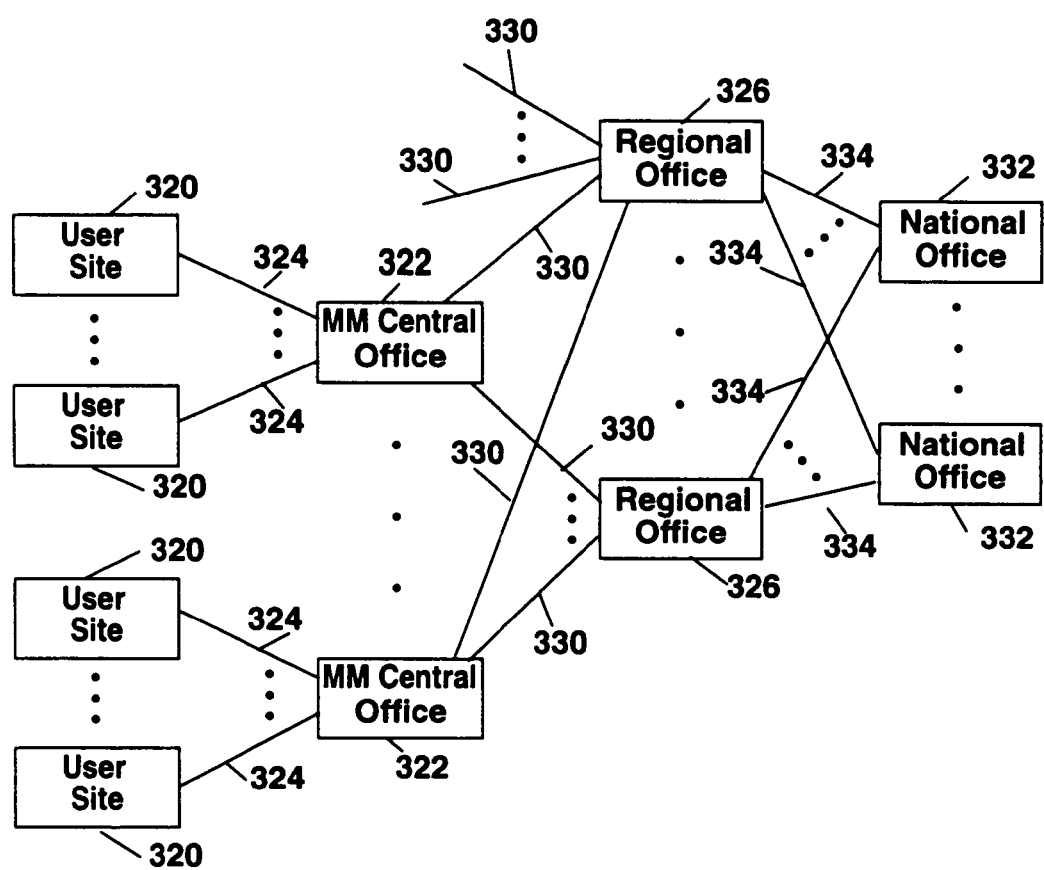
FIG. 8 is a block diagram of an alternative topology which utilizes redundant links and offices.

FIG. 8 is a block diagram of an alternative topology which utilizes redundant links and offices. The additional links and offices are included in this topology in order to obtain higher reliability and trunk availability. As with the topology of FIG. 6, a plurality of user sites 320 are each coupled to a corresponding one of a plurality of multimedia central offices 322 via a corresponding one of a plurality of generic user access links 324. Each of the multimedia central offices 322 is coupled to at least one of a plurality of regional hub offices 326 by a corresponding at least one of a plurality of generic dedicated links 330. Each of the regional hub offices 326 is coupled to at least one national office 332 by a corresponding at least one of a plurality of generic dedicated links 334.

Figure 9:
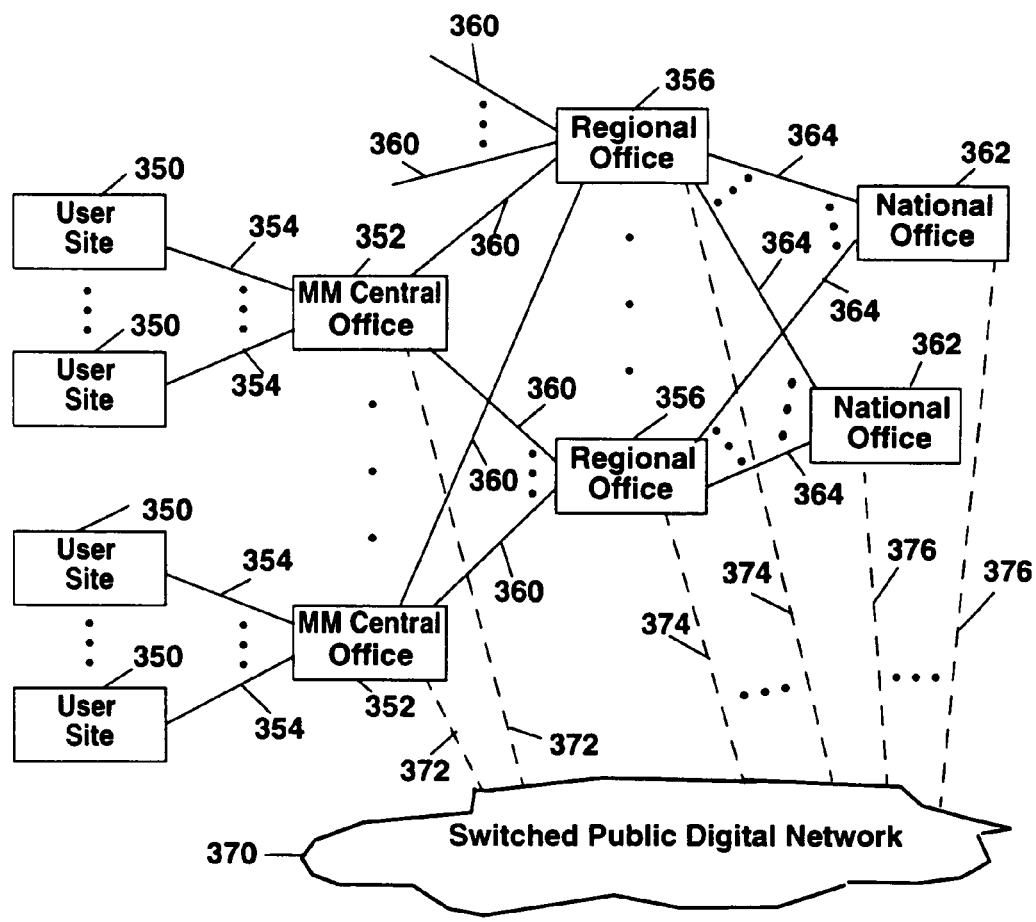
FIG. 9 is a block diagram of an alternative topology which utilizes both redundant links and offices, and switched lines.

FIG. 9 is a block diagram of a topology in which redundant links and offices are combined with switched lines. A plurality of user sites 350 are each coupled to a corresponding one of a plurality of multimedia central offices 352 via a corresponding one of a plurality of generic user access links 354. Each of the multimedia central offices 352 is coupled to at least one of a plurality of regional hub offices 356 by a corresponding at least one of a plurality of generic dedicated links 360. Each of the regional hub offices 356 is coupled to at least one national office 362 by a corresponding at least one of a plurality of generic dedicated links 364.

A plurality of switched lines are provided by a switched public digital network 370 for handling overflow and failure conditions. Specifically, the multimedia central offices 352 access the switched public digital network via access links 372, the regional hub offices 356 access the switched public digital network via access links 374, and the national office 362 accesses the switched public digital network via an access links 376.

The topology of FIG. 9 provides improved immunity to both failure and heavy loading in comparison to the topology of FIG. 7 and the topology of FIG. 8.

In practice, multimedia services may provided by various entities using embodiments of the present invention. A first approach is for a common carrier to provide the multimedia services, either exclusively or in partnership with another entity. A common carrier with a UTP loop plant can use NTNIs for user access to the multimedia central offices. Within the multimedia central office, each which could be as physically small as a large wiring closet in a building, video compression units ("codecs") can be included in the service modules for conversion of the NTNI signals into streams appropriate for TNI digital carriers.

TNI digital carrier terminations (i.e., CSU/DSUs), multiplexing, and codec equipment can be shared among many users accessing them by means of UTP. There are no known tariffed, publicly-offered services of this type.

UTP transceivers may be used to reconstruct converted LAN signals and present them, via a data hub complex and routers, to the digital switch complex for transmission on TNI digital carriers. Appropriate UTP transceivers, alone or together with conversion systems included in service modules, may be used to reconstruct converted V.35, RS-449, or other interface signals and present them to the digital switch complex for transmission on TNI digital carriers. Dedicated and switched bandwidth can be used to link the multimedia central offices to bulk transmission and switching facilities. TNI digital carrier terminations (i.e., CSU/DSUs), multiplexing, and codec equipment can be shared among many users or leased to specific users.

A common carrier without a UTP loop plant may employ a point-of-presence in key buildings and third party operating loops within and/or emanating from these buildings. In fact, common carriers with existing points-of-presence in key buildings are well suited to utilize embodiments of the invention since the UTP loop plant within large buildings is typically conducive to the simplest and least costly of the UTP techniques discussed earlier.

A second approach is for a third party, which purchases bandwidth from a common carrier, to provide the multimedia services. For users who use UTP with NTNIs for access to a multimedia central office, the bulk-rate purchases of dedicated and switched bandwidth helps to further lower the cost for real-time wide-area video connection services. For users who use UTP with NTNIs and are located within a common building or building complex, the multimedia central office can be located within the building and be connected directly to TNI digital carrier access for the building.

For users who use UTP with NTNIs and are located within a common neighborhood, the multimedia central office may be located within any office may be connected by means of a passive UTP loops provided by a common carrier. The passive UTP loops are cross connected at the carrier's central office or wire center. An example of a common carrier passive UTP loop service is Pacific Bell's metallic digital loop tariff 3002.

For users who use a conventional TNI digital carrier to access a multimedia central office, these same bulk-rate purchases of dedicated and switched bandwidth may be accessed to provide lower cost connections out of the area. Typically, this would entail a bulk-bandwidth purchase and an infrastructure investment involved in supporting NTNI UTP users driving the availability and lowering the incremental cost for providing real-time wide-area video connection services to users using conventional TNI digital carriers for access.

In complex cases where there is partial involvement of common carriers with a mix of attributes from each of these cases, one skilled in the art can adapt parts from each of these illustrative approaches.

Abstract pictorials of network connection topologies linking users with centralized multi-point conference bridges do not reveal the important impact of conference bridge location on transmission costs. As an example, if all conference bridges in a nationwide network were located at one site serving the entire nation, almost all multi-point conferences would involve considerable costly long distance telecommunications. Such an approach can be improved upon by migrating some of the conference bridges away from a single national center and into regional and neighborhood locations.

Figure 10:
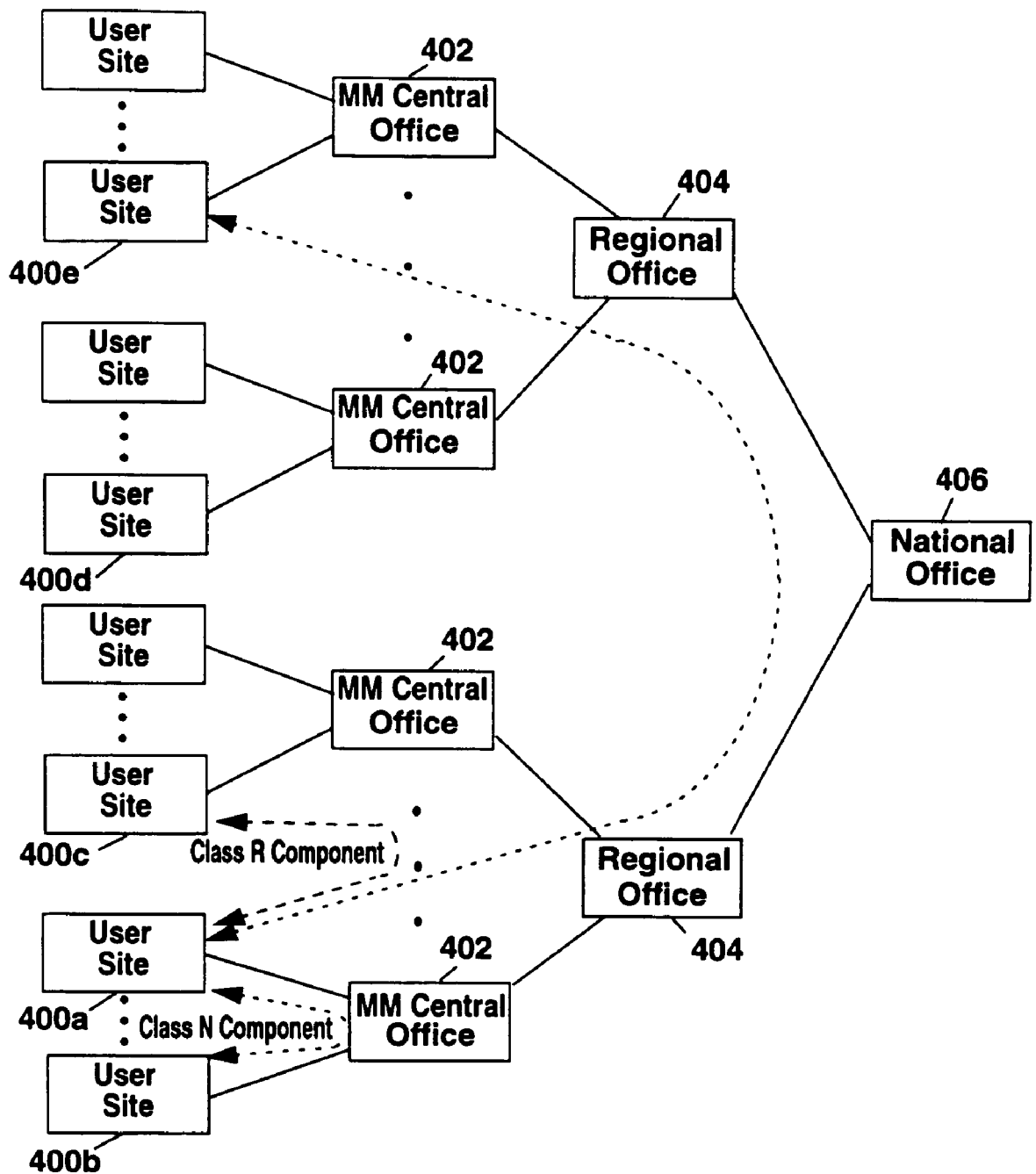
FIG. 10 is a block diagram of a three layer network for illustrating topological components of a multipoint conference.
Figure 11A:
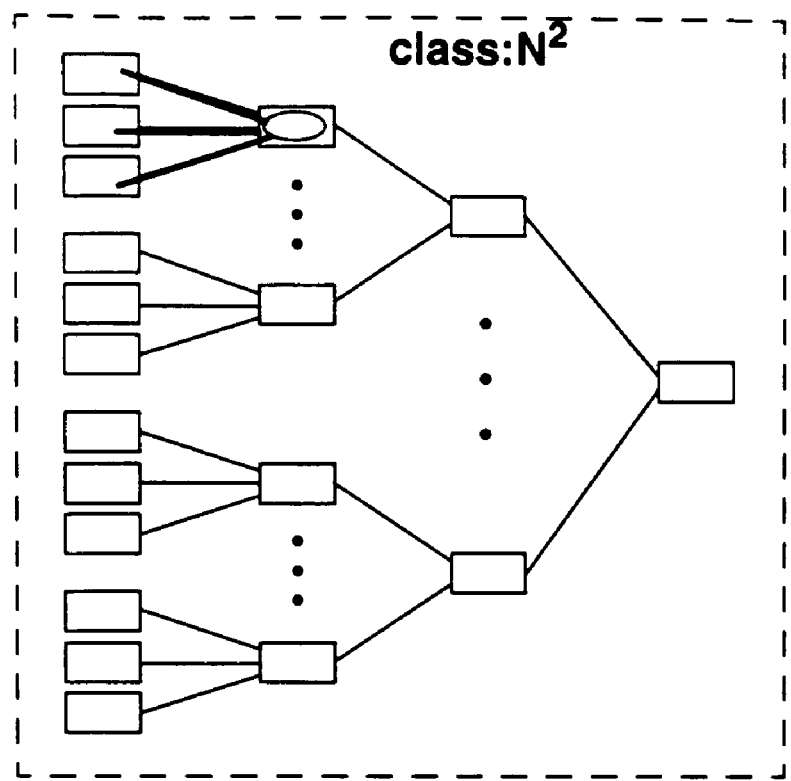
FIGS. 11a–11f are block diagrams illustrating the location of a conference bridge for various non-degenerate 3-party conference cases.
Figure 11B:
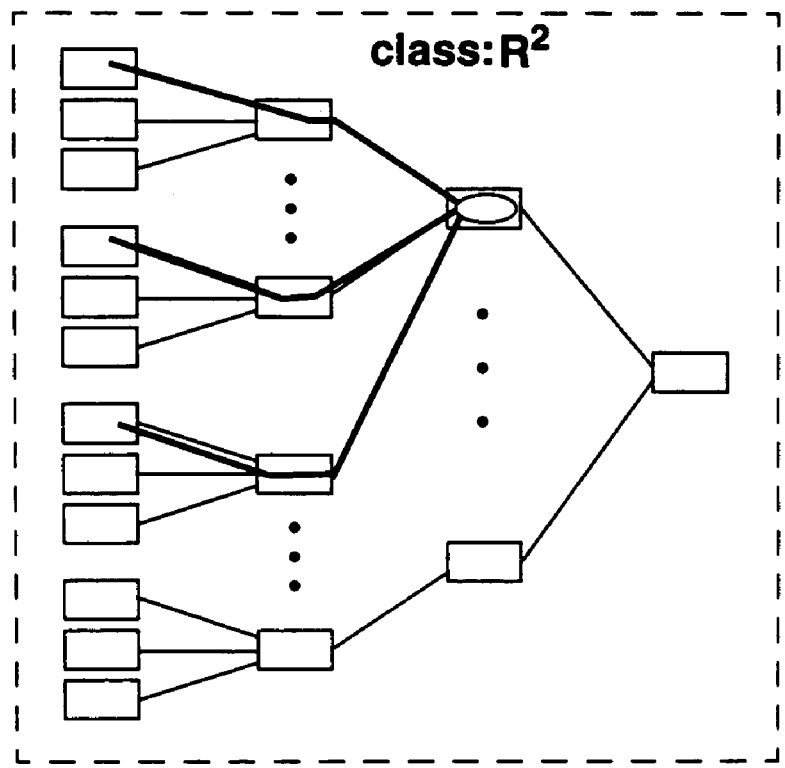
Figure 11C:
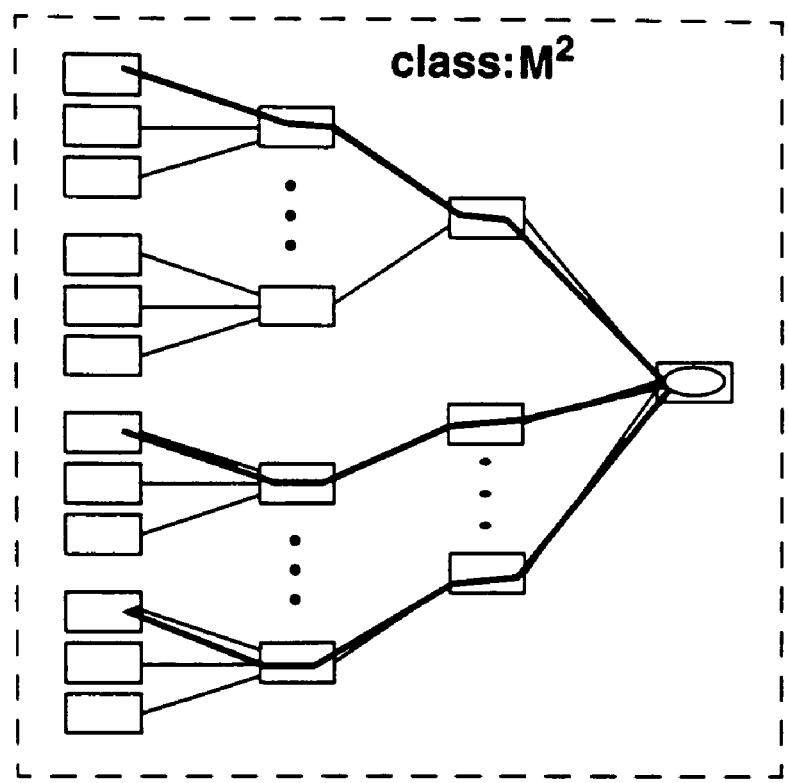
Figure 11D:
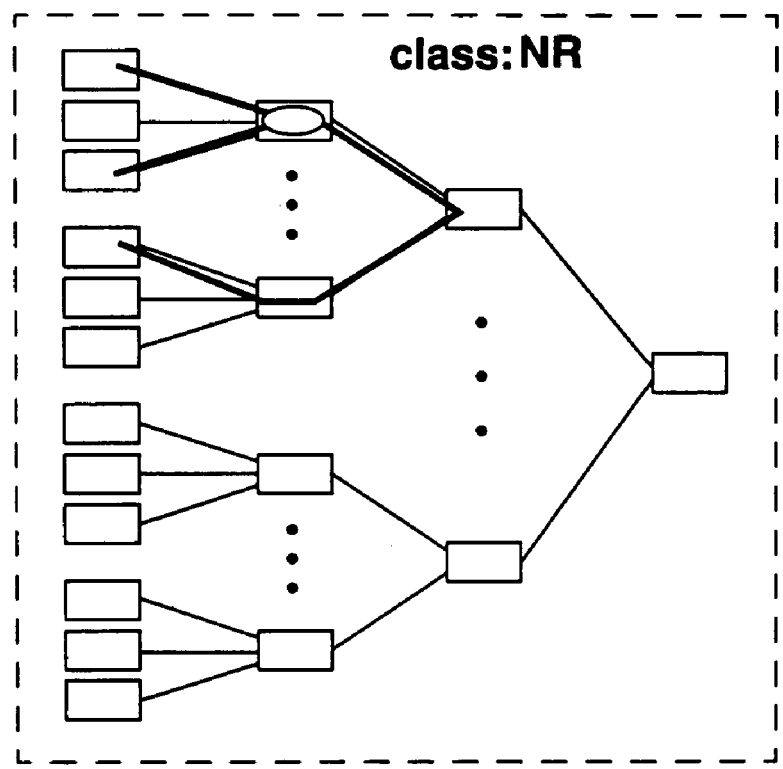
Figure 11E:
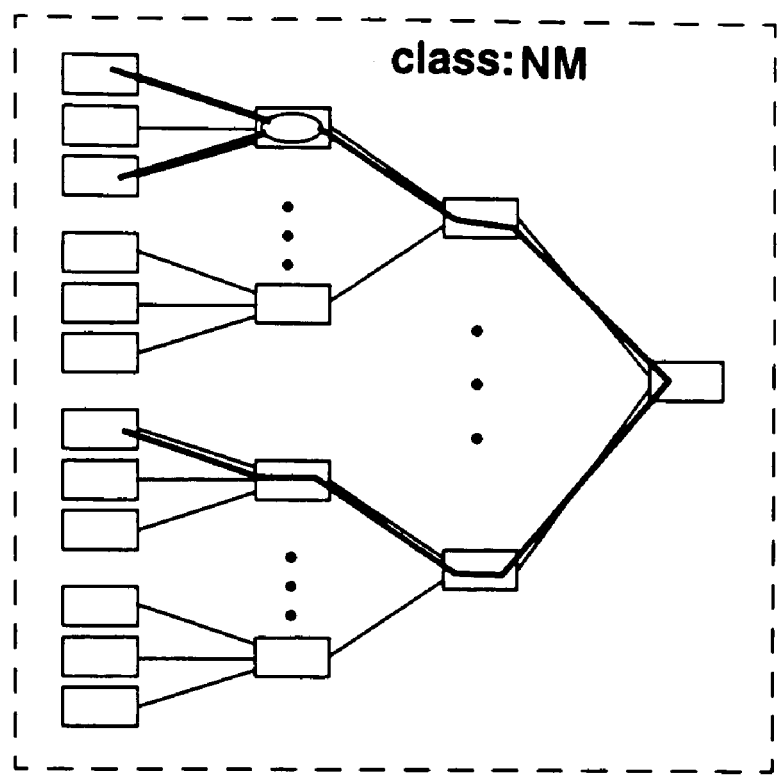
Figure 11F:
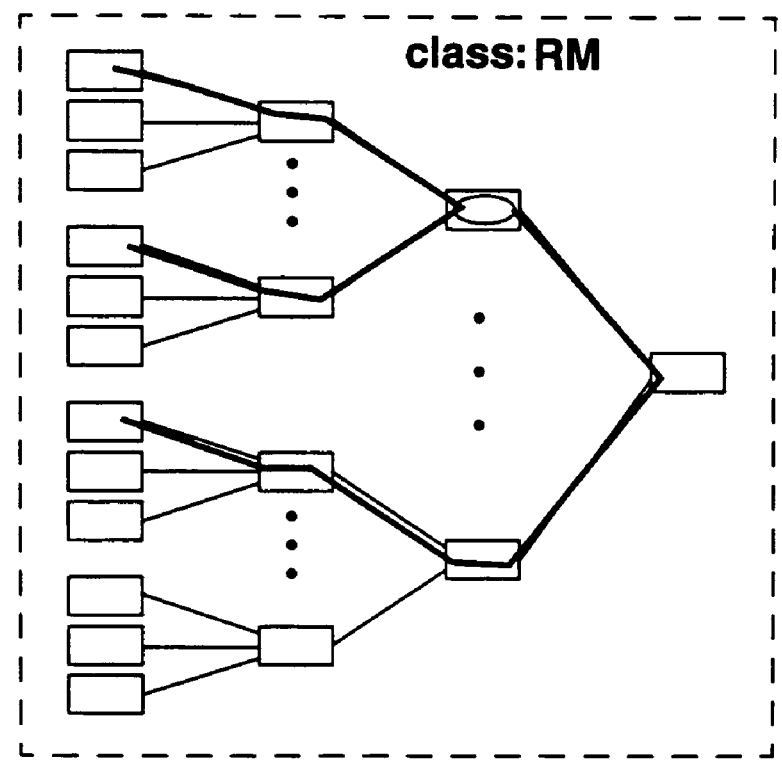

In order to illustrate methods of conference bridge allocation, a block diagram of a three layer network such as those shown in FIGS. 6–8 is considered in FIG. 10. The network comprises a plurality of user sites 400a–400e, a plurality of multimedia central offices 402, a plurality of regional hub offices 404, and a national hub office 406.

A classification system for multi-point call topologies can be created based upon the following designations of components of a multi-point conference. Communication between two users connected to the same multimedia central office (such as a user at the user site 400a communicating with a user at the user site 400b) is designated as a type "N" communication (i.e., within a neighborhood). Communication between two users connected to the same regional hub office (such as a user at the user site 400a communicating with a user at the user site say 400c) is designated as a type "R" communication (i.e., within a region). Finally, communication between two users connected to the same national hub office (such as a user at the user site 400a communicating with a user at the user site 400d) is designated as a type "M" communication (i.e. the maximum topological span).

One user in a multi-point conference is selected as a reference point for classifying each of the types of connections in the conference. For a K-party conference, there are K-1 such connections which are herein referred to as "components".

Next, a (K-1)-tuple of all connection type designations in the multi-point conference call is created. For a 3-party call, there are nine different 2-tuples: NN, NR, RN, NM, MN, RR, RM, MR, and MM. For a 4-party call, there are twenty-seven possibilities: NNN, NNR, NRN, RNN, etc.

All cases that amount to identical algebraic expressions with respect to commutativity of multiplication can be collapsed into a common representative form or class. For example, for 3-party calls, although there are nine 2-tuples, three are redundant in that they may be written in two different ways (e.g., NR=RN, NM=MN, and RM=MR). Thus, there are six possibilities for the representational classes: $N^2$, NR, NM, $R^2$, RM, and $M^2$. For 4-party calls, there are ten possibilities since many of the 3-tuples can be written in 3 or 6 ways. These common representative forms are used to label the class of each multipoint conference. In general, there are $K(K-1)/2$ possible classes for a K-party conference. The number of ways to write a k-tuple is given by the multinomial coefficient of the expansion of the algebraic expansion $(N+R+M)^k$.

Figure 12A:
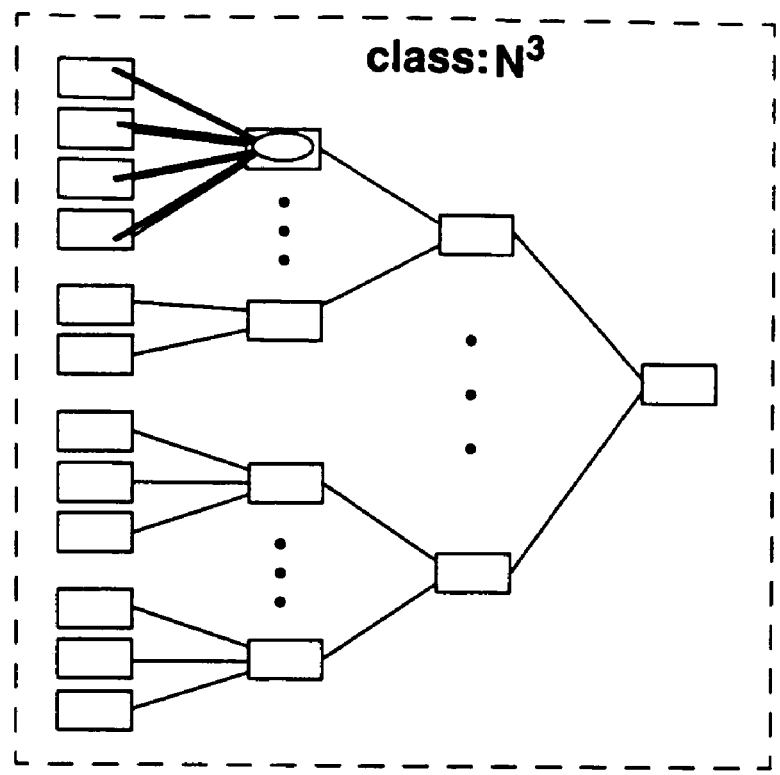
FIGS. 12a–12o are block diagrams illustrating the location of a conference bridge for various non-degenerate 4-party conference cases.
Figure 12B:
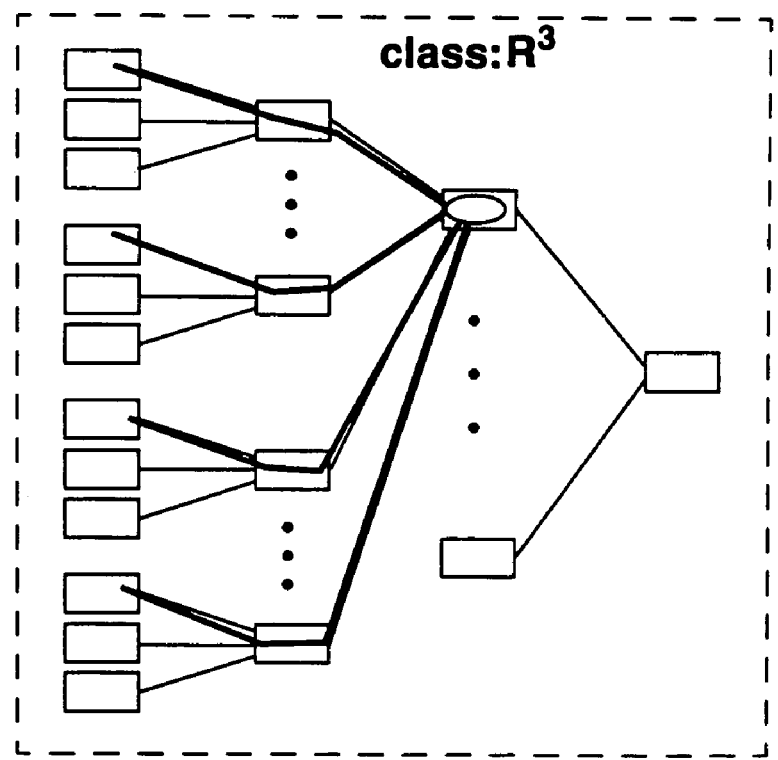
Figure 12C:
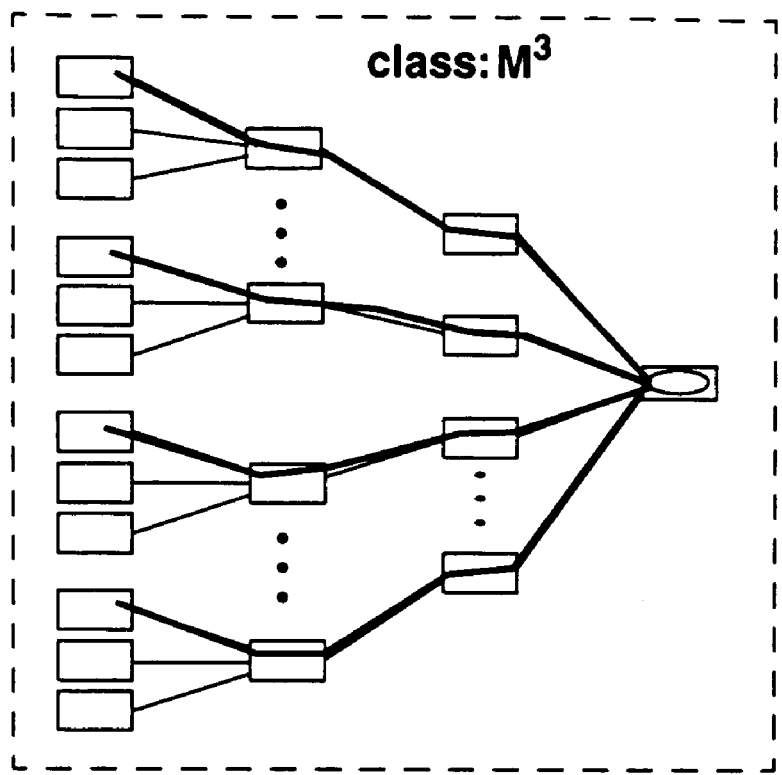
Figure 12D:
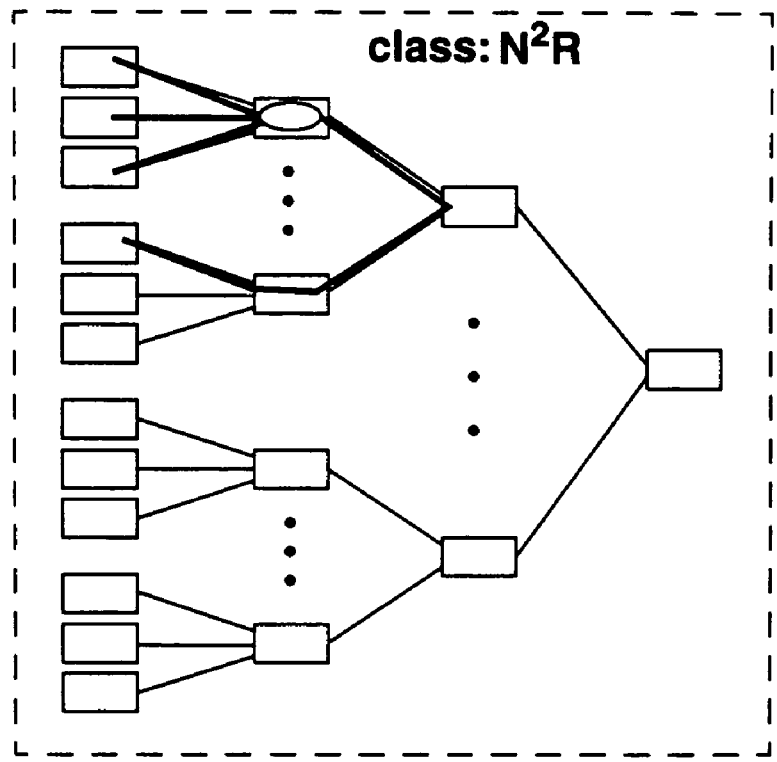
Figure 12E:
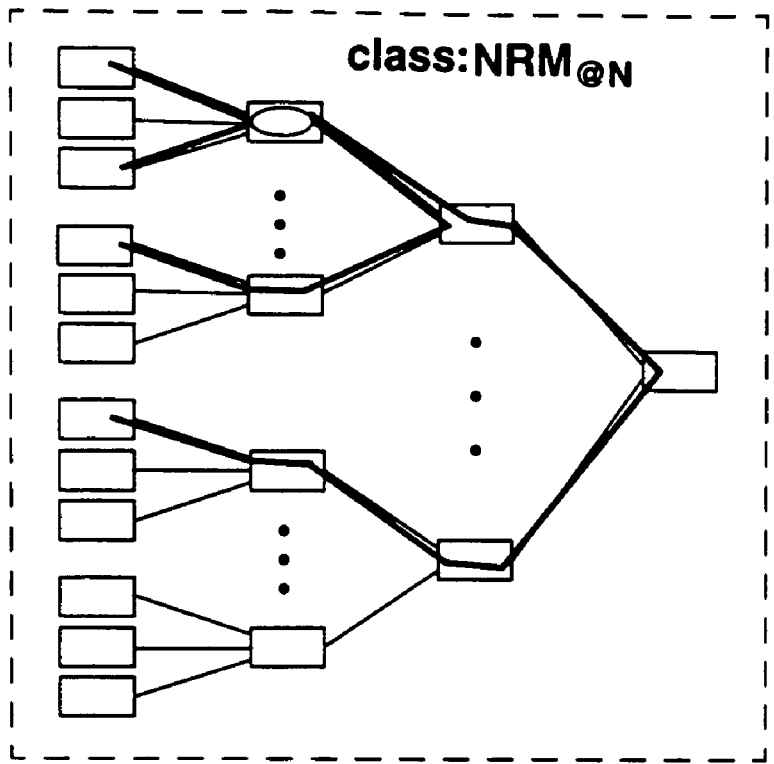
Figure 12F:
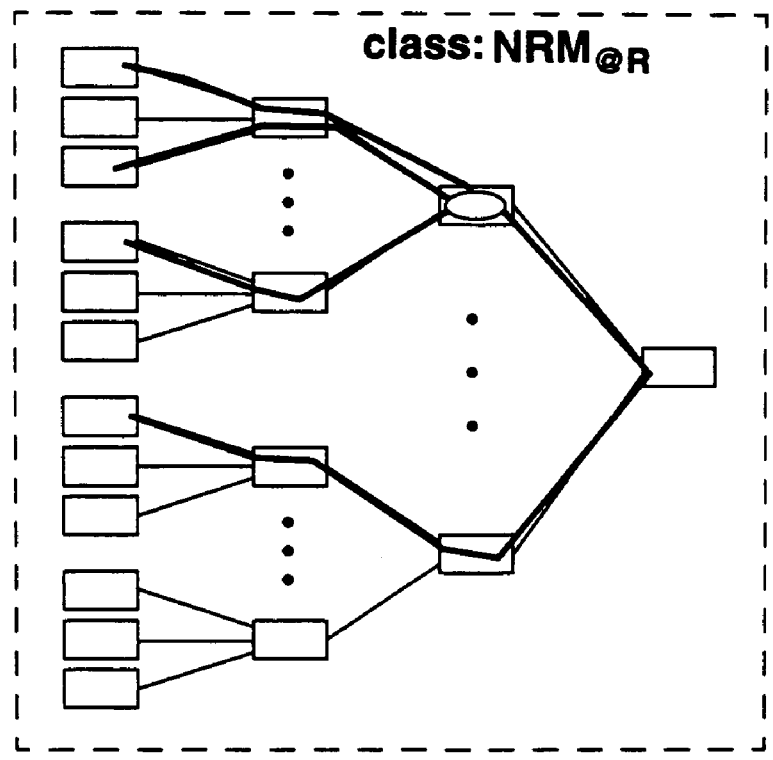
Figure 12G:
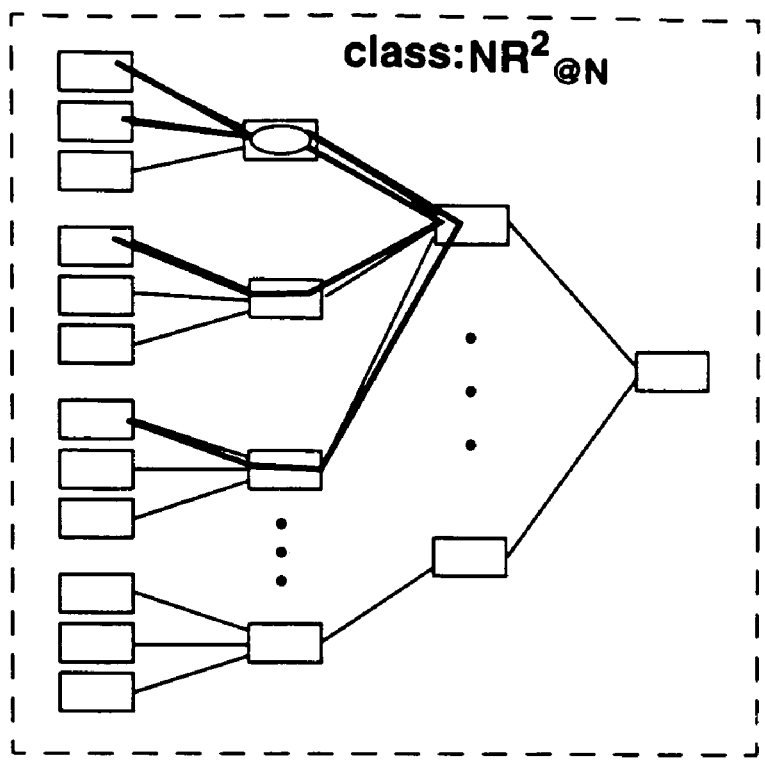
Figure 12H:
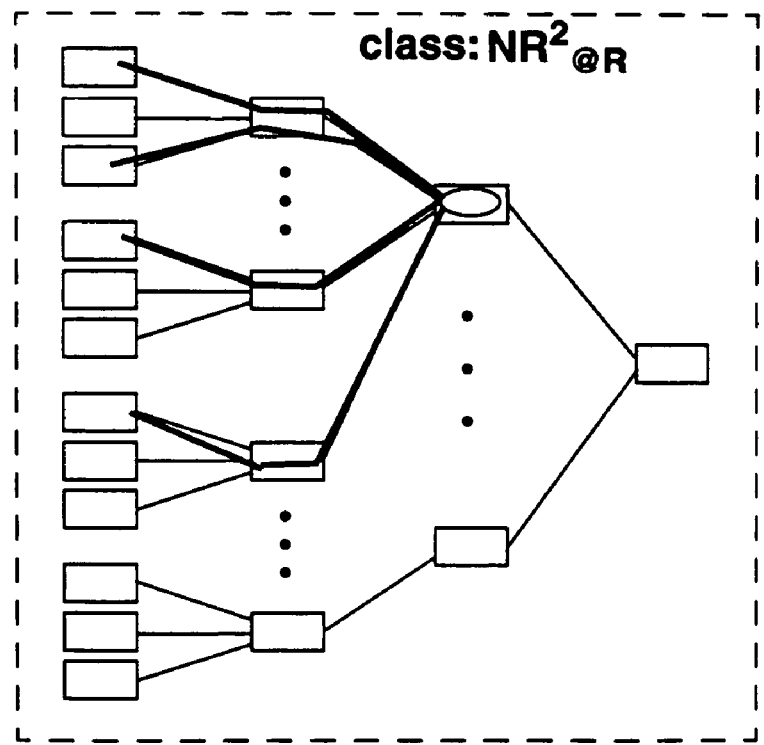
Figure 12I:
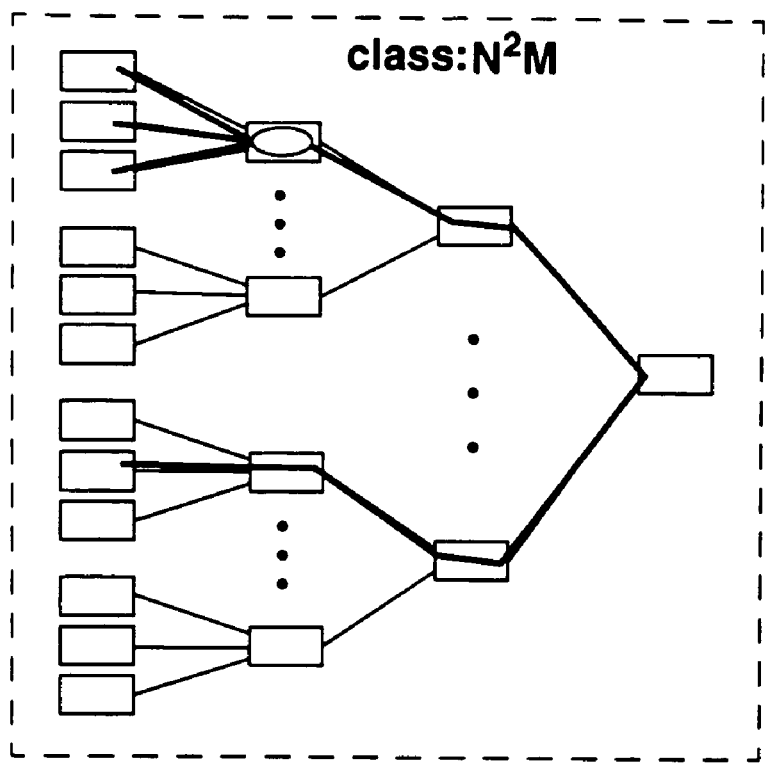
Figure 12J:
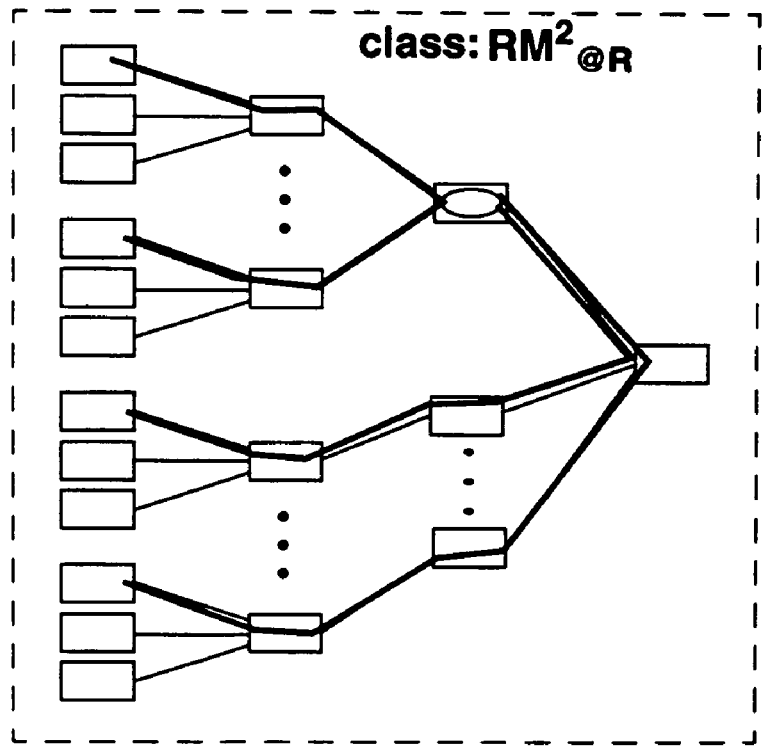
Figure 12K:
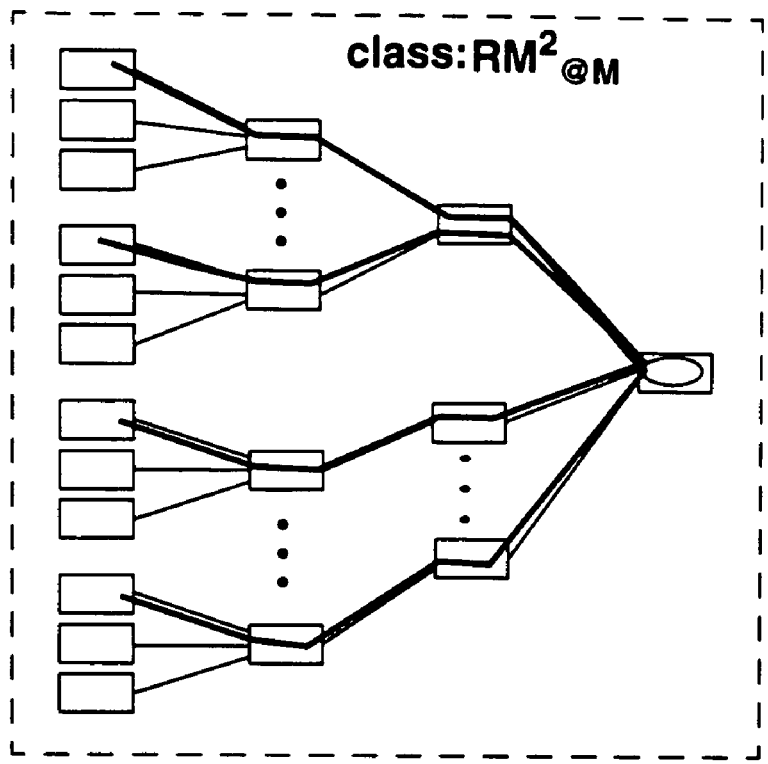
Figure 12L:
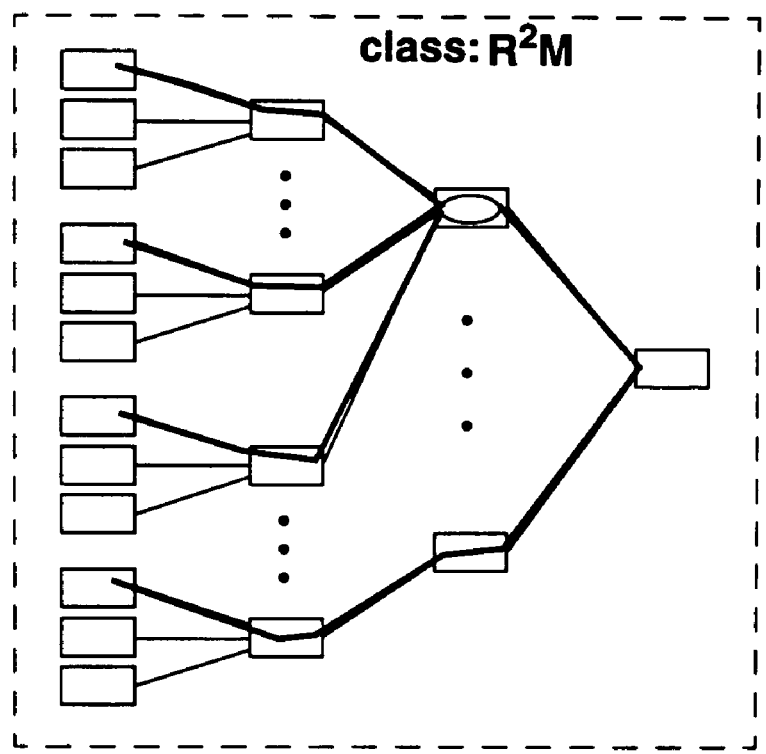
Figure 12M:
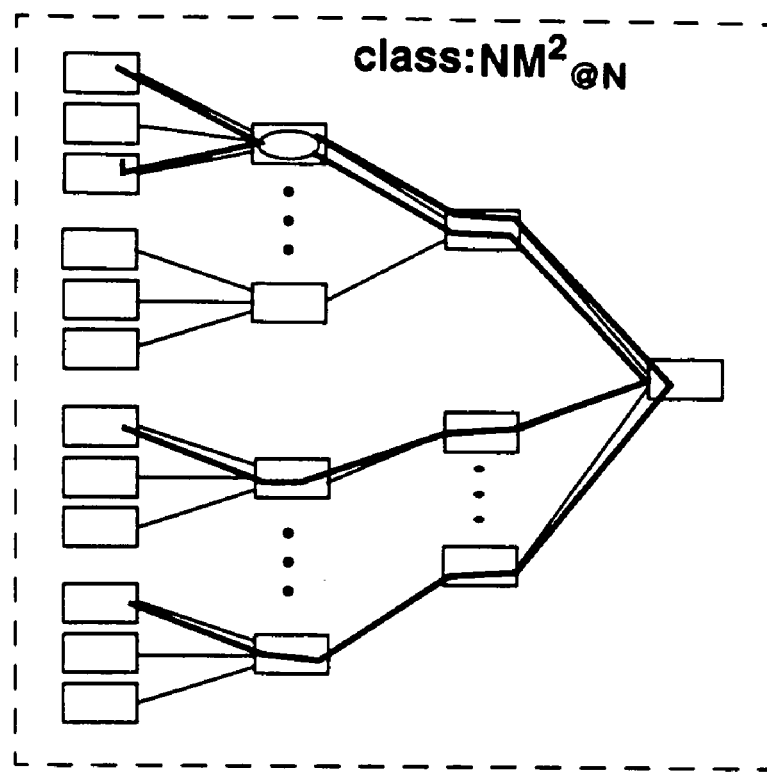
Figure 12N:
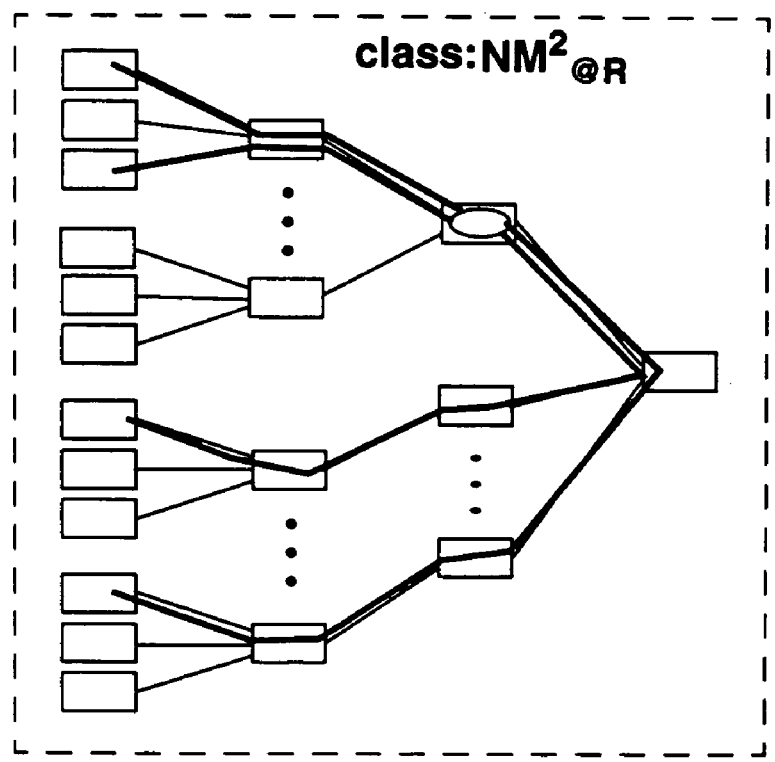
Figure 12O:
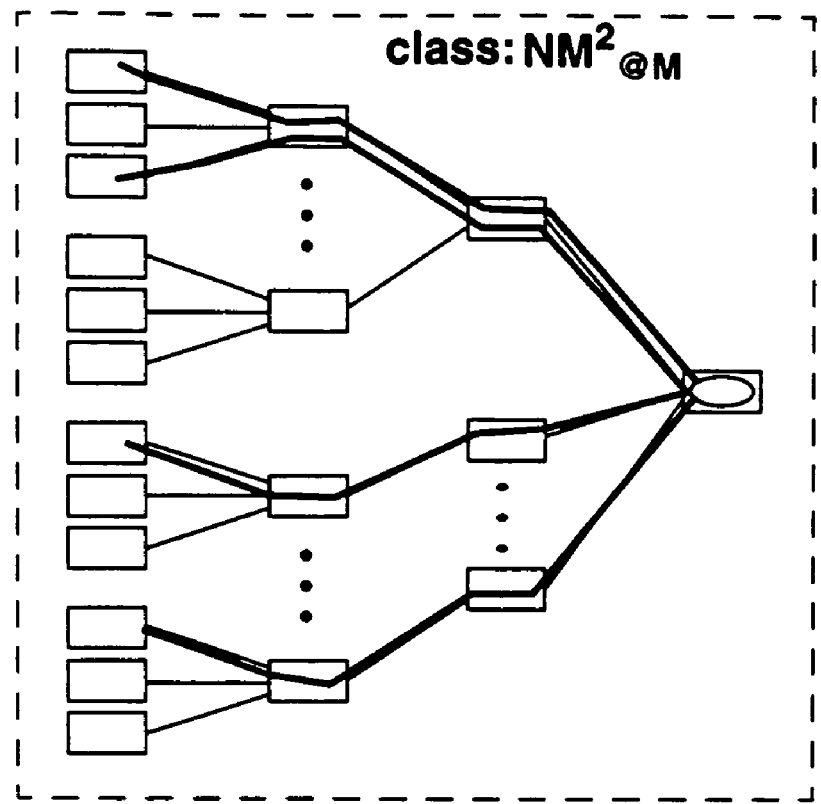

For each multi-point conference class, one or more optimal locations for a multipoint conference bridge can be identified which minimize the cost resulting from long distance transmission. FIGS. 11a–11f illustrate the location of a conference bridge CB for the six possible 3-party cases. FIGS. 12a–12o illustrate the location of a conference bridge CB for 15 different 4-party cases. A summary of optimal locations for a centralized conference bridge by multi-point conference class is provided in columns 3–5 of Tables I and II. A few rarely occurring degenerate cases have been omitted from FIGS. 11 and 12, and Tables I and II, in order to avoid descriptive complexity.

TABLE I

| Class | Ways to Write | N optimal? | R optimal? | M optimal? | # Codecs @ N | # Codecs @ R or M |
|---|---|---|---|---|---|---|
| $N^2$ | 1 | X | | | 3F | |
| $R^2$ | 1 | | X | | | 3 |
| $M^2$ | 1 | | | X | | 3 |
| NR | 2 | X | | | 2F + 1 | |
| NM | 2 | X | | | 2F + 1 | |
| RM | 2 | | X | | | 3 |

TABLE II

| Class | Ways to Write | N optimal? | R optimal? | M optimal? | # Codecs @ N | # Codecs @ R or M |
|---|---|---|---|---|---|---|
| $N^3$ | 1 | X | | | 4F | |
| $R^3$ | 1 | | X | | | 4 |
| $M^3$ | 1 | | | X | | 4 |
| $N^2R$ | 3 | X | | | 3F + 1 | |
| $N^2M$ | 3 | X | | | 3F + 1 | |
| $R^2N$ | 3 | X | X | | 2F + 2 | 4 |
| $R^2M$ | 3 | | X | | 4 | |
| $M^2N$ | 3 | X | X | X | 2F + 2 | 4 |
| $M^2R$ | 3 | | X | X | 4 | |
| NRM | 6 | X | X | | 2F + 2 | 4 |

Columns 6–7 of Tables I and II show how many codecs are needed per conference bridge at the indicated location should codecs be required to convert signal formats. For example, if the conference bridges use analog video and audio, any neighborhood connections which are carried as analog video and audio over NTNI UTP can connect directly to a conference bridge while all other connections require a codec. For a given neighborhood with fraction "F" of such analog NTNI UTP users and fraction "1-F" of users requiring a codec to interface to the conference bridge, the number of codecs required at that neighborhood statistically behaves as shown in column 6.

For K>3, some classes have more than one optimal choice because several choices have identical transmission requirements. For example, in 4-party conferences these classes include NRM, $NR^2$, $RM^2$, and $NM^2$ as seen in Table II. In these cases, analytic models can be used to compare the multiple optimal options for ranges of traffic patterns so as to get more efficient use of conference bridge resources for a specified blocking factor. Such an analysis will be explored in more detail below, but typically the best choice for locating conferencing resources in these situations is in the regional hub offices with typical hardware savings around 10% over other choices.

Figure 13:
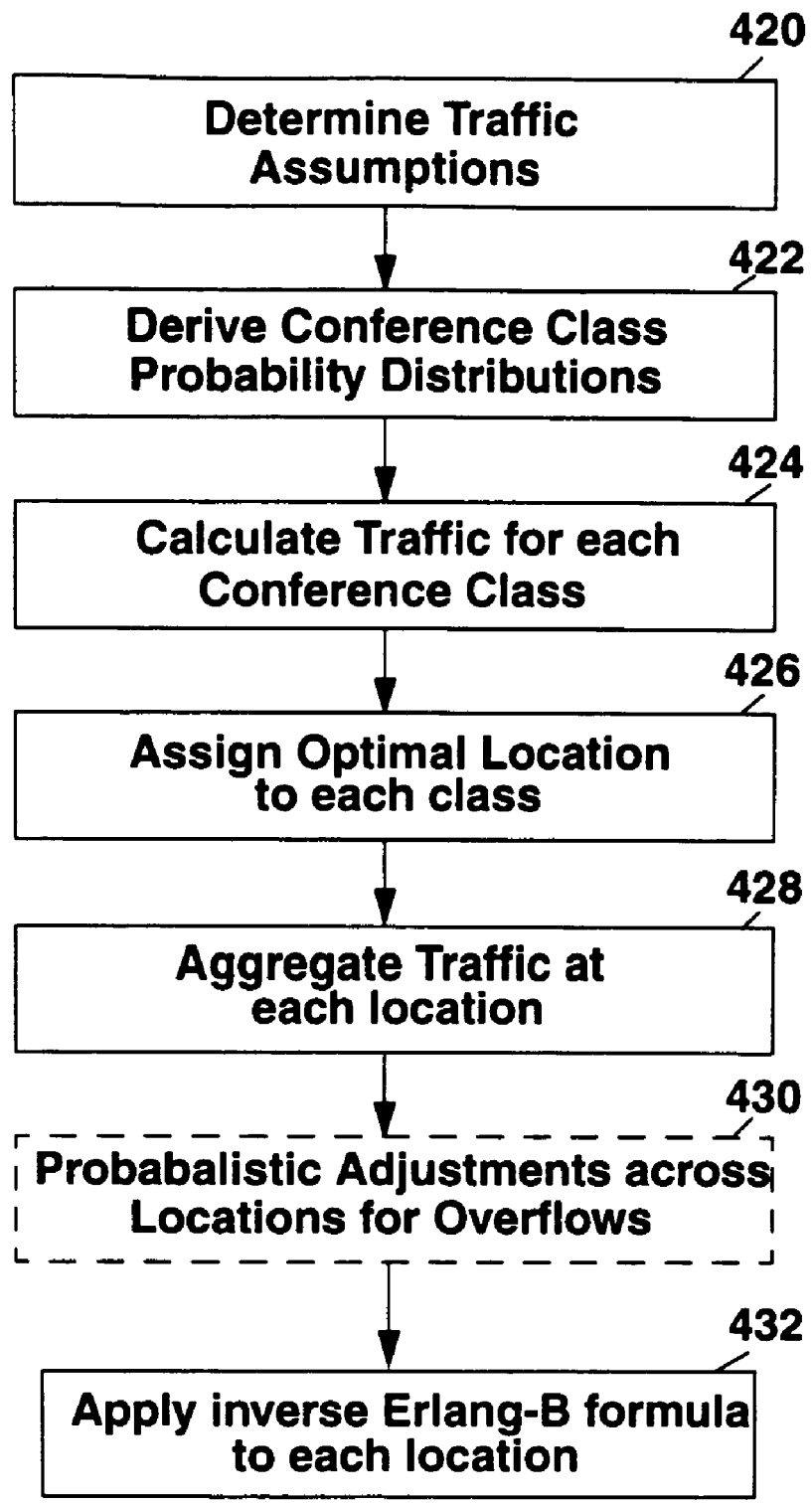
FIG. 13 is a flow chart of an embodiment of a method of resource allocation illustrated for conference bridges.

Next, the analytical modeling aspect of the procedure applicable to facility sizing will be described. A flow chart of an embodiment of a method for optimal allocation to facilities is shown in FIG. 13. As indicated by block 420, traffic assumptions are made concerning the overall Erlangian traffic and probability distribution of various classes of conference calls. These assumptions are used to derive probability distributions for each conference class supported by the implementation of the invention, as indicated by block 422. In the absence of other information, the same probability distribution used for point-to-point calls can be used for each communication type to construct the probability for each conference class (using standard independence calculations and multinomial combinatoric coefficients that correspond to the number of ways the class can occur—see column 2 of Tables I and II).

Using these probability distributions and overall assumptions about traffic demand, the pro-rated statistical traffic demand for each conference class is calculated, as indicated by block 424. Using optimal location tables such as Table I and Table II, each class of conference traffic is directed to its optimal location, as indicated by block 426. As indicated by block 428, the method further includes a step of separately aggregating, for each location, the total demand for conference bridges across all conference classes.

As shown in block 430, the method may optionally include overflow procedures when appropriate resources are not available (due to loading or failure). If these optional features are included, probalistic adjustments for overflows across locations may be introduced. As indicated by block 432, the traffic demand for conference bridges and desired blocking performance are applied to the server-variable inverse of the Erlang-B formula to determine the required number of conference bridges at each location.

Figure 14:
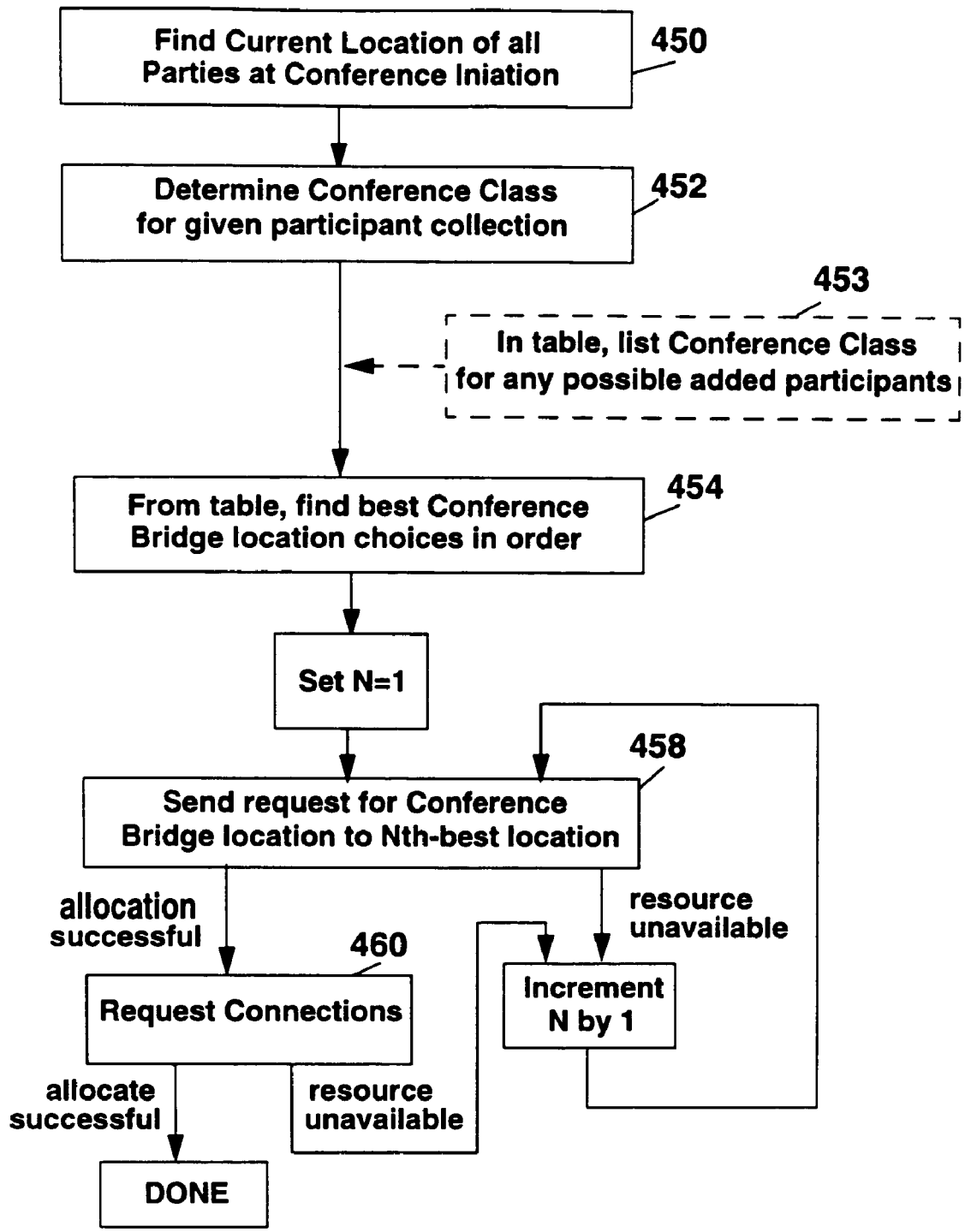
FIG. 14 is a flow chart of an embodiment of a method of allocation applicable to demand-driven resource allocation illustrated for conference bridges.

A flow chart of an embodiment of a method of optimal allocation applicable to demand-driven resource allocation is shown in FIG. 14. Once a request for a conference is received, a step of finding the current location of requested participants is performed, as indicated by block 450. Preferably, this step is performed by querying various registration directory services to obtain the current location of the requested participants actively on the system. If some of the requested participants are unavailable, appropriate call handling elements are employed.

As indicated by block 452, the method further includes a step of determining the conference class for each of the requested participants which are available. A step of finding an optimal conference bridge location for the requested participants is performed, as indicated by block 454. Preferably, this step produces a prioritized list of best conference bridge locations based upon a predetermined look-up table. Optionally, the method may further consider other possible participants which may be added for inclusion in the creation of the prioritized list of best conference bridge locations, as indicated by block 453.

Next, the method performs steps which attempt to allocate conference bridges and communications trunks based upon the prioritized list. Starting with the first priority choice, a step of requesting a conference bridge in the desired location is performed as indicated by block 458. If the request is successful, the necessary trunks are requested in block 460. If either the requested conference bridge is unavailable or the requested trunks are unavailable, the next best choice in the list is attempted.

Embodiments of the above-described allocation methods have several valuable impacts: (i) they save considerable transmission costs by providing a simple classification scheme for selecting the most optimal conference bridge location for each conference call; (ii) they provide a procedure for identifying how many conference bridges are required at each network office; (iii) an additional 10–20% in conference bridge hardware costs can be saved by refining the above procedure to exploit the best allocation choices in thus far "don't care where" cases (namely, $R^2N$, $M^2N$, $M^2R$, and NRM; see Table II); and (iv) they can then be incorporated into the actual control algorithms which allocate resources when users place conferencing calls.

Although this aspect of the present invention is targeted at location of video conferencing resources, the principals can also apply to conventional telephone audio conferencing systems and application sharing server systems.

Next, alternative embodiments of conference bridges for use in the multimedia telecommunications system are presented. Preferred embodiments of the present invention employ continuous presence conference bridges so as to deliver realistic support for multi-party human interaction. The use of continuous presence conferencing bridging provides for the distribution of conferencing resources among offices and demand-driven allocation policies of conferencing resources. This is of value in facilities planning and in minimizing transmission costs. Continuous presence conference bridges provide an improvement over other available wide-area conferencing systems relying on multipoint control units (MCUs), which display only one participant's video image at a time.

The types of continuous presence conference bridging utilized by embodiments of the present invention may be categorized as having either a centralized or a decentralized geographic spread. Further, the types of continuous presence conference bridging may be characterized by the type of video mosaic implementation utilized, namely, analog video domain, pixel domain, discrete cosine transform (DCT) domain, or variable length coding (VLC) domain.

Figure 15:
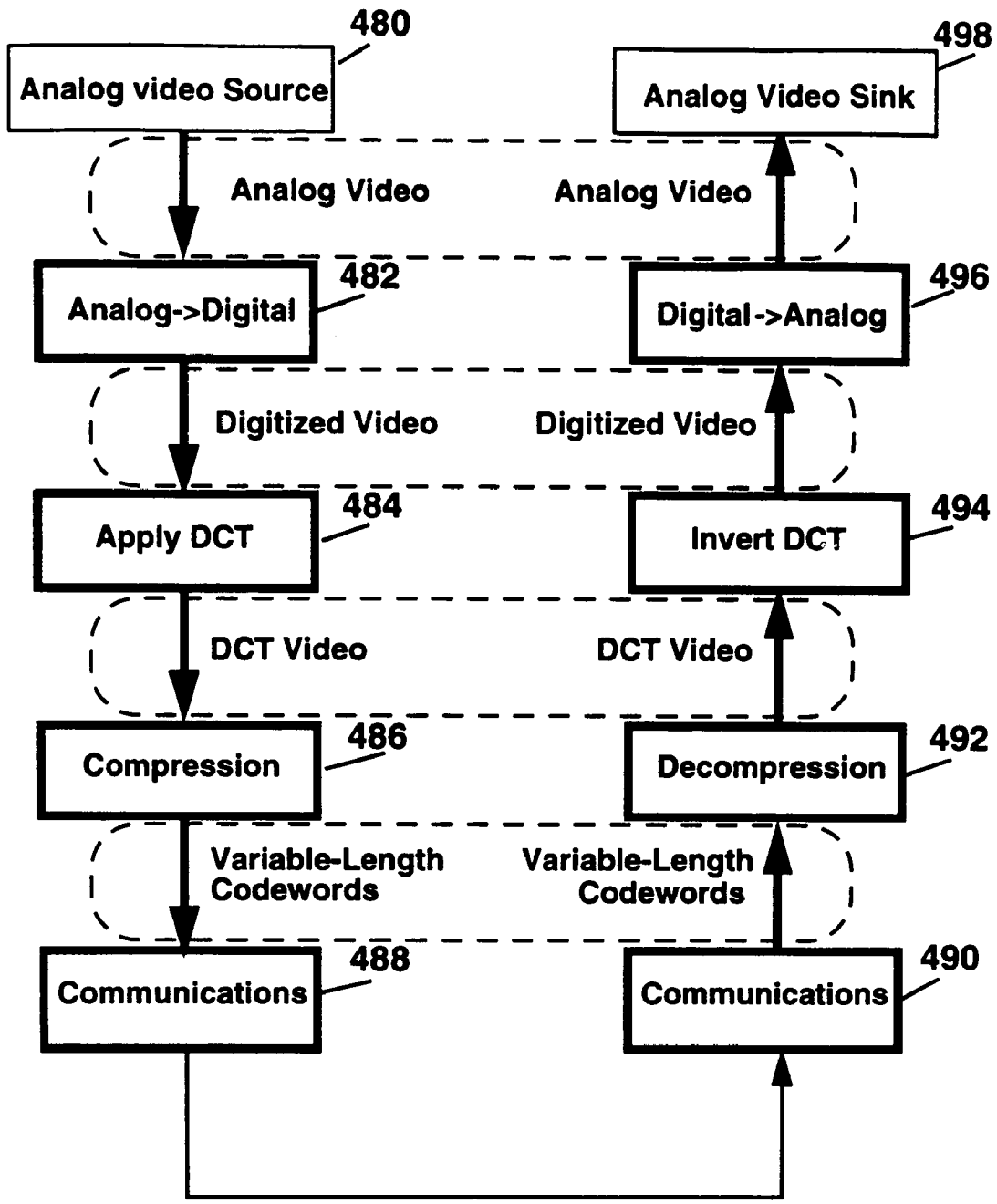
FIG. 15 is a block diagram of a compression system to illustrate signal domains.

FIG. 15 is a block diagram of a simplified layered architecture of a compression scheme in order to illustrate the aforementioned domains. An analog video source 480 provides an analog video signal to an analog-to-digital converter 482. The analog-to-digital converter 482 digitizes the analog video signal to form a digitized video signal. After conversion, the digitized video signal is applied to a DCT signal processor 484 which provides processing based upon a DCT operation. The output of the DCT signal processor 484 is applied to a compressor 486 which creates a stream of variable length code words. The compressor 486 may employ one of many compression algorithms known in the art.

The variable length code words are then passed to a transmitting communications subsystem 488 which supplies real-time timing and/or file-creation support. A signal transmitted and/or stored by the transmitting communications subsystem 488 is received and/or retrieved by a receiving communications subsystem 490. The receiving communications subsystem 490 acts to recover real-time stream of variable length code words.

The recovered stream of variable length code words is passed to a decompressor 492, which employs a decompression algorithm to invert the action of the compression algorithm in the compressor 486. The decompressor 492 produces a resulting DCT video stream which is applied to an inverse DCT signal processor 494. The inverse DCT signal processor 494 produces a digital video stream which is applied to a digital-to-analog converter 496. An analog video stream produced by the digital-to-analog converter 496 can be presented to an analog video sink 498 such as a display device.

The signals produced by the analog video source 480 and the digital-to-analog converter 496 are regarded as being in an analog video domain, since both contain an analog video signal. The signals produced by the analog-to-digital converter 482 and the inverse DCT signal processor 494 are regarded as being in the pixel domain, since both contain a digital pixel stream. The signals produced by the DCT signal processor 484 and the decompressor 492 are regarded as being in the DCT domain, since both contain a DCT stream. The signals produced by the compressor 486 and the receiver 490 are regarded as being in the VLC domain, since both contain a stream of variable length code words.

Embodiments of the present invention may employ commercially available compression schemes which computes a discrete cosine transform to convert the image from two-dimensional amplitude distribution to two-dimensional frequency distribution. The DCT is the core of many popular deployed and commercially available compression schemes, in particular the ITU-TSS H.261/H.320 standard supported by many video codec manufacturers.

With regard to the use of pixel-domain video compositing in the conference bridges, embodiments of the present invention may use many different approaches. Two specific approaches to pixel-domain video compositing include a centralized implementation and a distributed implementation. The use of pixel-domain video compositing elements (such as the video mosaic units made by Panasonic, For-A, and others) to realize continuous video presence in video conferencing is disclosed in U.S. application Ser. No. 08/131,523 for both centralized and distributed implementations. In addition to these approaches, embodiments of the present invention may use any of the extensions discussed herein to follow. In particular, the distributed implementation of DCT-domain or VLC-domain compositing described herein supplements the art of distributed conference bridges as described in U.S. application Ser. No. 08/131,523.

In the pixel-domain, a 2-by-2 mosaic of four full-motion video regions can be formed by dropping every other pixel in each image dimension from four full-screen pixel streams, and positioning the resulting half-by-half sized regions to form a 2-by-2 mosaic. There are many variations of this, such as forming 3-by-3 mosaics by dropping every 2 out of 3 pixels in each dimension, or forming mixed-region-size mosaics by using different pixel dropping rates for the pixel streams emanating from different sources, as is obvious to one having ordinary skill in the art.

In a wide area situation, at least some of the video images will arrive in the digital communications signal format. Commercially available video mosaic units (such as those made by Panasonic, For-A, and others) provide interfaces for signals in the analog video domain, although they internally perform the video compositing in the pixel domain. The conversions between the analog video domain and the pixel domain are performed by separate internal analog-to-digital and digital-to-analog converters. The reason for this is that low cost interfaces in the analog domain are common and well supported, while low cost interfaces in the pixel domain for these types of interconnections are not available or defined.

More preferably, pixel-domain compositing may interface codec systems in the pixel domain by means of an appropriate interface. In practice, this interface can be engineered to be relatively trivial to implement since both commercially available codecs and video mosaic units typically must convert to and from the analog domain in a similar fashion. Without a coordinated design, the codecs and video mosaic units could well use completely different digital representations of the video frame. There are cost, complexity, and performance advantages to this approach.

Switching among a pool of codecs and a pool of video mosaic units can be done in a conventional digital backplane. Presently, in the analog video domain, this is performed by wideband analog switching matrices, which requires additional hardware for cable transceivers, multiple power supplies, and low-noise wideband analog backplanes. This redundant hardware can be avoided by an appropriate scale server implementation.

The most likely candidate for the analog video interface signals are popular standardized composite signals (NSTC, PAL, and SECAM). Each of these introduces image degradation with each pair of digital-to analog and analog-to-digital conversions. This can be somewhat problematic in the areas where chroma and luminance frequency bands overlap somewhat and are filtered in different ways at each interface.

As an additional level of improvement, considerable improvements in cost and performance can be made by compositing in the DCT domain. This technique has been explored by others; see "Video Compositing in the DCT Domain", by Chang, Chen, and Messerschmitt, Proceedings of IEEE Workshop on Visual Signal Processing and Communications, Rayleigh, N.C., September 1992. Embodiments of the present invention may employ this approach using the methods of Chang, Chen, and Messerschmitt or related methods.

Effectively, the operations involved in dropping pixels and compositing as a mosaic can be represented mathematically as under-sampling and translation operations. These under-sampling and translation operations have corresponding two-dimensional impulse responses which, when convolved in two dimensions with the video stream frames in the pixel domain, create the desired video mosaic. When this entire process in transformed into the DCT domain, the DCT frames (in the DCT streams within the DCT domain) are multiplied in two dimensions with the DCT of the under-sampling and translation operations, producing the DCT of the desired mosaic. The multiplication is, in general, less complex to implement than the convolution. More importantly, the mosaic can be done without use of the DCT and the inverse DCT signal processors for video signals arriving at the bridge from the wide area. This saves costly hardware, greatly codec reduces delay, and is a natural candidate for incorporation into an appropriate large-scale server implementation.

Even further cost savings and performance improvements can be made by compositing in the VLC domain. This technique has been explored by others; see "Video Bridging Based on H.261 Standard", by Lei, Chen, and Sun, IEEE Transactions on Circuits and Systems for Video Technology, Vol. 4, No. 4, pp. 425–437, August 1994, for example. Distributed implementations of video compositing is also a natural candidate for incorporation into an appropriate large-scale server implementation.

Slight variations allow the aforementioned methods of FIGS. 13 and 14 to be applied to optimal allocation of other related resources within the multimedia telecommunication system. Specifically, the method may be applied to allocate components within service modules such as codecs used to provide digital access to analog video domain conference bridges. Further, the method may be applied to allocate internal components of a conference bridge server, such as the analog-to-digital and the digital-to-analog converters used to provide analog access to pixel, DCT, or VLC domain conference bridges.

More specifically, users of the multimedia system may use either analog NTNI access or digital access to a multimedia central office. For analog video domain conference bridge interfaces, codecs are needed for digital access, but are not needed for analog NTNI access. For conference bridge interfaces in the pixel domain, the DCT domain, or the VLC domain, analog-to-digital and digital-to-analog converters are required to provide analog access to pixel, DCT, or VLC domain conference bridges.

As an example, consider the need for codecs when using analog video domain conference bridges. Since the regional hub offices and the national hub offices do not have analog NTNI access, the number of codecs needed for each conference class (whose optimal location is one of these offices) is simply the number of participants in the conference. This is illustrated in the column 7 of Table I and Table II. At the multimedia central offices and for conference classes where multimedia central offices are the optimal conference bridge location, codecs are needed for each outgoing trunk in conference classes involving users whose access does not terminate on the same multimedia central office. In terms of the communication type designations defined earlier, one codec is needed for every R or M component of the conference class.

Further, if the fraction of users terminating on that multimedia central office with digital access is denoted by a variable F (which ranges between O and 1), then the probability a codec is needed is F times the number of users terminating on that multimedia central office which are participating in the conference. In other words, an additional factor of F for the reference user and one each for every N component in the conference class is included in the probability that a coded is needed. This is illustrated in the column 6 of Table I and Table II. The resulting probabilistic (for the multimedia central offices) or deterministic (for the regional hub offices and national hub offices) number of codecs needed per class can then be used to pro-rate the traffic in the steps indicated by blocks 428 and 430 in FIG. 13. Performing the step indicated by block 432 to the pro-rated traffic gives the number of codecs needed for this purpose.

Since commercially available implementations of pixel-domain video compositing elements (such as the video mosaic units made by Panasonic, For-A, and others) are single physical hardware units, centralized implementations of continuous presence conference bridges would appear to be the easiest direct implementation approach to continuous presence video compositing. In U.S. application Ser. No. 08/131,523, however, distributed implementations of video compositing are shown to be advantageous in wide area situations.

The local video of all participants can be included in the mosaic without multiple codec delays (not just those participants who happen to be collocated near a centralized conference bridge in a way that no round-trip codec delay is incurred for them).

In many cases, the trunking requirements which result can be considerably reduced. For example, with two users in location A and two users in location B, the centralized bridge would require 2 trunks if the bridge is collocated at a sufficiently near location A or B (and 4 trunks if the conference bridge is in a third location), while a distributed bridge needs only 1 trunk to give the same results.

Methods and systems for connecting a workstation or a room to a multimedia central office will now be discussed. In general, any means for connecting the workstation or room directly with the multimedia central offices via a public telephone loop plant UTP are sufficient, as are any means for connecting the workstation or room with the multimedia central office through an internal premises communications system with via the public telephone loop plant UTP. Clearly, the longer distances of loop plant UTP which can be used, the more valuable reuse of the existing worldwide investment in public telephone UTP loop plants. Thus, it is desirable, but not essential, to carry audio, video, and data signals through as long a length of public telephone loop plant as possible.

A further discussion of methods and systems for interfacing with NTNI workstations and rooms is appropriate. Approaches to computer control distribution of analog video and audio within a premises is taught in U.S. application Ser. No. 08/131,523, and in U.S. Pat. Nos. 4,686,698, 4,847,829, and 5,014,267. These approaches rely on the employment of on-premises codecs for connecting workstations or rooms to the outside world. Embodiments of the present invention avoid the per-premises cost of these codecs by use of a public network service providing NTNIs which link to publicly shared codecs. Additional cost savings and features are realized by designing each resulting element as part of an overall wide area collaboration and multimedia networking system.

In considering how to implement a public network service that avoids the cost of these per-premises codecs through use of NTNIs, audio, video, and data are delivered by either per-premises trunks or per-workstation/room direct lines or per-premises trunks. Preferably, the specifications for the audio, video, and data which are delivered are as follows: (i) data communications supporting rates between 128 kbps and 10 Mbps; (ii) at least 3 MHz, and more preferably, 4–6 MHz analog color video or a perceptual near-equivalent; and (iii) at least 5 kHz, and more preferably, 7–15 kHz analog audio or a perceptual near-equivalent. The alternative of "perceptual near-equivalent" is meant to allow for the inclusion of cases where signal processing is used in such a way to deliver comparable quality with less actual transmission bandwidth.

Various techniques for delivering these requirements over UTP, focusing on the employment of NTNI, but not exclusive thereto, are considered. First, the methods by which workstations or rooms 100 connect with public networks are explained.

Referring back to FIG. 2, user premise 104c includes workstations which connect to the public network UTP loop plant 114 individually, and user premise 104d includes workstations which connect through the internal premises communication network 116 with one another and share UTP loops within the public network UTP loop plant 118. In each of these cases, the workstations do not connect directly with the public network UTP loop plant 114 or 118, but rather are linked by connection means to a loop UTP transceiver. The connection means may include any of the following:

(i) UTP transceivers used for premises networking, as described in U.S. application Ser. No. 08/131,523;
(ii) coaxial cable, as described in U.S. Pat. Nos. 4,686, 698, 4,847,829, and 5,014,267;
(iii) fiber optic links; or
(iv) wireless premises radio.

In cases where a user premise does not provide an internal premises network 116, the loop UTP transceiver may be physically located in a premises wiring closet, or may be collocated with each workstation or room system. Alternatively, the connection means may be very short electrical connections within a piece of workstation or room equipment so that the loop UTP transceiver is actually physically incorporated into the workstation or room equipment.

In cases where a user premise does provide an internal premises network 116, the loop UTP transceiver is very likely to be physically located in a premises wiring closet. In this arrangement, the internal premises network 116 provides a concentration function to a pool of shared loop UTP transceivers. Such an arrangement allows a number of workstations and rooms to share a smaller number of UTP trunks and associated transceivers. The connection means may include UTP transceivers, coax cable, fiber optic links, or wireless premises radio.

In either of the two aforementioned cases, the part of the loop UTP transceiver which interfaces with the public network UTP loop plant 114 or 118 typically differs from UTP transceivers used for premises networking in that it typically provides the following functions:

(i) lightning protection and other safety isolation functions;
(ii) additional transmission power and/or receiver sensitivity to compensate for the electrical conditions of the public network UTP loop plant 114 or 118;
(iii) additional frequency compensation to compensate for the electrical conditions of the public network UTP loop plant 114 or 118;
(iv) signal processing and transceiving to compensate for the electrical conditions of the public network UTP loop plant 114 or 118; and
(v) response to remotely controlled installation and maintenance functions (such as loopback, generation/detection of test signals and automated cable compensation adjustments) which in a practical embodiment of the invention may be executed from the multimedia central office.

The loop UTP transceiver employs the public network UTP loop plant 114 or 118 to reach a matching loop UTP transceiver within the multimedia central office. This matching loop UTP transceiver is similar to the loop UTP transceiver used on user premises 104c and 104d but may incorporate differences in packaging for use in a public utility office. The packaging may differ with regard to powering (which may include redundancy provisions), the type of input/output connections and/or cabling employed, and the physical package format. Further, the matching loop UTP transceiver may be capable of: (i) issuing remotely controlled installation and maintenance functions (such as loopback, generation/detection of test signals, automated cable compensation adjustments) which in a practical embodiment of the invention may be executed from the multimedia central office; (ii) performing measurements of response of loop UTP transceiver to remotely executed installation and maintenance functions; or (iii) performing maintenance functions (power checks, input/output connection checks) which are relevant.

Figure 16:
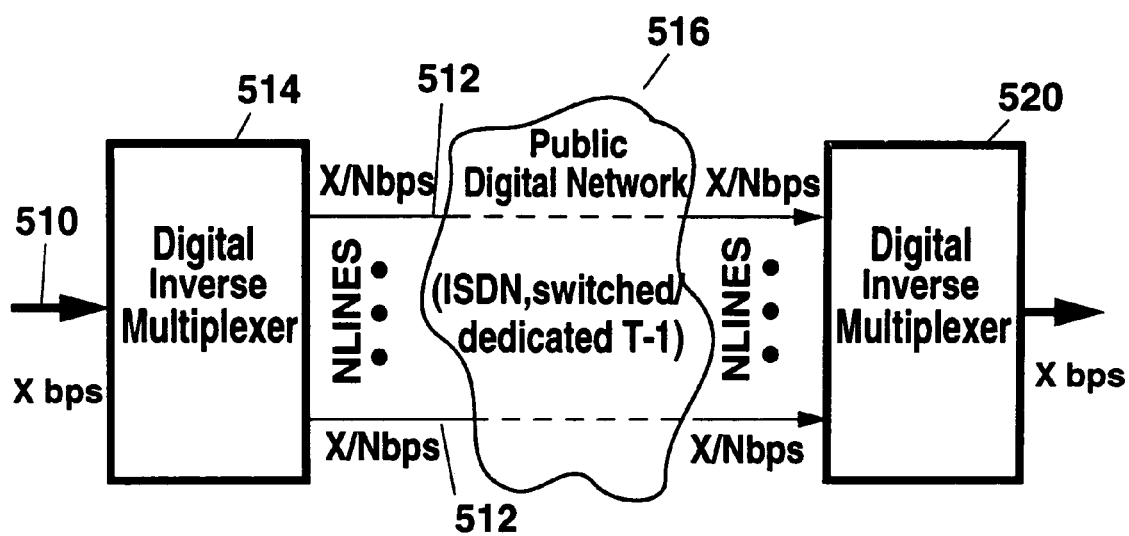
FIG. 16 is a block diagram of a system for transmitting a digital signal over multiple-lower bandwidth links utilizing inverse multiplexers.

A block diagram of a method and system that utilizes inverse multiplexing to carry a single bit stream 510 on a plurality of lower-rate digital carriers 512 is illustrated in FIG. 16. The bit stream 510 is applied to an inverse multiplexer 514 to produce a plurality of lower-rate bit streams. The lower-rate bit streams are communicated through a public digital network 516 over the plurality of digital carriers 512. The lower-rate bit streams are received by an inverse multiplexer 520 which reconstructs the original bit stream. Typically, the inverse multiplexing is bidirectional. This technique is employed, for example, in video teleconferencing where two 56 kbps channels are used to carry a single 112 kbps stream.

Due to the limited bandwidth of a public loop plant UTP, particularly at longer distances, embodiments of the multimedia telecommunication system deliver higher bandwidth signals by "dividing" original signal bandwidth across a plurality of public loop plant UTPs. Moreover, both digital and analog signals may be carried by the UTP using broadened forms of inverse multiplexing.

The division of a signal across multiple physically separated channels is herein referred to as "space division" (in contrast with "time division" used in time-division multiplexers). Space division techniques may be employed to split a signal across multiple UTPs in order to deliver higher bandwidths across longer distances where the transmission properties of the UTP may rapidly degrade (e.g. above 1–2 MHz or even lower analog frequencies).

Digital streams can easily be split and reclocked to create multiple streams operating at lower clock frequencies and, for the range of distances involved, be reassembled into the original digital stream. In analog signals the splitting is relatively straightforward, but the precision frequency transmitter down-shifting, receiver up-shifting, and receiver channel recombining required may be problematic for arbitrary high-fidelity analog signals. In the case of NTSC/PAL/SECAM analog video signals, however, special structural properties of the signal can be exploited.

Methods and systems for splitting a digital stream of a given rate into multiple digital streams of lower rates and reconstructing the digital stream is well-known in the art. Often, the steps in this process are referred to as serial-to-parallel conversion and parallel-to-serial conversion. Typically, a public telecommunications network can not provide a plurality of channels whose relative transmission delays are within a bit-symbol period. Further, in extreme circumstances, differential timing jitter among the plurality of channels can also create problems. Modern inverse multiplexing equipment provide means at the receiving site for measuring the relative transmission delays among the plurality of channels and, based on these measurements, inducing compensating delays on all but the most delayed channel(s) so as to reconstruct the original relative timing used at the transmitting site.

Figure 17:
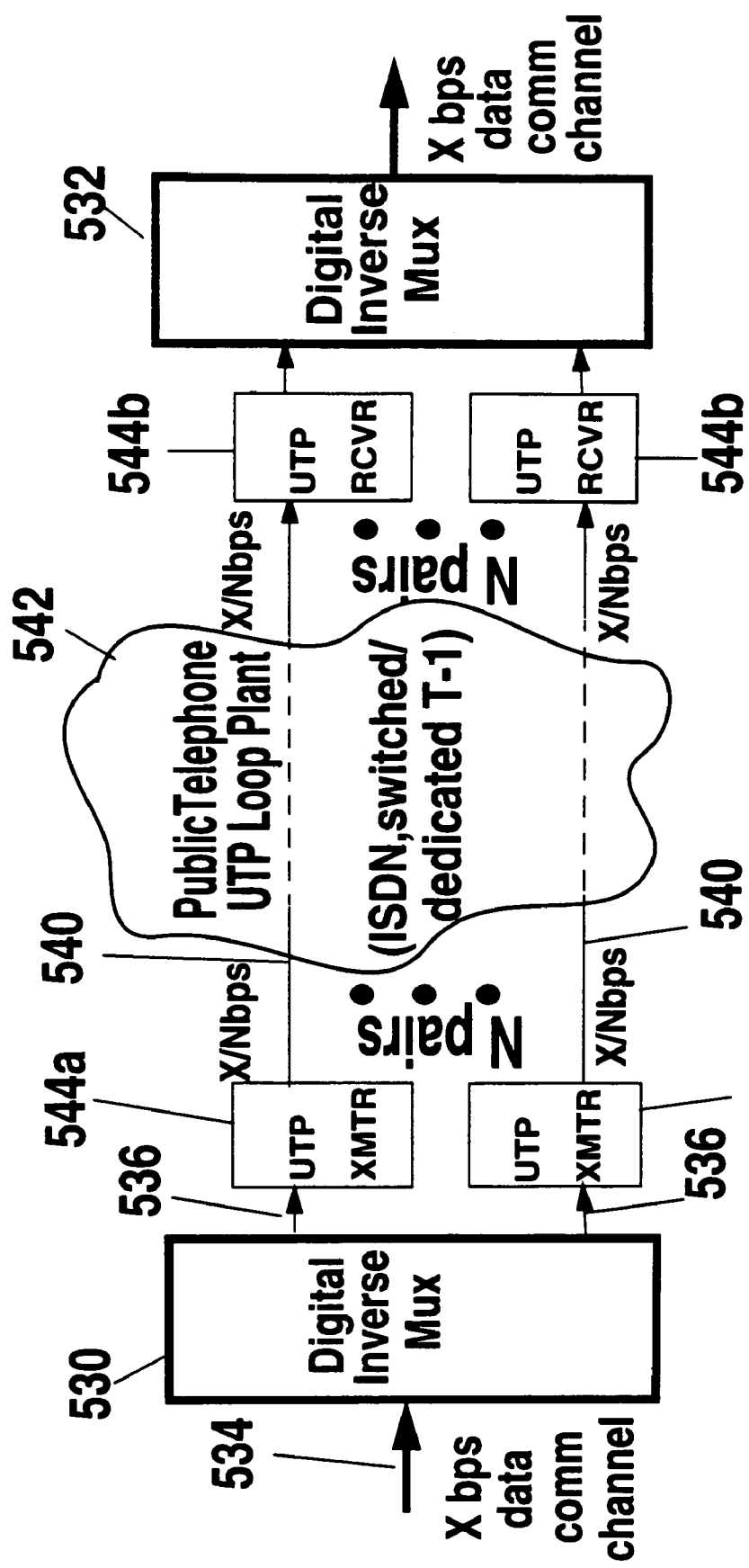
FIG. 17 is a block diagram of a system for transmitting data signals over multiple twisted pair links.

Embodiments of the present invention may directly employ UTP space division (i.e., an adaptation of digital inverse multiplexing) in many ways. For digital control/image/data-communications signals, as illustrated in FIG. 17, inverse multiplexers 530 and 532 are used to transform higher bit rate digital signals 534 into a plurality of lower bit-rate signals 536. Preferably, each of the lower bit-rate signals 536 has a bit rate higher than that for an ISDN basic rate interface. These lower bit-rate digital signals are encoded for transmission over a UTP 540 within the public telephone UTP loop plant 542 by means of UTP transceivers 544. The UTP transceivers 544 include UTP transmitters 544a and UTP receivers 544b. Upon receiving the lower bit-rate signals, one of the inverse multiplexers 530 and 532 reconstructs the original signal.

Figure 18:
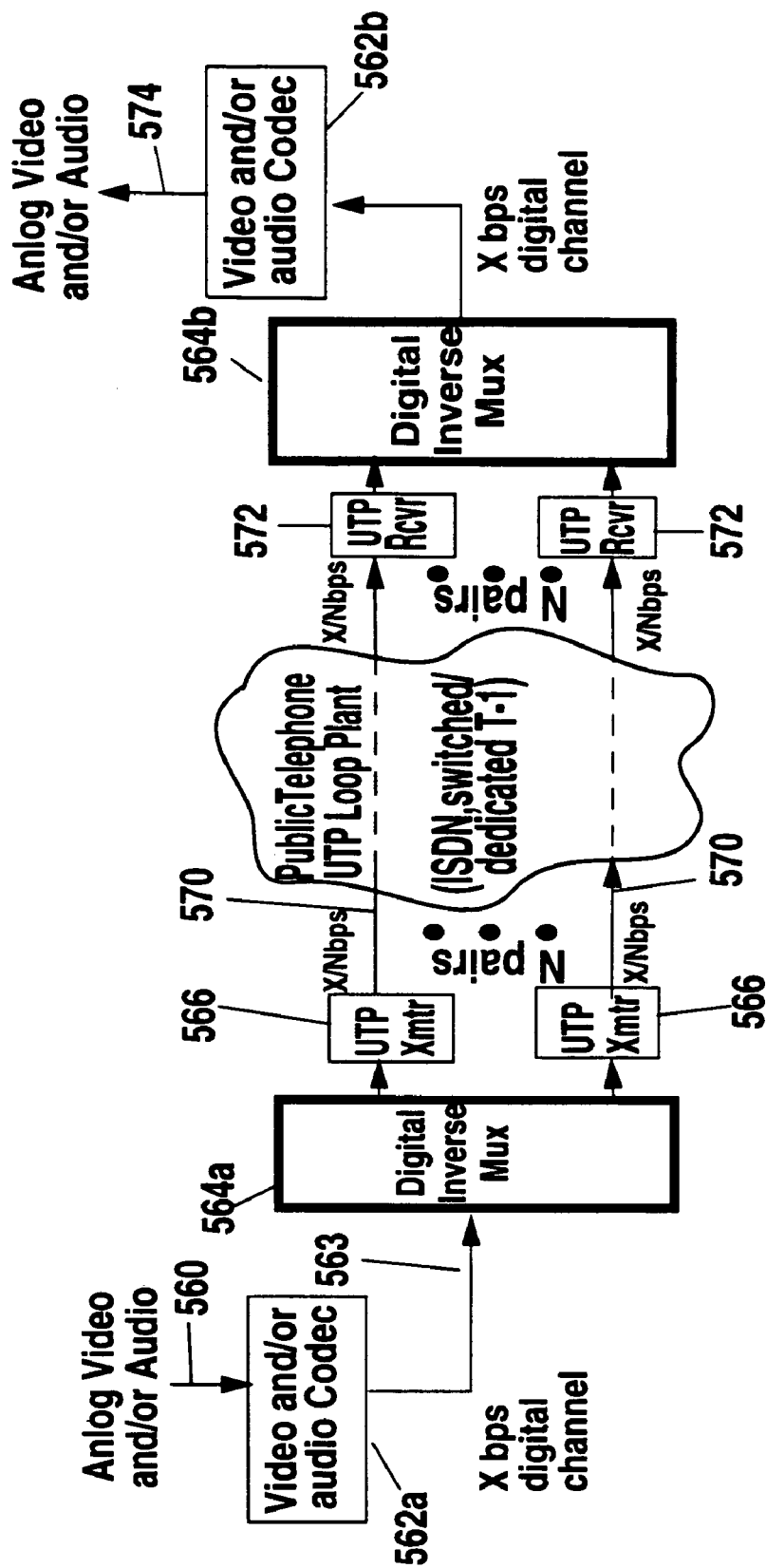
FIG. 18 is a block diagram of a system for transmitting video and audio signals over multiple twisted pair links.

For video and audio signals, as illustrated in FIG. 18, digital conversions and compression of a signal 560 is performed via a codec 562a. The codec 562a is capable of producing a digital signal 563 based upon the received analog audio or video signal 560. An inverse multiplexer 564a is used to create lower bit-rate signals from the digital signal 563. These lower bit rate signals are processed by transmitters 566 for transmission over a UTP 570 to receivers 572. The received signals are presented to an inverse multiplexer 564b which produces a reconstruction of the digital signal 563. The reconstruction is presented to the codec 562b which then creates a reconstructed analog signal 574 approximately identical to the original signal 560.

Next, an adapted inverse multiplexer method is presented. Conventional inverse multiplexers are designed for use with TNI and the types of digital communications channels provided by common carriers. For a UTP application, use of TNI often is an added complication as most likely all signals will be in an NTNI format. Further, the functions needed to work with the types of digital communications channels provided by common carriers are excessive for the UTP application. Thus, a preferred implementation of the invention utilizes digital inverse multiplexing to realize space-division UTP with digital inverse multiplexing methods optimized for space-division UTP.

In a public UTP loop plant, the propagation speed is typically in the $3.3–6.6 \times 10^8$ feet/sec range (i.e, between half and full speed of light in a vacuum). As a result, the physical length of a baseband bit period within the wire is approximately 330–660 feet for a 1 Mbps signal. Consequently, there is approximately a 1 bit skew in timing differential for each 330–660 feet length difference between any two UTP. Thus, for a public UTP loop plant, which by its loop architectural and operational policies can assume a maximum differential distance $-L_{max}$ among a collection of UTP to be used in a space division transmission system, it is possible to bound the maximum bit timing skew at a given bit-rate by some related value $-B_{max}$ bits. In practice, because of rise-times and fall-times resulting from uncorrected dispersion in the wire, the value of $-B_{max}$ may be effectively greater than divided by the physical length of a baseband bit period; the exact relationship depends on the selected transceiver implementations.

For a 1 Mbps digital stream and a $-L_{max}<200$ feet among a collection of UTP used in a space division transmission system, bit skew correction is not typically necessary. For a 2 Mbps digital stream and a $-L_{max}<200$ feet among the collection of UTP used in a space division transmission system, only up to 2 bit periods of skew are typically encountered. For a 1 Mbps digital stream and a $-L_{max}<600$ feet among the collection of UTP, only up to 3 bit periods of skew are typically encountered. For a 2 Mbps digital stream and a $-L_{max}<600$ feet among the collection of UTP, only up to 6 bit periods of skew are typically encountered.

To implement an adapted inverse multiplexer matched to the needs of UTP space division, the following simplified approach can be used. Each transmitting digital inverse multiplexer is made capable of transmitting a calibrating one-bit transition pattern, upon a command over the UTP loop, to provide an auto-calibrating mode. Each receiving digital inverse multiplexer applies each of the signals received over the plurality of UTPs to one of a plurality of dedicated shift registers. Each of the shift registers is clocked by a free-running clock operating at a multiple M of the expected operating bit rate of the UTP channel. Typically, the shift registers comprise a small number of stages (i.e. M times $-B_{max}$). Typically, M is a small integer such as 2, 3, or 4. Since each arriving bit in the received digital signal is effectively sampled a multiple number of times, it is possible to more accurately isolate the edges and center of the calibrating one-bit transition pattern. As a result, bit detection and channel delay can be more accurately identified.

In an auto-calibrating mode, based on the resulting received bit pattern distributed within the plurality of shift registers, the shift register tap corresponding to the center of the received bit pattern is selected as the point to receive the differential-delay-compensated stream for each UTP channel when taken out of calibration mode and put into operating mode. The transmitter 530 and receiver 532 is then put in the operating mode: each differential-delay-compensated UTP channel is connected to ports on serial-to-parallel converters at the transmitter 530 and parallel-to-serial converters at the receiver 532.

In addition, it is possible to divide an analog signal of a given bandwidth across a plurality of lower bandwidth channels for space division transmission. This has been used, for example, for voice-grade telephone audio in U.S. Pat. No. 5,136,575 to Kuroda where an audio signal is split into two bands and each band is separately transmitted. Using a suitable design approach, analog space division can be applied to divide a high bandwidth analog signal, such as an NTSC/PAL/SECAM video signal, into multiple channels for space division transmission over multiple UTPs.

Figure 19:
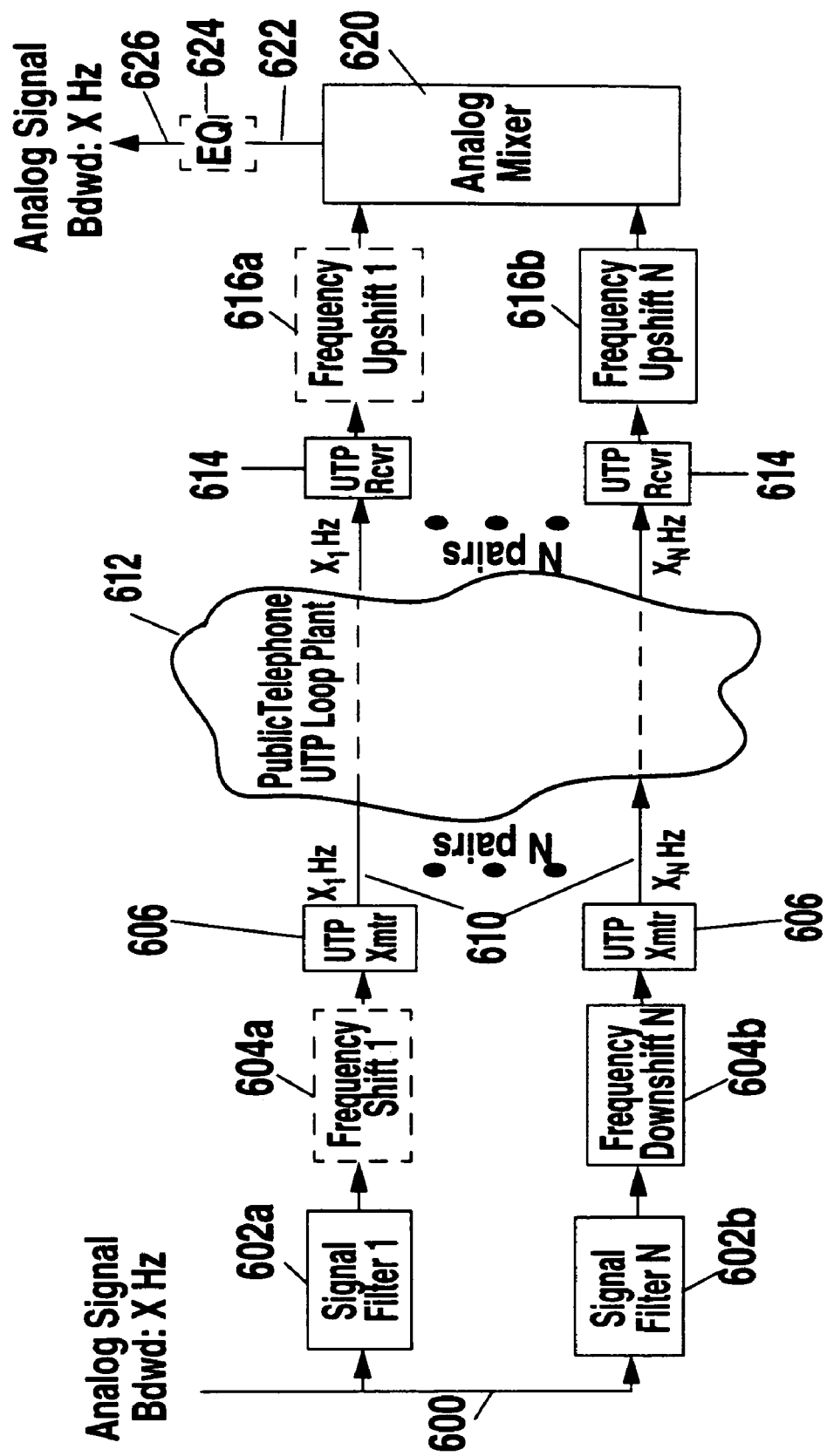
FIG. 19 is a block diagram of a system for transmitting a single analog signal over multiple twisted pair links.

FIG. 19 is a block diagram of a general frequency-division system for splitting an analog signal into a plurality of bands for transmission over a plurality of UTP channels, and for reconstructing the signal at a receiving end. An analog signal 600 with bandwidth X is presented to a bank of N signal filters 602. The signal filters 602 split the analog signal 600 into N minimum-overlapping frequency bands and provide a separate output for each band. The signal filters 602 may be implemented with either digital or analog systems in accordance with quality, cost, and manufacturing-scale trade-offs.

The lowest frequency filter 602a may be low-pass or band-pass; low-pass is often an essential choice for a baseband signal that contains DC or very low frequency components (such as video luminance signals). The highest frequency filter 602b may be high-pass or band-pass; band-pass is often an essential choice for high-frequency noise immunity. All other filters are band-pass. Ideally, the transition bands for the filters 602 are sharp with well-behaved phase and amplitude characteristics. It is typically advantageous to use filters whose adjacent bands are such that the overlapping transition bands sum to the original signal amplitude and phase throughout the transition band. An example of such a filter is the Linkwitz-Riley filter often used at audio frequencies in active audio crossovers.

The outputs of the N filters 602 are applied to a corresponding bank of N-1 or N frequency shifters 604 (or, more generally, N-1 to N remodulators). The lowest frequency band need not be frequency shifted, but could benefit from it if the original signal 600 does not have low frequency components. In this case, a downshift may be advantageous to lower the bandwidth required for UTP transmission of the lowest frequency band. Putting the signal on a carrier so as to gain immunity from transmission system abnormalities is beneficial, as is done in U.S. Pat. Nos. 3,723,653 and 3,974,337 to Tatsuawa. Since the frequency shifters may provide such immunity from transmission system abnormalities to the other bands, it may be advantageous to treat the lowest band in a similar manner.

If the lowest frequency band is not frequency shifted, frequency shifter 604a is not included in the bank of frequency shifters. The frequency shifters 604 provide frequency down shifting to move the particular band served down to near baseband (i.e., having a lowest frequency very near zero Hz) for the channel. Each signal emerging from the filters 602 has a bandwidth, measured from the zero frequency DC to the highest frequency component, significantly less than the bandwidth X of the original signal 600. Further, the sum of all the bandwidths from the frequency shifters 604 (plus any unshifted low frequency band should frequency shifter 604a be omitted) preferably sums to only slightly more than the bandwidth X of the original signal. The difference between this sum and X corresponds to the effective overlap of the N bands. Such overlap is needed to ensure all frequency components of the original signal are included in the collection of N bands, but otherwise in general cases wastes transmission bandwidth and should be minimized.

The N bands output from the frequency shifters 604 are presented to a bank of N UTP transmitters 606 which put the signal out over N pairs of UTP 610 in a public telephone UTP loop plant 612. Each band is received by a corresponding one of a bank of UTP receivers 614. The transceiver outputs are then presented to a bank of N-1 to N frequency shifters 616 (or, more generally, N-1 to N remodulators). If the frequency shifter 604a is omitted, then frequency shifter 616a is omitted as well. Otherwise, all frequency shifters in the receiving site undo the frequency shifting performed by the transmitting site frequency shifters 604.

An analog mixer 620 recombines the bands to form an unequalized replica 622 of the original analog signal 600. The unequalized replica signal 622 can be improved by passing it through an optional equalizing filter 624 to compensate for phase and amplitude variations encountered where the transition regions of a consecutive pairs of bands overlap. The output 626 of the equalizing filter 624 is an improved replica of the original analog signal 600.

Although illustrated in terms of frequency shifting, embodiments of the present invention are not limited to this specific form of remodulation. Hence, a plurality of remodulators may be substituted for the frequency shifters in the above-described embodiments. Further, a remodulator may be substituted for a frequency shifter in embodiments described hereinafter.

Figure 20:
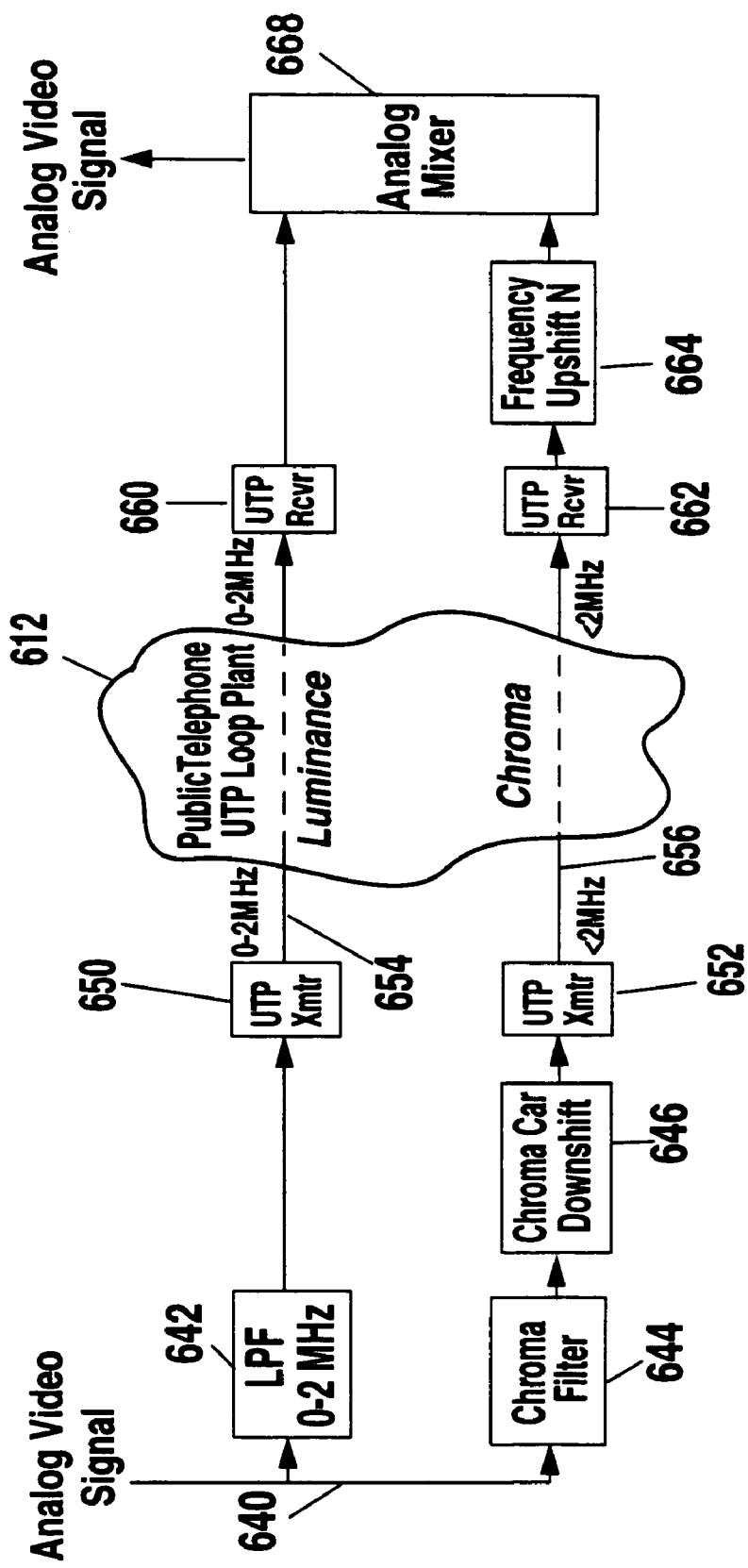
FIG. 20 is a block diagram of a system for transmitting a single analog video signal over two twisted pair links.

An alternative system for implementing space division transmission of NTSC/PAL/SECAM analog video signals over two UTPs is illustrated in FIG. 20. This system has the advantages of being relatively inexpensive to implement, degrades smoothly as the transmission bandwidth become limited, and readily supports the introduction of audio.

A composite NTSC/PAL/SECAM analog video signal 640 is applied to a low-pass filter 642 and a band-pass filter 644. The band-pass filter 644 is tuned to pass a chroma carrier signal and sidebands associated therewith contained within the video signal 640. The low-pass filter 642 is tuned to roll off at a frequency below the chroma carrier signal and the sidebands. The output of the low-pass filter 642 provides a luminance component contained within the video signal 640 up to the cutoff frequency of the low-pass filter 642.

The pair of separated signals from the output of the filters 642 and 644 is similar to the Y-C component format (such as used in SVHS video) with the exception that the luminance band need not be as wide (and in most practical long distance analog UTP space-division implementations is not as wide). If the source happens to already be in Y-C format, rather than a composite format, the filters 640 and 642 can be omitted; instead, the Y component provides the luminance signal and the C component provides the chrominance signal.

The chrominance signal in a composite NTSC/PAL/SE-CAM analog video signal includes an amplitude and phase modulated 3.58 MHz carrier residing above the highest luminance frequency. In Y—C component format, the luminance signal can overlap into the chroma band which is carried on a physically separate circuit. The amplitude and phase modulation is actually quadrature amplitude modulation; one component (less sensitive color information) has a bandwidth of approximately 0.5 MHz and is transmitted double-sideband, the other component (more sensitive color information) has a wider bandwidth of approximately 1.8 MHz and is transmitted via a lower single-sideband. Since the carrier is at approximately 3.58 MHz, the 2 MHz-wide chrominance band lies in the contiguous band of 2.1 to 4.15 MHz. Because of these properties, a simplified approach to chrominance signal frequency shifting can be implemented, as described below.

In a first approach, the carrier is mixed with a sinusoidal reference to create a linear offset for each frequency in the chrominance spectrum. In an improved approach, conventional chrominance decoders are used to obtain and remodulate two raw baseband chrominance components. This approach is attractive because integrated circuits exist which perform the functions of the filters 642 and 644, and separate the chrominance component. The remodulation scheme transmits the two chrominance components in a band whose width is less than 2 MHz, for example, the chroma carrier can be put at 1 to 1.8 MHz. If the new carrier is less than 1.8 MHz in frequency, the wider-bandwidth chrominance component can be filtered to a bandwidth whose value is slightly less than this carrier frequency; this introduces only slight color distortion. However, by lowering the carrier frequency, longer distances of UTP can be supported. Remodulation can be done using commercially available composite video signal chip sets, as used in VCRs and camcorders, but fed with a lower-than-normal carrier reference oscillator frequency. The resulting (or other implementation) chrominance frequency shifter 646 operates on the chrominance signal to produce a signal whose bandwidth is less than 2 MHz.

The two space-division signals, at the output of the low-pass filter 642 and the chrominance frequency shifter 646, split the original 4.1 MHz NTSC/PAL/SECAM analog video signal 640 into two signals of about half this bandwidth. These signals are then presented to UTP transmitters 650 and 652 for transmission over UTPs 654 and 656 for reception by UTP receivers 660 and 662. The UTP receiver 660 recovers the baseband luminance signal, while UTP receiver 662 recovers the frequency downshifted chrominance signal. The frequency downshifted chrominance signal is frequency shifted back up to its original format by a frequency shifter 664.

If the approach described above is used for the downshifting, the received signals are again demodulated (preferably using a commercially-available integrated circuit with a lower-than-normal carrier reference oscillator frequency applied thereto), separated into luminance and both chronminance components, and remodulated using a commercially-available integrated circuit with a standard carrier reference oscillator frequency applied thereto. The resulting implementation of a chrominance carrier frequency upshifter 664 creates a replica chroma signal which is combined with the luminance signal using an analog mixer 668 to produce a replica video signal. Since the luminance band is fully contained within signal produced by the UTP receiver 660, and the chrominance band is fully contained within signal produced by the frequency shifter 664, the mixing needs no equalization as there is a guard band between the luminance and chrominance bands.

Although it is not specifically shown in FIG. 20, the arrangement discussed thus far can be further enhanced by inclusion of single-sideband FM transmission in the baseband path at a carrier frequency only slightly higher than the full baseband channel bandwidth. This approach is disclosed in U.S. Pat. Nos. 3,723,653 and 3,974,337. As a result, all signals in the space division system may be sent by means of FM, giving uniform noise and attenuation variation immunity.

Figure 21:
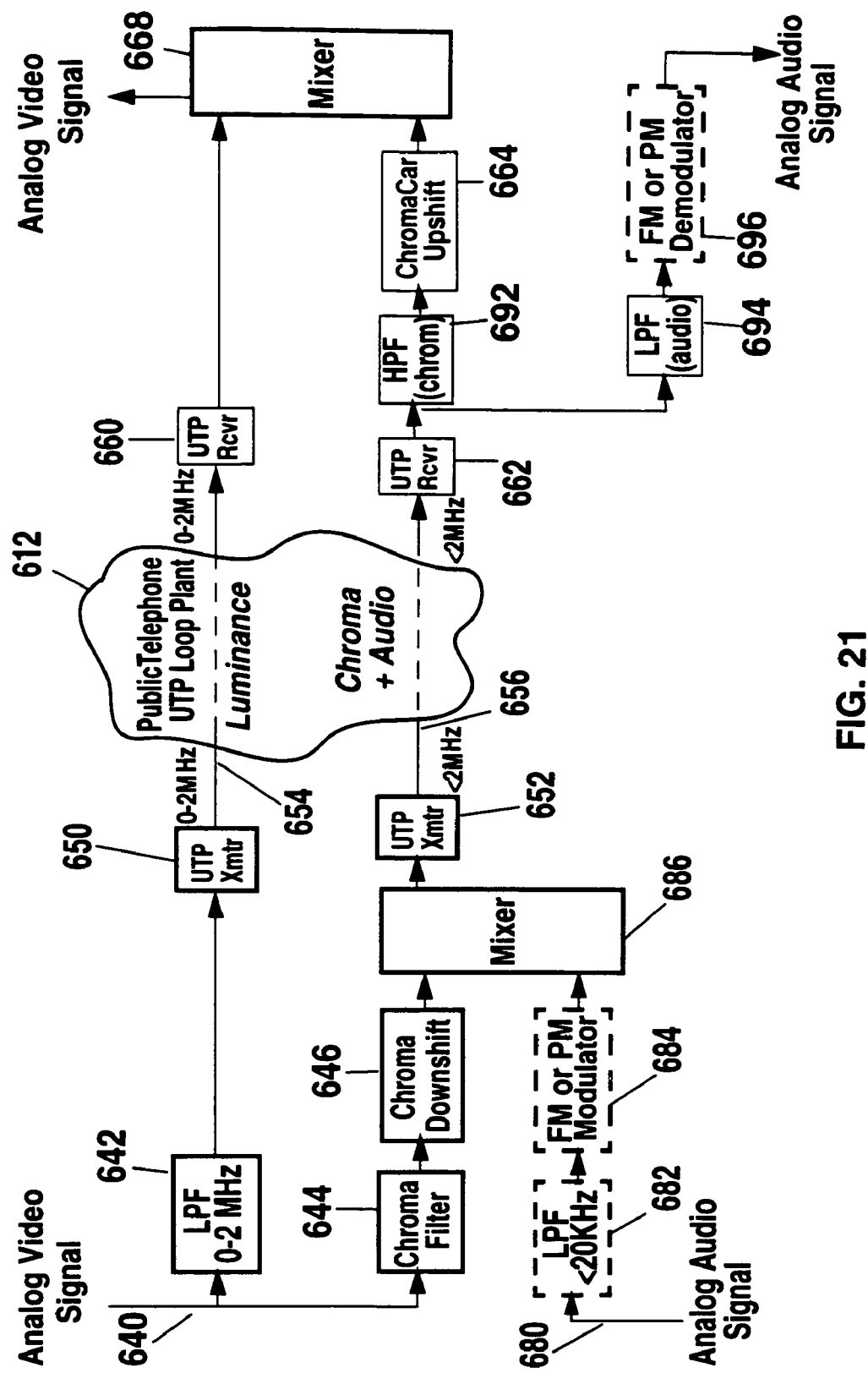
FIG. 21 is a block diagram of a space division transmission system of FIG. 20 which includes an audio signal.

FIG. 21 is a block diagram of a space division transmission system wherein an audio signal is introduced. Specifically, a baseband or an FM or PM audio signal is inserted into the chrominance UTP signal path in this embodiment. This results in the use of two UTPs in each direction, as in the NVT and Lightwave products, but with a longer maximum distance limitation due to better use of the bandwidth above audio frequencies on the second UTP.

The arrangement of many of the elements illustrated in FIG. 21 is identical to the arrangement in FIG. 20, but additional elements have been incorporated. An analog audio signal 680 is introduced and, if not already assured to be band-limited to 20 kHz, is filtered by an optional low-pass filter 682 to some maximum frequency less than 20 kHz. The resulting signal is presented to an optional FM or PM modulator 684 and then to a mixer 686, or else is applied directly to the mixer 686. The mixer 686 combines the signal applied thereto with the carrier-downshifted chroma signal which has been shifted by the frequency shifter 646 so that the pass-bands of the two mixed signals do not overlap. The mixer 686 produces a combined signal which is then presented to the UTP transmitter 652. The combined signal is transmitted over the associated UTP 656 for reception by the associated UTP receiver 662.

The signal produced by the UTP receiver 662 is applied to a high-pass filter 692 (or, alternatively, a bandpass filter) which passes the chroma signal. The remaining steps of video processing occur as described in the embodiment of FIG. 19. The signal produced by the UTP receiver 662 is also presented to a low-pass filter 694 which only passes the audio portion of the received signal. If an FM or PM modulator 684 is used on the transmit side, the output of the filter is then presented to a corresponding FM or PM demodulator 696 which produces a replica audio signal. If no FM or PM modulator 684 is used on the transmit side, the output of the filter 694 directly produces the replica audio signal.

An alternative method for introducing audio into the arrangement of FIG. 20 includes a step of inserting normalized PAM (pulse amplitude modulation) in the horizontal synchronization pulse stream, and a step of substituting the resulting signal for the analog video signal 640. The received replica is then passed to a matching audio/video recovery device. Methods for transmitting audio by similar means have been used in video transmission links for many years; for example, the NICAM system employed by the BBC.

Transmitting video-band or data signals over UTP lengths longer than 200 to 400 feet typically require frequency-dependent amplitude and phase compensation to correct for the effects of loss and phase-dispersion which occur with increasing significance as wire lengths increase. Such compensation increases the possible transmission distance, but the parameters of the compensation depend on the distance and the gauge of the wire.

In public telephone network loop plants, the UTP running between a user premises and central office is typically made up of several smaller segments serving only parts of the total path which are linked ("cross-connected") as needed. As telephone subscribers start and stop services, a given segment is cross-connected, freed-up, and cross-connected again—possibly to a run with a far different total path. In situations with bidirectional transmission, multiple UTPs, and such significant volatility in the reuse of segments of UTP runs, manually adjusting compensation parameters at the installation of a new service subscription can be problematic. A means for automatic adjustment of compensation parameters over the full range of UTP distance is a significant factor in reducing the deployment cost of the multimedia telecommunication system.

Various circuit techniques, such as employment of emitter follower drive as described in U.S. Pat. No. 3,456,206 to Kwartiroff et al., can be used to reduce the sensitivity of compensation to variation in the length of the UTP. Although these circuit techniques provide a valuable degree of distance insensitivity, wider ranges of distances still require adjustable compensation. Based on known attributes of UTP as a transmission line, self-adapting compensation approaches have been devised in the past, such as in U.S. Pat. No. 4,273,963 to Sidel and U.S. Pat. No. 3,568,100 to Tarbox. These methods use a fixed-order minimum-phase compensation network whose frequency compensation parameters are adjusted by a continuously variable element such as a transconductance multiplier or a (variable impedance) diode, resulting in a network presenting a complex-valued impedance which continuously varies with a continuously reference voltage or current. The reference voltage or current is supplied by an amplitude detector circuit, and these methods put the detector and compensator in a negative-feedback control loop. The Sidel patent also discloses cascading multiple stages to compensate for longer distances. However, due to loading effects within the lossy character of UTP transmission line that vary nonlinearly with distance, adaptive compensation for longer distances at video and data LAN bandwidths are problematic in that: (i) losses and phase shifts at a given frequency do not increase linearly with distance; (ii) the asymptotic 3 dB/octave behavior of the lossy transmission line transfer function becomes increasingly difficult to correct with simple low-order networks, rather a compensation circuit must begin to alternate −6 dB/octave poles and +6 dB/octave zeros with locations in geometric progression.

All of this increasingly becomes a battle of competing losing causes for long distances. Increased post-emphasis in the UTP receiver creates noise and crosstalk sensitivity while pre-emphasis in the transmitter increases noise and crosstalk generation. FCC guidelines (Title 47, Subchapter B, Part 68 and Title 47, Subchapter A, Part 15), which must be considered in transmitter design, also ultimately bound the potential benefits of pre-emphasis in the transmitter. These facts make the space-division techniques described previously, which lower the uppermost frequencies carried on a given UTP, more attractive for the longest ranges of UTP to be employed in the invention.

Figure 22:
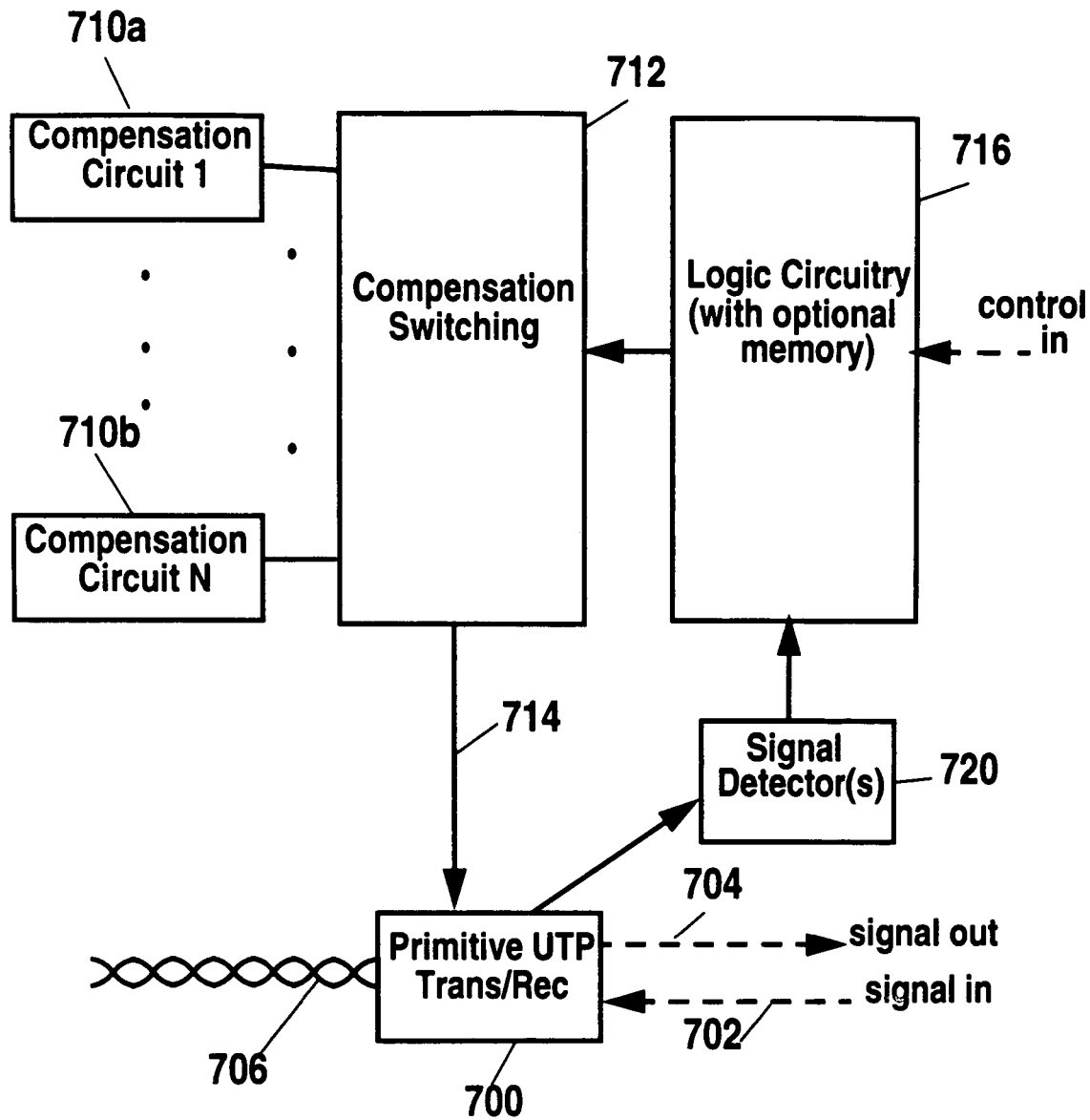
FIG. 22 is a block diagram of an automatic compensation system for twisted pair links.

To simultaneously maximize the length of UTP of a given gauge and the bandwidth which can be transmitted over it with a simple approach, the invention may optionally employ a simplified detector and discrete-step equalization circuitry. A general block diagram is shown in FIG. 22. A UTP receiver or transmitter or transceiver 700 is used to transform signals between a signal input 702 or a signal output 704, and a UTP 706. The UTP receiver or transmitter or transceiver 700 is responsive to one or more frequency compensation circuits 710. A wideband analog switch 712 connects the compensation circuits 710 to the UTP receiver/transmitter/transceiver 700 by a connection 714. The compensation circuits 710 may vary greatly in complexity; for example, a compensation circuit 710a might be designed for short lengths of UTP, while a compensation circuit 710b might be designed for very long lengths of UTP and hence be of increased complexity.

A selected one of the compensation circuits 710 is determined by logic circuitry 716 which acts upon information generated by one or more signal detectors 720. The signal detectors 720 examine specific attributes of signals presented to them from the UTP receiver or transmitter or transceiver 700. In addition, or alternatively, the choice of compensation may be made by an external controller.

The signal detectors 720 and logic circuitry 716 may have various implementations. For example, the signal detectors 720 may be designed to work with specific signal formats, such as analog video signals or raised-cosine bit symbols, and make measurements against known attributes of those signals, such as the sync pulses of analog video signals or specific transition intervals of raised-cosine bit symbols. The output from the signal detectors 720 would then be constantly monitored by the logic circuitry 716. As another example, the signal detectors 720 may only be monitored by the logic circuitry 716 when certain test signals are applied. The resulting selection of one of the compensation circuits 710 is stored in memory, thus requiring the logic circuitry 716 to include an electronic memory. In practice, it is preferred that the memory is non-volatile so as to be immune from power glitches.

The work of Ungerboeck in "Channel Coding with Multilevel/Pase Signals," IEEE TRANSACTIONS ON INFORMATION THEORY, Vol. 28, No. 1, January 1982, pp. 44–67, and subsequent developments such as AT&T's CAP (carrierless amplitude modulation phase modulation) have given rise to analog modulation techniques which can be used to carry relatively high bit-rates over relatively limited bandwidth analog lines. Using these techniques, 5–6 bits per second of digital bandwidth can be carried per Hertz of analog bandwidth. This can be scaled to arbitrarily high bandwidth and used on any linear analog transmission channel. For example, Silicon Design Experts, Inc. recently announced a chip design claiming 155 Mbps using 30 MHz of bandwidth on short (<100 meters) lengths of voice grade UTP. Embodiments of the present invention can employ these techniques to carry digital streams over public loop plant UTP. For example, using 64-point QAM and Veterbi encoding, reliable 5 Mbps data rates can be carried over 1 MHz of bandwidth, the bandwidth being among the worst available public loop plant UTP runs. Further, scaled-down versions of these techniques have been reported to deliver 1.5 Mbps T-1 service over 12,000 feet of unconditioned UTP loop plant in a 1989 trial of the so-called High-bandwidth Digital Subscriber Line (HDSL).

Even a modest-scale deployment can cost justify the fabrication of integrated circuits which perform the signal processing involved in implementing a 64-point QAM/Veterbi encoding chip. When combined with the space-division techniques described earlier, 10–20 Mbps digital connectivity can be provided for surprisingly little cost using NTNI over the public telephone loop plant. Preferably, these more advanced signal transmission methods are incorporated to further widen the bit rate possible over longer UTP runs.

The resulting digital channels can be used to expand the bandwidth of NTNI UTP channels transmitting digital streams, such as directly-carried data signals from LAN ports, digital streams from V.35, RS-449, or similar interfaces from codecs, routers, and other wide area networking equipment.

Public telephone UTP loop plant for digital transmission of digital streams at fractional T-1 rates (but not TNI formats) can be utilized in accordance with the present invention. Typically, the equipment purchased by a business for wide area teleconferencing and data networking is designed to interface with one (or more) of the following:
(i) the voice telephone network interface;
(ii) non-ISDN switched 56 Kbps service interface (as in AT&T Accunet);
(iii) ISDN Basic Rate services interface
(iv) V.35 interfaces to T-carrier interfacing equipment;
(v) RS-449 interfaces to T-carrier interfacing equipment; or
(vi) T-carrier interfaces directly.

Cases (i) to (iii) and (vi) are well served by TNI-based services. Cases (iv) and (v) may be more economically served by NTNI using UTP.

Typically V.35 and RS-449 interfaces are used to carry signals in excess of 64 kbps to switching and multiplexing equipment which, in turn, is interfaced to T-carrier TNI services. V.35 and RS-449 are not directly supported by public telephone networks. It is possible, however, to carry V.35 and RS-449 streams in near-raw form over UTP to switching and/or multiplexer farms within a nearby multimedia central office. The logic and conversion circuitry can be implemented in a field programmable logic chip.

Figure 23:
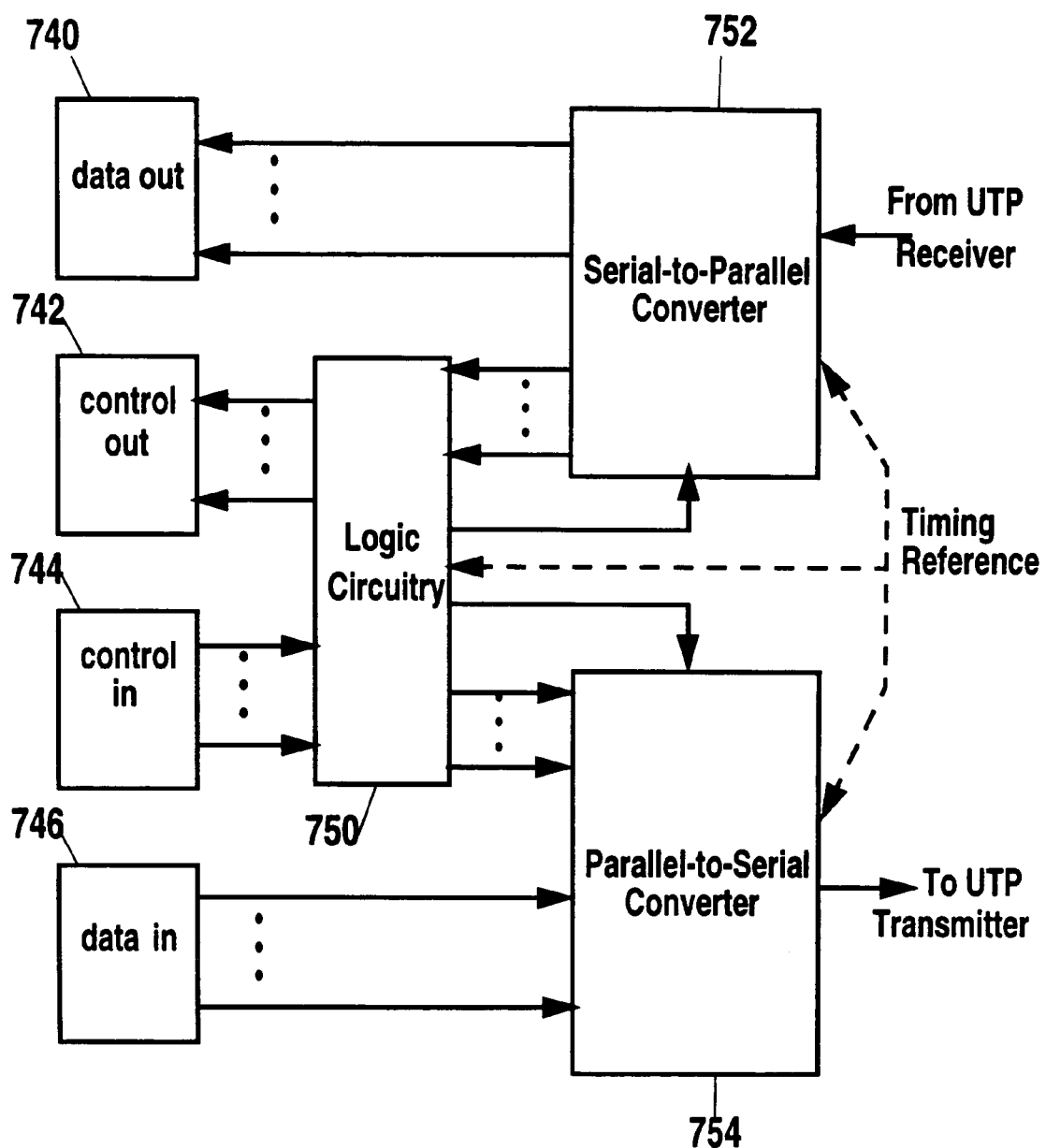
FIG. 23 is a block diagram of a system for carrying a digital stream in near-raw form over twisted pair links.

FIG. 23 is a block diagram of an interface for carrying either V.35, RS-449, or other similar streams in nearly raw form over a UTP. The interface comprises one or more data output circuits 740, one or more control output circuits 742, one or more control input circuits 744, and one or more data input circuits 746. The control circuits 742 and 744 govern the timing and validity of the signals on the data circuits 740 and 746. The control circuits 272 and 244 are coupled to a logic circuitry 750 which uses some of these signals to control a serial-to-parallel converter 752 and a parallel-to-serial converter 754. The logic circuitry 750 also exchanges passed control signals and/or derived control signals with the serial-to-parallel converter 752 and the parallel-to-serial converter 754.

The serial-to-parallel converter 752, parallel-to-serial converter 754, and logic circuitry 750 are clocked at a rate which is some multiple of the data rate of the V.35, RS-449, or other similar interface. Timing information may be provided by a sufficiently fast free-running clock or by a frequency-multiplying phase-locked loop (i.e., a phase-locked loop with a divide-by-N frequency-dividing counter within its feedback loop) which tracks an externally-received timing signal. The serial-to-parallel converter 752 and the parallel-to-serial converters 754 also exchange information with the UTP receiver and transmitter.

Figure 24:
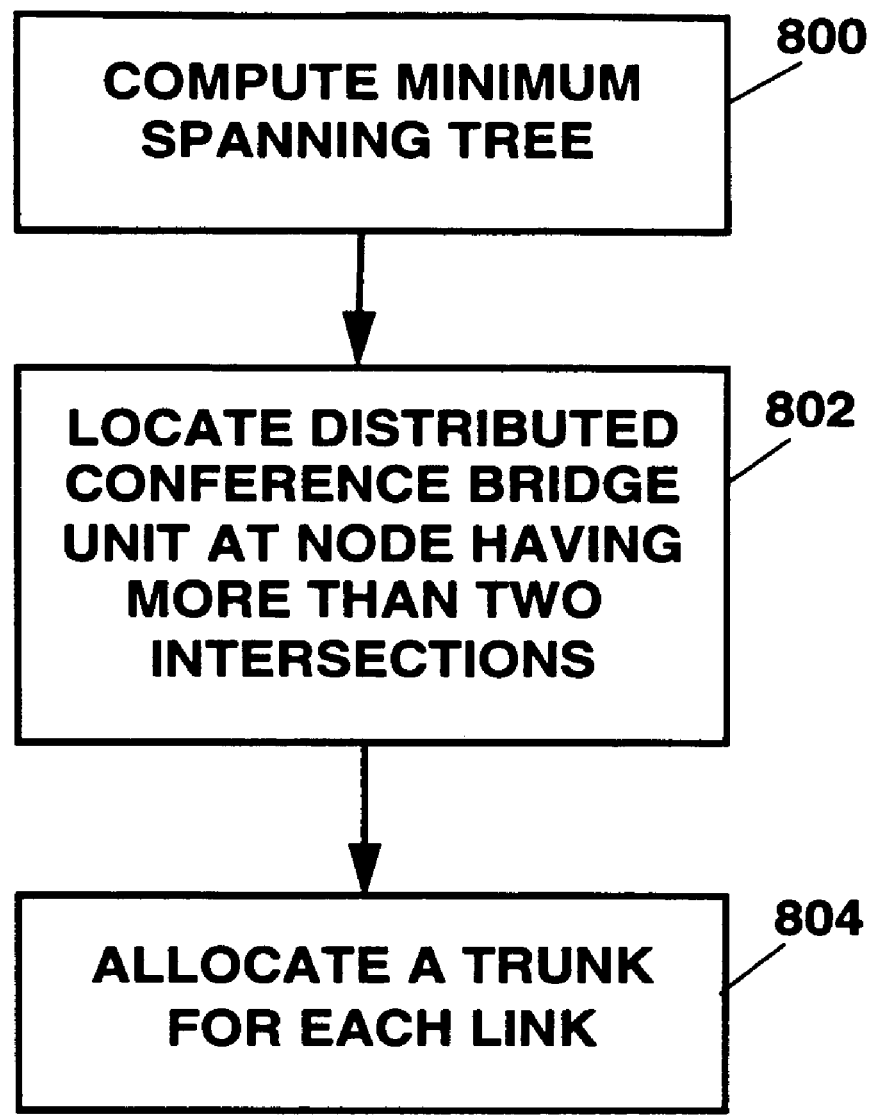
FIG. 24 is a flow chart of a method of locating distributed conferencing units.

For a multi-point conference implemented by a distributed conference bridge, it is desirable to locate the distributed conference units so as to reduce the trunking cost associated therewith. FIG. 24 is a flow chart of an embodiment of a method of locating distributed conferencing units which provides a minimal trunking cost.

As indicated by block 800, a step of computing a minimum spanning tree across the network topology is performed for the specific collection of participants in the conference. The minimum spanning tree may be computed by finding a trunk routing for a centralized conference bridge, and modifying the results by collapsing any multiple trunk allocations between a pair of nodes into a single link therebetween. As indicated by block 802, a distributed conference bridge unit is located at each node in the minimum spanning tree having more than two intersections. As indicated by block 804, one trunk is allocated for each link of the minimum spanning tree. Preferably, each distributed conference bridge unit performs a function dictated by its position in the spanning tree and the overall topology of the spanning tree.

The number of distributed conference bridge units needed at each office may be found using a method similar to the method of FIG. 13. Here, the step indicated by block 426 is modified so as to assign optimal locations to all distributed conference bridge units (by means, for example, of the minimum spanning tree method described above) relevant to each conference topology class.

To serve a wide range of multi-point video and audio conferencing needs for a large population, it may be advantageous to create a specialized conference bridge server having an internal architecture optimized to serve a needed collection of features. The features which may be provided include: (i) centralized conference bridge units; (ii) distributed conference bridge units serving various conference topology classes; (iii) allowing varying numbers of participants up to the maximum video mosaic and audio mixing capacities; (iv) allowing varying maximum video mosaic and audio mixing capacities; (v) allowing varying numbers of participants above the mosaic capacity but constrained by some other bound; (vi) one or more close-up features; (vii) individual view control features, such as private video close-up selection, video mosaic content selection, and video or spatial audio layout selection; (vii) one or more compression schemes, including H.360 and other algorithms, with one or more parameter variations (such as resolution and bit rate); (ix) pixel, DCT, and/or VLC domain compositing; and (x) support of multiple input and output streams including analog video, switched Ethernet, and JPEG/MPEG.

An architecture for a conference bridge server may be optimized for the specific collection of features to be spanned and overall traffic capacity requirements. The potential for optimization results from a flexible configuration of smaller element pools which provides for reuse of elements. In contrast, a fixed configuration of the smaller elements results in inefficient use of much of the hardware.

Figure 25:
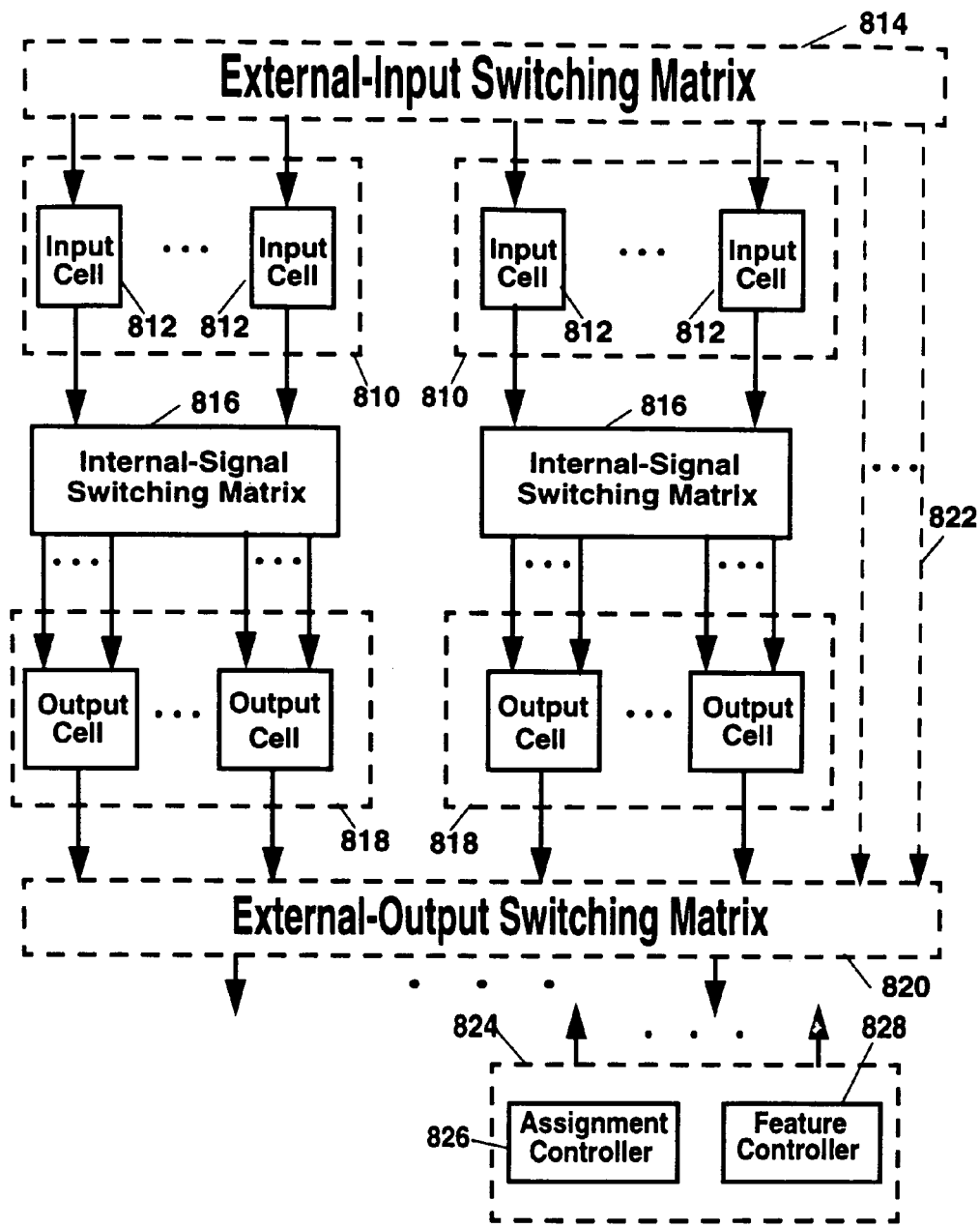
FIG. 25 is a block diagram of an embodiment of a server.

An embodiment of a server which provides a collection of the above-described features is illustrated in FIG. 25. A plurality of incoming video and audio signals from various sources are applied to a plurality of input cell groups 810. Each of the input cell groups 810 contains one or more input cells 812. The input cells 812 are capable of accepting different signal formats, and performing initial processing steps such as video sampling for compositing. An optional external-input switch 814 may be included to connect the incoming signals to the input cell groups 810. In cases where the signals come from a single source, such as a single office switch, the external-input switch 814 is most likely not necessary; its role is to give all inputs equal or near-equal access all input cells 812.

Each of the input cell groups 810 presents a processed signal to a corresponding internal-signal switching matrix 816 dedicated to the group. Preferably, each internal switching matrix 816 is implemented as a card-cage backplane, although this is not required. Each internal-signal switching matrix 816 has a corresponding pool of output cells 818 dedicated thereto. The internal-signal switching matrix 816 directs selected signals received from the input cell group 810 to specific inputs of the output cells 818. Effectively, each of the output cells 818 has as many inputs as the maximum number of participants supported by the conference bridge. The output cells 818 assemble video composites and perform audio mixing from signal inputs. The output cells 818 also produce output signals in the desired output signal format. A group of output cells, as well as the internal-signal switch 816, may be implemented virtually within a single, high-throughput, dedicated-architecture, real-time video image processor.

Optionally, the output cells 818 are coupled to an external-output switching matrix 820 which provides the output signals. One or more straight-through links 822 may be connected between the external-input switch 814 and the external-output switch 820. The external-output switch 820 provides equal or near-equal access of the output cells 818 to the outputs. In cases where the outputs go to a single sink, such as a single office switch, the external-output switch 820 is most likely not necessary; in this case the outputs of the output cells 818 can be directly presented as the output signals.

The external-input switch 814, the external output switch 820, the internal-signal switches 816, the input cells 812, and the output cells 818 all may be controlled by a controller 824 in communication therewith. It may be advantageous for at least the software of the controller 824 to be comprised of two internal subsystems: a first controller subsystem 826 which governs the assignments of signal routing and parameters of cells, and a second controller subsystem 828 which handles variations in these assignments and parameters so as to implement service features such as individual views. The main reasons for this partition are: (i) the assignment controller 826 is best controlled in conjunction with the network while the feature controller 828 is best controlled by the users, and (ii) the assignment controller 826 may need to first allocate resources and control channel handles to activities spawned within the feature controller 828.

The internal-signal switching matrices 816, and optionally, the external-input switching matrix 814, and the external-output switching matrix 820, may be partitioned into separately controlled audio and video layers in order to separately process audio and video signals. When the audio and video signals of the external inputs and outputs are space-division modulated, the external-input switching matrix 814 and the external-output switching matrix 820 are preferably layered. When the audio and video signals of the external inputs and outputs are not presented in spacedivision, the input cells 812 and the output cells 818 may be required to further provide space-division separation and integration functions so that internal-signal switching matrices 816 can be implemented with space-division separation between the audio and video signals.

To perform a video close-up selection, appropriate audio sources are selected by the external-input switch 814 and presented to one of the input cells 812 allocated for audio layer processing (herein referred to as an audio layer input cell). If the audio and video signals are space-division modulated, then the audio layer input cell may only comprise a signal buffer amplifier. Outputs of appropriate audio layer input cells are selected by the internal-signal switch 816 and presented to one of the output cells 818 allocated to provide. Such audio mixing functions may include "minus-one" audio mixing as described in U.S. patent application Ser. No. 08/131,523.

If the signals in the video layer are then in a single input format, an individual participant can select a video close-up using appropriate straight-through links 822 to connect an external video source to the appropriate external output. Here, the straight-through links 822 act as trunks between the external-input switch 814 and external-output switch 820. This trunking arrangement cuts down on switch complexity in comparison to merging the external-input switch 814 and the external-output switch 820 into a single switch, which requires a considerably larger switch resulting from many inefficiently used cross-points linking the external inputs and the external outputs. The use of straight-through links 822 allows a more efficient use of fewer cross-points, growing with "close-up" request traffic load rather than strictly with the number of inputs and outputs. Note that be appropriate controller design and voice detection, voice-activated switching of a full close-up can be implemented using these trunks but no input or output cell.

The case of video mosaicing of output cells is described. In one embodiment, the output cells 818 perform video compositing based upon a fixed compositing configuration. An example of a fixed compositing configuration is an N-by-N mosaic of full-motion video images, each image at 1/N pixel/unit-length resolution, where N is a fixed value (such as N=2). The mosaic area assigned to an image is determined by the connections made within the internal-signal switch 816, including any voice-detection selection of which participants to display (such as the last N that spoke). Consequently, the output cells 818 in such an implementation do not require any parameters be passed from the controller 824. In another embodiment, the output cells 818 allow for more than a single choice of N (say $\{2, 3\}$ or $\{2, 3, 4\}$). In this case, the controller 824 passes a value of N to the output cells 818.

In practice, the mixing of multiple audio streams is less costly than video compositing. Consequently, for a large conference of M participants, it is economical to mix the audio of all participants but only display the video of N (with N<M) of the participants.

The above-described embodiments allow a participant to privately select a composite view based upon an output cell, a close-up, or any video source routed to the output cell. For example, all participants could initially be provided with a common video mosaic produced by one output cell. If one or more participants in a given conference then request a different choice (or layout) of video compositing than other participants, additional output cells can be dynamically allocated. An output cell can be allocated for each participant in the conference, although this may be excessive in practice, even for centralized conference bridging. By sharing output cells across the total demand for distinctly different composites, the total number of output cells 818 and the complexity of the internal-signal switches 816 can be significantly reduced.

The above-described embodiments support both centralized and decentralized conference bridging functions. Since each of the output cells 818 performs video compositing, parameterized compositing may be performed with selected portions of the signal from a given one of the input cells 812. The resulting cropping capability, governed by parameters passed to the output cell by the controller 824, gives both a compositing and a cut-and-paste capability in a single output cell (as required for a distributed conference bridge unit).

Alternative embodiments which support multiple external signal formats (such as analog, switched Ethernet, and H.360) and multiple compositing approaches may be utilized. Here, signal conversions are done either externally to the architecture of FIG. 24, or within the input cells 812 and the output cells 818 (particularly for close-ups selections). If a collection of inhomogeneous signal formats is compatible with a single fabric, e.g., the fabric used for the external-input switch 814 and external-output switch 820, then the signal conversions may be performed within the input cells 472 and output cells 474. This is advantageous for many collections of multiple compressed digital signal formats.

Figure 26:
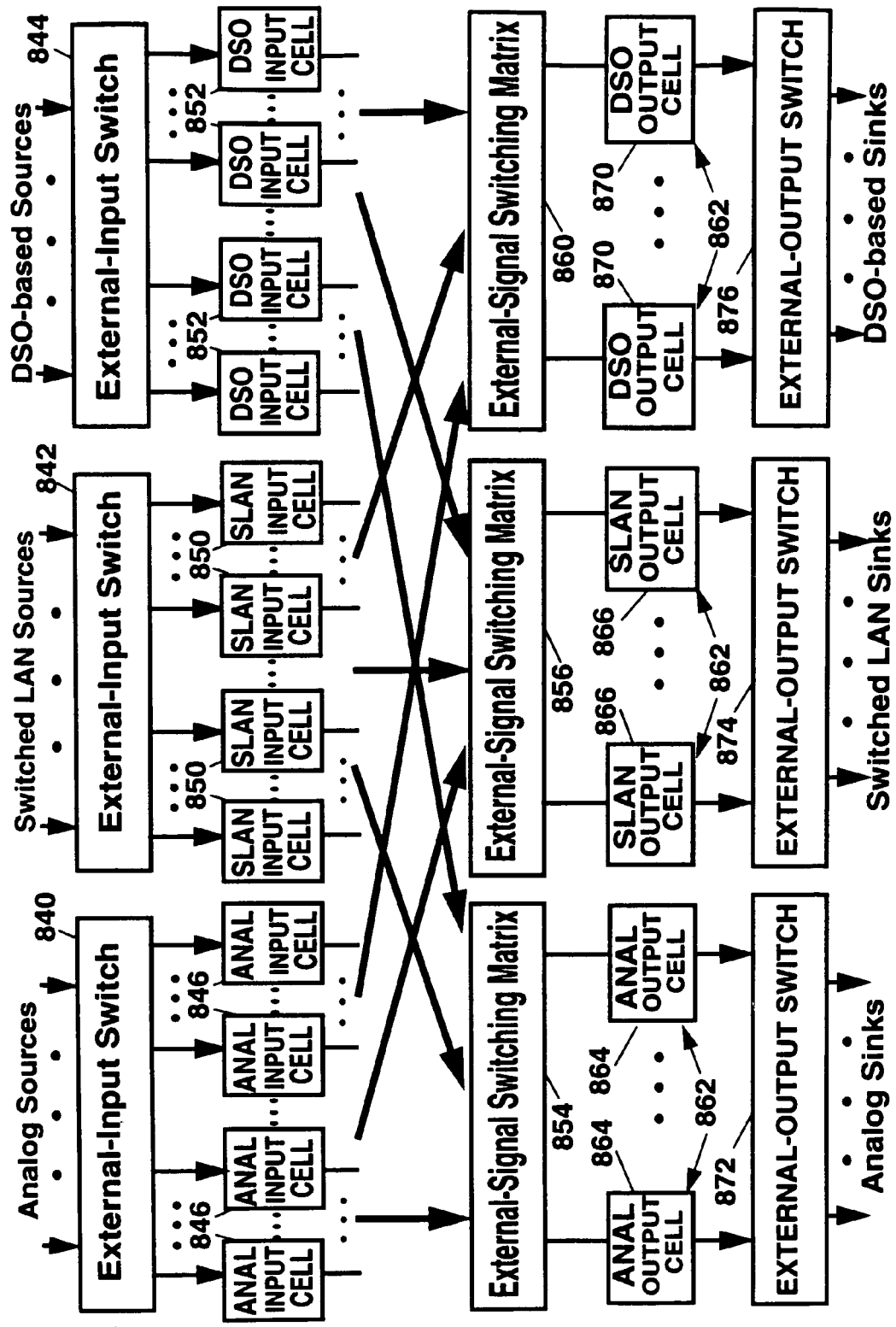
FIG. 26 is a block diagram of an alternative embodiment of a server capable of handling analog sources, switched LAN sources, and DS0-based sources.

FIG. 26 is a block diagram of an alternative conference bridge server capable of handling analog sources, switched LAN sources, and DS0-based sources. The analog sources produce analog signals in a format such as NTSC, PAL, and/or SECAM with some associated analog audio format. The switched LAN sources produce signals having a format such as JPEG, MPEG, and/or switched Ethernet with some associated switched-Ethernet-based audio format; ATM video and audio may also be handled in this manner. The DS0-based sources produce signals having a format such as H.320 and/or various video/audio compression algorithms as carried by ISDN and Fractional T-carrier.

The analog signals are applied to an external-input switch 840, the switched-LAN signals are applied to an external-input switch 842, and the DS0-based signals are applied to an external-input switch 844. Each of the external-input switches 840, 842, 844 are matched to the specific format of the signals applied thereto.

The external-input switch 840 is coupled to a plurality of input cells 846 having an input matched to the analog signal format and an output matched to one or more internally-convenient standards. Similarly, the external-input switch 842 is coupled to a plurality of input cells 850 having an input matched to the switched-LAN signal format and an output matched to the one or more internally-convenient standards. The external-input switch 844 is coupled to a plurality of input cells 852 having an input matched to the DS0-based signal format and an output matched to the one or more internally-convenient standards.

Internal-signal switching matrices 854, 856, and 860 connect the input cells 846, 850, and 852 to selected ones of a plurality of output cells 862 using the one or more internally-convenient standards. The output cells 862 contain a plurality of analog output cells 864, a plurality of switched-LAN output cells 866, and a plurality of DS0-based output cells 870. As illustrated, each of the internal-signal switching matrices 854, 856, and 860 is dedicated to a corresponding one of the groups of output cells 864, 866, and 870. Alternatively, each of the internal-signal switching matrices 854, 856, and 860 could be dedicated to a corresponding one of the groups of input cells 846, 850, and 852, wherein the output cells 862 are connected to each of the internal-signal switching matrices 854, 856, and 860.

The analog output cells 864 are coupled to an external-output switch 872 to provide analog signals to a plurality of analog sinks connected thereto. Similarly, the switched-LAN output cells 866 are coupled to an external-output switch 874 to provide switched-LAN signals to a plurality of switched-LAN sinks connected thereto. Further, the DS0-based output cells 864 are coupled to an external-output switch 876 to provide DS0-based signals to a plurality of DS0-based sinks connected thereto.

Using such an embodiment, any combination of acceptable signal formats served by cells in the architecture can be supported in an efficient, cost-effective manner. Further, the input cells and the output cells of each signal format are utilized quite efficiently; no cells need remain non-allocated if there is a participant of that signal format requesting a conference.

The number of cells dedicated to each signal format can be chosen from estimated traffic requirements in the same manner described earlier. The partitioning of the input cell connections among the dedicated internal-signal switching matrices 854, 856, and 860 can also be determined by traffic modeling. The following mutually exclusive traffic possibilities are common in practice: (i) no known or suspected correlations in the request patterns; or (ii) known or suspected correlations in the request patterns. In case (ii), some fraction of the conferences may use the same signal format, or certain combinations of two or more signal formats are known or suspected to be popular. The cited correlations are valuable in accurately sizing the cell requirements since batch-arrival effects can significantly increase blocking probabilities.

Window sharing may be incorporated in embodiments of the present invention. The utilization of static and dynamic directory services with sufficient data networking capacity and performance facilitates the incorporation of window sharing.

Preferably, the network provides directory services to video call and conference software. Either dynamic directory services or static directory services may be employed. The dynamic directory services are capable of capturing locations of active users based on log-in registration made available thereto. Further, the dynamic directory services are capable of capturing the status of a current user. The status may be indicative of a user workstation not responding, a user-invoked automatic call refusal, and/or call-forwarding information, for example. The static directory services are capable of capturing the capabilities of a workstation or other room-based equipment, and particular user preferences supported by the network.

Preferably, the dynamic directory servers are capable of rapid and concurrent propagation of data changes among the various directory servers. Further, recovery means for unexpected inconsistencies in static directories, and means for performing an active backup in case of isolated network computing or transmission failures are preferably included.

By including directory services, window sharing is capable of working directly with video call and conference user interfaces. As a result, window sharing may be easily invoked one or more times within the duration of a video call or conference with minimal user effort. Typically this involves default shared windows provided to every participant in the conference. Further, window sharing may also be invoked independent of the presence or absence of a video call or conference.

Figure 27:
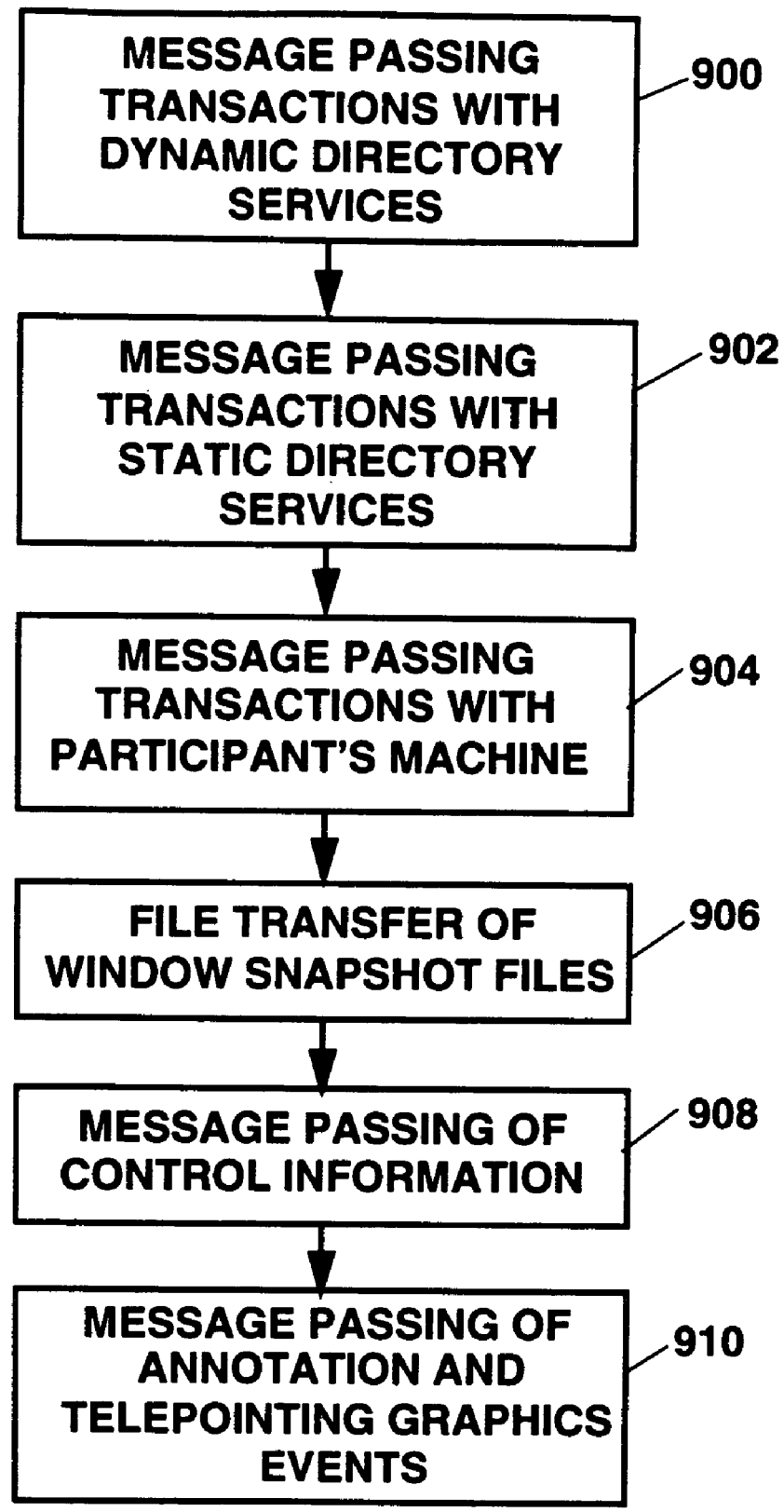
FIG. 27 is a flow chart of a sequence of data communications transactions for invocating a window sharing session or adding a later participant in a conference.

The invocation of a window sharing session or an addition of a later participant is performed by a sequence of data communications transactions, such as that illustrated by the flow chart in FIG. 27. As indicated by block 900, message passing transactions are performed with dynamic directory services to determine whether a requested participant is logged on, whether the participant is accepting shares, and which machine address the participant is using. As indicated by block 902, message passing transactions with static directory services are performed to determine the capabilities of the participant's machine. As indicated by block 904, message passing transactions are performed with each participant's machine for such purposes as notification, accept/refuse, and priority of image formats available.

Upon performing the steps in blocks 900, 902, and 904, any sequence of the following steps may be performed. Block 906 indicates a step of performing a file transfer of window snapshot pix-map files. Block 908 indicates a step of message passing of control information. Block 910 indicates a step of message passing of near-real-time annotation and telepointing graphics events. FIG. 27 shows one example ordering of events; in general the event sequence is determined by specific participant use.

Except for the step in block 906, the required data networking amounts to fast message passing of short bursty messages. Because of the number of activities in steps 900, 902, and 904 and the real-time responses expected in step 908 and 910, it is desirable for the latency for the message passing to be low. Bandwidth requirements, however, are modest. In contrast, step 906 requires low latency as well as high bandwidth because image files are large and in many cases must be transferred losslessly.

It may be advantageous to include separation of the message passing data traffic and image file transfer traffic onto separate data transport infrastructures, each fine-tuned to give optimal performance for the type of traffic being carried. This prevents one share session's image transfer from holding up another session's file transfer in data networking systems where file transfers can crowd out message passing. This architectural approach has applicability among central, regional, and national network offices, and also may be advantageous to extend back to at least some of the user sites with premises networks.

In multi-platform situations, it may also be advantageous to provide shared, network-based image format translation pipeline servers to reduce latency in image transfer modes of window sharing sessions. In practice, considerable latency occurs on user machines in share sessions having image file conversions from one of many native image formats to a selected exchange format. For example, the native images may include a mix of PC Windows, Macintosh, UNIX, and OS/2. This can be particularly problematic when less powerful machines are used. A high-power image file conversion pipeline server may be employed as a shared network resource to perform image file conversions from native formats to a selected exchange format. By providing image conversions, better performance can be delivered to users with older or low-power machines.

Embodiments of the present invention further may include application sharing. As with window sharing, both static and dynamic directory services, and sufficient data networking capacity and performance are required for application sharing. In multi-platform situations, it may also be advantageous to provide shared, network-based high-powered image translation servers to reduce latency in applicable application sharing sessions.

Classes of application sharing, listed in order of increasing complexity, include: (i) broadcast of display common platform; (ii) broadcast of display, multiple platforms; (iii) full application sharing, common platform; and (iv) full application sharing, multiple platforms.

Embodiments of the present invention are particularly well-suited for classes (i) and (ii). In a broadcast of display, one collaboration participant runs an application, but the displayed windows or other machine output is effectively multi-cast to all other participants. None of the other participants, however, can operate the application. In the case of a single common platform, this can be accomplished by multi-casting window events, or a periodic or refresh-event driven window image capture. If multiple platforms are involved, additional steps of window-event translation, image format translation, or other corresponding translation, respectively, are performed. In these cases it may be advantageous to provide a network-based high-power translation server, similar to the image format translator described above.

There are several commercial and robust experimental full application sharing systems which address class (iii). Given adequate interfacing with the directory services and adequate data networking capacity and performance, these may be readily adapted for use in embodiments of the present invention.

It may be advantageous to provide class (iv) application sharing via a network-based high-power translation pipeline server, similar in concept to the image format translator described above. The reasons for this include: the software need not be provided on a per-workstation basis; the user workstation and/or file server would not be loaded down, which is beneficial for older or lower-power machines; support for the platforms need not be included in future workstations or file servers; and it is immune to volatility in the collection of supported platforms.

Because of the large user base and relatively small number of servers required (compared to one at every workstation, or one or more at every user premise), high-performance support of more platforms can be easily cost justified. Further, because of the public network aspects of embodiments of the present invention, there is considerable motivation for platform providers to coordinate their design changes and other updates with operators of the present invention.

The directory services concerns for application sharing track those for window sharing. Full application sharing in classes (iii) and (iv) may require additional support both within the static directory services and within an adaptation of existing or new application sharing software. The data networking concerns for application sharing match those for window sharing, although events such as window refresh may also create file transfers while display updates may only involve small message-passing transactions.

Another feature which can be included in embodiments of the present invention is multimedia conferencing recording. A server-based implementation for multimedia conference recording in a private-network-based system, as described in U.S. application Ser. No. 08/131,523, may be incorporated into the central, regional, and national offices. As a result, multimedia conference recording is provided as a network-based service.

Additionally, it is advantageous to include a storage/usage monitoring system suitable for driving billing mechanisms, and a permission system for privacy and blocking attempted usage by nonsubscribers, for multimedia conferencing recording. These provisions are readily provided by most multi-user file systems. For example, secure versions of the UNIX file system and can readily be integrated with protocols of the billing systems and services.

Wide-area networking may be employed to view, at one location, a conference which was recorded earlier at a distant location. The recorded conference may be played-back at the network office where it was recorded, and transferred in real-time over a wide-area network link using several approaches. In a first approach, a digital playback stream is transferred directly from a storage medium over wide-area links, and converted to an analog format or another format at a network office local to the user reviewing the recording. In a second approach, a digital playback stream is converted at the network office where it was recorded to a format for wide area transmission. In a third approach, a digital playback stream is converted, at the network office where it was recorded, to an analog format or another format and reconverted to a format for wide area transmission. In a fourth approach, a digital playback stream is transferred from a storage medium over wide area links at a rate faster than required for real-time playback; playback is provided at a network office local to the user reviewing the recording. This process can be strictly sequential (i.e., transfer first, then playback) or pipelined (playback during the transfer phase).

In other implementations, conference recording files may be transferred and played back at a network office local to the user reviewing the conference. This can be realized by performing a file transfer either at a real-time rate, a rate faster than real-time, or a rate slower than real-time. Each of the file-transfer rates have cases where they are advantageous. If periods of low real-time traffic tend to be relatively short, a faster-than-real-time file transfer may be advantageous, particularly if dedicated lines are used. If periods of low real-time traffic tend to be relatively long, a slower-than-real-time file transfer may be advantageous, particularly if dedicated lines are used. If public digital switched services are used for file transfer, the preferred method may be any of the above. For the sake of cost-effectiveness, the preferred method is dictated by usage charges of the public digital switched services. A faster-than-real-time file transfer may be preferred should a conference recording need to be transferred for immediate viewing in a remote location.

In some cases, file transfers may be preempted by real-time traffic until they become sufficiently "stale" that they are handled with the same priority as real-time traffic. A request by the recording creator for immediate delivery or a request by a viewer for immediate delivery can be used to reduce the time interval designated as stale.

Another option is to convert the conference recording file to video mail or multimedia mail, and utilize an established video mail or multimedia mail transport system. Video mail, multimedia mail, and their server-based implementation in a private network-based system is described in U.S. application Ser. No. 08/131,523. By incorporating the servers described therein into the central, regional, and national offices, video mail and multimedia mail can be provided as a network-based service.

Additionally, it is advantageous to include a storage/usage monitoring system suitable for driving billing mechanisms, and a permission system for privacy and blocking attempted usage by nonsubscribers. These provisions are readily provided by most multi-user file systems, for example secure versions of the UNIX file system, and can readily be integrated with the billing systems and services protocols.

Wide-area networking may be employed to view, at one location, video mail and multimedia mail which was created at a distant location. The mail may be played-back at the network office where it was recorded, and transferred in real-time over a wide-area network link using the same approaches as described for remote playback of a multimedia conference. In other implementations, video mail and multimedia mail files may be transferred and played back at a network office local to the user reviewing the mail. This can be realized by performing a file transfer either at a real-time rate, a faster-than-real-time rate, or slower-than-real-time rate. Each of the file-transfer rates have cases where they are advantageous, similar to the cases as discussed for file transfer of multimedia conference recordings.

Synchronization between video and graphics/video for multimedia services may be performed as disclosed in U.S. application Ser. No. 08/131,523. Because of the large scale variability of the data networks involved in the present invention, there may be cases where computer control of real-time events over conventional data LAN and WAN networking does not give acceptable results. In these cases it may be advantageous to provide an additional data channel in the video synchronization intervals of analog video signals delivered to users from the multimedia central offices by UTP. Transceivers on each side introduce and recover the resulting real-time data channel. At a user terminal, the real-time data channel connects with the user workstation by means of a standard serial or parallel port interface connector. Software within the user workstation directs real-time control signals to the serial or parallel port interface connector, and monitors it for received real-time control signals affecting graphics on the screen or other computer-controlled events. Regardless of whether these techniques are used, it may be advantageous within the multimedia central offices, regional hub offices, and national offices to use a segregated data network for carrying real-time messages as discussed for the window sharing functions.

The services described above can be used to facilitate a number of valuable activities and quasi-vertical industries. In some areas, such as the now very popular area of interactive video, the high quality video delivered at low cost over existing loop plant UTP via low investments in easily reused technology could have a significant impact.

In general, it may be advantageous for some services to be provided with servers not located within a multimedia central office. Such servers may be operated as completely separate entities with respect to the multimedia telecommunication system. Thus, embodiments of the present invention may be utilized by a third-party, high-quality network-based multimedia service provider. For such third party cases, it may be advantageous to employ high-quality video codecs and greater transmission bandwidth between the multimedia central office and a services-providing site so as to give the same quality as a service hosted inside the multimedia central office.

There is currently considerable interest in home interactive television. Current proposals focus on expensive installations of fiber and coax facilities to the home. In comparison, embodiments of the present invention provide one-way video/audio delivery to many homes over a conventional telephone UTP loop plant. A low-cost interface box can connect this to a conventional television set, particularly if the set includes conventional baseband video and audio inputs (such as in a VCR). The required hardware associated with a complete deployment of an embodiment of the present invention costs considerably less than emerging ATM switches and other equipment for interactive video.

At the serving multimedia central office or a third-party service provider site connected thereto, digital disk-based broadcast quality video servers, such as scaled-up versions of the Parallax DVSS or systems as described in U.S. application Ser. No. 08/131,523, can be used to store and play video on demand. In the adaptation of such a system, a file management hierarchy can be used to stage segments of files so that large numbers of homes can watch the same material delivered by the network nearly simultaneously, with each free to start, pause, back-up, and skip ahead at their leisure. Switching performed at the multimedia central office connects individual homes requesting video playback from a selection of options to individual playback ports on the large-scale digital video/audio storage server previously described.

Many low-cost alternatives are available for controlling the system. The alternatives include: a touch-tone phone; a dedicated control box connected to the network by either another UTP link, a conventional public analog telephone line (using a modem), or an upstream channel implemented on the UTP; and a computer connected to the network by any of the above means. A standard consumer-electronics, multi-unit remote control could also be used to transmit commands to the dedicated control box.

In addition, the resulting home interactive video arrangement is upgradable to 2-way video/audio (and data) for telecomputing. This creates a cross motivation environment where needs or interest in one service of either interactive television or telecommuting services can reduce the barrier of entry for the other service. Interactive network-based video games provided by embodiments of the present invention are also likely to generate such cross motivation.

Embodiments of the present invention can support a home user workstation including a conventional low-cost PC, a home TV set, and a small low-cost camera/microphone unit such as a conventional camcorder or a unit produced by Avistar. If the user's home is served by a first multimedia central office in communication with a second multimedia central office which serves the user's workplace, successful cold-start telecomputing from the home featuring high-quality video teleconferencing and window sharing can begin immediately with little financial investment and time investment.

Video rendering animation and/or visualization computers may be put on the public multimedia network by connecting a video rendering output to a video networking portion of the system, and connecting a data port on the computer to the data networking portion of the system. Audio from the computer or an associated computer-driven audio synthesizer can be connected to the audio networking portion of the system.

By putting video rendering animation and/or visualization computers on the public multimedia network, animation and visualization servers can be made available for business, education, advertising, research, and game usage. Putting such machines on the network where they can be used by the masses allows important services to be delivered either directly or behind the scenes. Games may be of importance as they offer a highly effective format for educational software.

By supplementing a network-based multimedia database (including video/audio) with authoring and updating systems, possibly electronically linked to third-party video and/or software production houses, multimedia advertising incorporating video, audio, images, and animated graphics (including valuable telepointers and highlighting overlay annotations) can be provided to homes and businesses. By making such services directory-based (as in the telephone Yellow Pages) rather than intrusion-based (as in television and direct mailing), the advertising is less likely to be annoying to some users.

A network-based multimedia database (including video/audio) can be used to provide a video news clipping service and/or a customized electronic newspaper service to homes or businesses. Such a service can be directly offered or supported by TV broadcast networks and other news services. There are many ways that material can be automatically captured from existing news media sources. For example, broadcast or cable television and radio news can be received and stored in network-based multimedia databases. Video news providing conventional close-captioned text streams can be fed into systems which recover the text stream as a stream of ASCII characters synchronized with the video. The ASCII is used for database searches, allowing retrieval of relevant video segments from among hundreds or thousand of hours of stored material. News stories can be automatically delineated by detecting audio events which identify signatures of news story start and end points, and combining this information with the recovered ASCII stream. The use of information filters can further increase the search value.

By combining video teleconferencing, network-based animation and visualization rendering, simple video-overlay capabilities (such as those found in very low cost video boards such as the Video Toaster), and in some cases application sharing, it is possible to create an environment for producing virtual reality games which can include live video inserts of players. Currently, video rendering hardware for this purpose must be located at each home. A network-based game service can transcend this limitation.

It is possible to easily add new services as they become available by adding new service modules and/or expanding existing ones. Preferably, the services architecture employed is structured around the following architectural principals: (i) generalized, reusable functions with generalized reusable interfaces; (ii) creation of services by linking and/or sequential execution of these functions via software descriptions; and (iii) allowance for functions to be geographically dispersed yet still cooperate to provide executable services. Multimedia network connections fit case (i), while call forwarding and distributed conference bridging fit cases (ii) and (iii).

It is most preferred to utilize these principals so that: multimedia conferencing, multimedia mail, multimedia conference recording, and multimedia databases can all exchange information in a natural way; and other services, such as network-based interactive multimedia advertising or network-based interactive virtual reality games can interact with, or be built from, these services and other services. An approach to this is described in U.S. application Ser. No. 08/131,523 and in Ludwig, "A Threaded-Flow Approach to Reconfigurable Distributed Systems and Service Primitives Architectures," ACM SIGCOM, 1987. The methods described therein are also applicable to reconfigurable supercomputer architectures. Hence, an embodiment of the present invention may advantageously comprise of servers implemented as software executing on reconfigurable supercomputers.

The resulting service primitives approach has many advantages. The approach allows rapid deployment of new services around volatile information services markets. Also, the approach allows high reuse of components across multiple services. By sharing resources across services, a smaller number of different types of equipment need be maintained in the network, cutting costs in training, spares inventory, parts inventory, manufacturer service contracts, and upgrades. Also, failure recovery is more flexible and easier to automate. Further, statistical pooling advantages analogous to the types of savings realized in the conference bridge server may be realized.

Using a service primitives implementation of the above-described services, third-party network-based games may be provided using only a few low-cost PCs. The PCs may be fitted with a networking card for connection to the data portion, and possibly the video portion, of the network via UTP (LAN based WAN connection or via modem). This provides a low-cost approach for a third-party to offer games by simply executing simple network-controlling scripts. The network-controlling scripts may be used to interconnect animation rendering services, teleconferencing services, multimedia mail services, video news clipping services, movie segments available via interactive television, and advertising services into a virtual pop-culture current-events reliving game featuring the live participation of the players friends and interesting strangers that match the player's interest profile.

The above-described embodiments of the present invention have many advantages. By utilizing existing infrastructure in the public telephone system, embodiments of the present invention provide an immediate, low-cost approach to deploying advanced multimedia telecommunications services using current technology. Further, embodiments of the present invention permit infrastructure investments to retain much of their value for increased services by including evolutionary features therein.

Embodiments of the present invention can help reduce the costs of bandwidth to the user in several ways. Immediately, embodiments of the present invention provide for the utilization of a lower cost NTNI with the UTP loop plant and a low cost premises interface equipment (as compared with more expensive digital carrier TNI cabling and equipment).

Further, UTP access demands may be aggregated for transmission via an economical digital carrier vehicle (e.g., aggregate multiple fractional T-1 demands into T-1 or T-3, aggregate multiple T-1 demands into T-3, etc.). In doing so, user premises UTP NTNIs which are matched to the multimedia needs of the user may be used without concern for amenability to traditional telephony.

Embodiments of the present invention provide a number of means for lowering the cost of network-based versions of multimedia services to levels suitable for use in business. The business and societal value of the lower costs which result can be of significant value. For example, sufficiently lower cost makes multimedia services more attainable, which acts to increase usage and participation. This, in turn, increases its value to business. Further, by making multimedia services more affordable in business, new ways of business can be created. Even as aspects of the invention are superseded by advances in the currently cumbersome and undeveloped methods of the mainstream, embodiments of the present invention can be reused in poorer areas of the world to help develop their economies and spheres of influence.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A system for providing video communication services to one or more premises, at least one premise including a plurality of video communications-services users, the system comprising:
    (a) a first premises network;
    (b) a plurality of user workstations interconnected by the first premises network, each of said plurality of user workstations having one of at least video and audio capture and reproduction capabilities, video sink and display capabilities and both at least video and audio capture and reproduction capabilities and video sink and display capabilities; and
    (c) a multimedia central office being in communication with the first premise network and being adapted for coupling to a public digital network, the multimedia central office, in use, transceiving audio, video and digital data signals for providing at least switching functions originating at or destined for at least one user workstation, to and from the first premises network to provide video communications services,
    the central office further being coupled to at least one other workstation, not associated with the first premises network, and
    the central office being configured to combine captured video images, of at least three users including an image from a workstation in the first premises network and an image from a workstation not in the first premises network, into a mosaic image for reproduction at a workstation of at least one user.

2. The system of claim 1, wherein the mosaic image is a combination of at least one first premises user's image and the image of a user of the other workstation.

3. The system according to claim 1, wherein
    the central office is further coupled to a public digital network, the central office in use providing aggregation of demand for telecommunication services to groups of subscribers at different premises.

4. The system of claim 1 wherein the multimedia central office is operative to provide MM mail capabilities among said video communications services.

5. The system of claim 1 wherein the multimedia central office is operative to accept a plurality of access protocols in said communication with the first premises network.

6. The system of claim 1 wherein the multimedia central office is in communication with the first premises via unshielded twisted pair wiring operative to carry information using the Ethernet protocol.

7. The system of claim 1 wherein the multimedia central office is operative to accept a plurality of user video compression protocols.

8. The system of claim 1, wherein said system comprises a plurality of multimedia central offices, and a first multimedia central office and a second multimedia office are interconnected using the public digital network.

9. The system of claim 8 wherein said mosaic image, comprising a plurality of captured video images, may be realized in one or more of said plurality of multimedia central offices.

10. The system of claim 9 further comprising a resource allocation system, operative to provide automatically a designation of which one or more of said plurality of multimedia central offices realizes the mosaic image.

11. The system of claim 10 where the resource allocation system makes said designation based on optimality conditions.

12. The system of claim 11 wherein the optimality conditions take into account which system resources are currently active and which are currently free.

13. The system of claim 1 wherein the mosaic image is created using pixel domain techniques.

14. The system of claim 1 wherein the mosaic image is created using variable-length code word domain techniques.

15. The system of claim 1 wherein the mosaic image is created using DCT domain techniques.

16. The system of claim 1 wherein the at least one other workstation is connected to the multimedia central office by wireless links.

17. The system of claim 1, further comprising a distributed conference bridge, and wherein the mosaic image is created using said distributed conference bridge.

18. The system of claim 1 wherein the multimedia central office is also operative to provide video close-ups in addition to the mosaic image.

19. The system of claim 1 further comprising a conference bridge server, wherein the mosaic image is created within said conference bridge server with assignable input cells, output cells, and compositing cells.

20. The system of claim 19 further comprising means for combining the input cells and output cells associated with a same user port into a common entity.

21. The system of claim 1 wherein the multimedia central office is operative to provide data sharing services to the plurality of user workstations.

22. The system of claim 1 wherein the multimedia central office is operative to provide application sharing services to the plurality of user workstations.

23. The system of claim 1 wherein the multimedia central office is operative to provide conference recording services to the plurality of user workstations.

24. The system of claim 23 wherein the multimedia central office provides synchronized audio, video, and graphics in captured and stored during conference recording for later playback.

25. The system of claim 1 wherein the multimedia central office is operative to provide a usage monitoring capability.

26. The system of claim 25 wherein the usage monitoring provides information to a billing system.

27. The system of claim 1 wherein the multimedia central office provides directory services to the plurality of user workstations.

28. The system of claim 1 wherein the at least one other workstation is a home interactive TV endpoint.

29. The system of claim 1 wherein the multimedia central office provides video on demand services to a plurality of the workstations with which it communicates.

30. The system of claim 1 wherein the multimedia central office provides data visualization services.

31. The system of claim 1 wherein the multimedia central office provides data sonification services.

32. The system of claim 1 wherein the multimedia central office comprises information filters, said filters being operative to automatically select video clips to create a user-customized "video newspaper."

33. The system of claim 1 wherein the multimedia central office provides video feeds into videogames.

34. The system of claim 1 wherein the multimedia central office comprises shared codec banks.

35. The system of claim 1 wherein the multimedia central office provides at least one video communication service using service primitives.

36. The system of claim 35 wherein the service primitives are designed to support evolvable video communications services.

37. The system of claim 1 wherein the multimedia central office provides interfacing with third-party service providers.

38. The system of claim 1 wherein the multimedia central office provides video communications services to a plurality of premises networks.

39. The system of claim 38 wherein the multimedia central office accepts a plurality of access protocols in connecting with the plurality of premises networks.

* * * * *

(12) EX PARTE REEXAMINATION CERTIFICATE (8337th)
United States Patent
Ludwig

(10) Number: US 6,972,786 C1
(45) Certificate Issued: Jun. 21, 2011

(54) MULTIMEDIA SERVICES USING CENTRAL OFFICE

(75) Inventor: Lester F. Ludwig, Hillsborough, CA (US)

(73) Assignee: Baldwin Enterprises, Inc., Salt Lake City, UT (US)

Reexamination Request:
No. 90/009,079, Mar. 14, 2008

Reexamination Certificate for:
Patent No.: 6,972,786
Issued: Dec. 6, 2005
Appl. No.: 09/471,577
Filed: Dec. 23, 1999

Related U.S. Application Data

(63) Continuation of application No. 08/842,745, filed on Apr. 16, 1997, now Pat. No. 6,081,291, which is a continuation of application No. 08/367,976, filed on Dec. 30, 1994, now Pat. No. 5,751,338.

(51) Int. Cl.
*H04N 7/14* (2006.01)

(52) U.S. Cl. .................... 348/14.11; 348/14.07
(58) Field of Classification Search .................... None
See application file for complete search history.

(56) References Cited

U.S. PATENT DOCUMENTS

| | | |
|---|---|---|
| 3,721,777 A | 3/1973 | Thomas |
| 3,723,653 A | 3/1973 | Tatsuzawa |
| 3,873,771 A | 3/1975 | Kleinerman et al. |
| 3,922,488 A | 11/1975 | Gabr |
| 3,974,337 A | 8/1976 | Tatsuzawa |
| 4,005,265 A | 1/1977 | Verhoeckx et al. |
| 4,054,908 A | 10/1977 | Poirier et al. |
| 4,210,927 A | 7/1980 | Yumde et al. |
| 4,400,724 A | 8/1983 | Fields |
| 4,430,526 A | 2/1984 | Brown et al. |

(Continued)

FOREIGN PATENT DOCUMENTS

| | | |
|---|---|---|
| DE | 35 07 152 | 8/1985 |
| EP | 0 041 902 | 12/1981 |
| EP | 0 190 060 | 8/1986 |
| EP | 0 354 370 | 2/1990 |
| EP | 376588 | 7/1990 |

(Continued)

OTHER PUBLICATIONS

ACM Press, Conference on Organizational Computing Systems, SIGOIS Bulletin, vol. 12, No. 2–3, Nov. 5–8, 1991.

(Continued)

*Primary Examiner*—Mary Steelman

(57) ABSTRACT

A system for providing video communication services to one or more premises with video communications-services users, comprising a first premises network, a plurality of user workstations interconnected by the first premises network, and a multimedia central office being in communication with the first premise network and a public digital network. The multimedia central office, in use, transceives audio, video and digital data signals for providing at least switching functions originating at or destined for at least one user workstation, to and from the first premises network to provide video communications services. The central office further is coupled to at least one other workstation, not associated with the first premises network, and is configured to combine captured video images, of at least three users including an image from a workstation in the first premises network and an image from a workstation not in the first premises network, into a mosaic image for reproduction at a workstation of at least one user.

At the time of issuance and publication of this certificate, the patent remains subject to pending reissue application number 11/786,802 filed Apr. 11, 2007. The claim content of the patent may be subsequently revised if a reissue patent is issued from the reissue application.

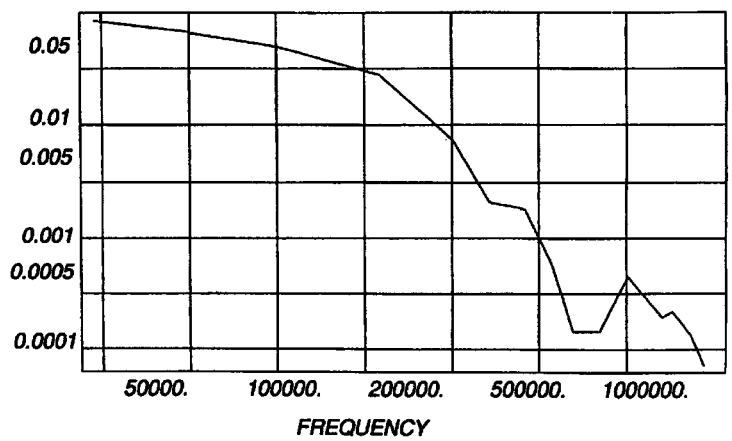

U.S. PATENT DOCUMENTS

| | | |
|---|---|---|
| 4,441,180 A | 4/1984 | Schussler |
| 4,451,705 A | 5/1984 | Burke et al. |
| 4,475,193 A | 10/1984 | Brown |
| 4,476,349 A | 10/1984 | Cottrell et al. |
| 4,479,195 A | 10/1984 | Herr et al. |
| 4,500,960 A | 2/1985 | Babecki et al. |
| 4,516,156 A | 5/1985 | Fabris et al. |
| 4,529,839 A | 7/1985 | Colton et al. |
| 4,529,840 A | 7/1985 | Colton et al. |
| 4,531,024 A | 7/1985 | Colton et al. |
| 4,574,374 A | 3/1986 | Scordo |
| 4,577,065 A | 3/1986 | Frey et al. |
| 4,599,611 A | 7/1986 | Bowker et al. |
| 4,625,081 A | 11/1986 | Lotito et al. |
| 4,645,872 A | 2/1987 | Pressman et al. |
| 4,650,929 A | 3/1987 | Boerger et al. |
| 4,653,090 A | 3/1987 | Hayden |
| 4,672,442 A | 6/1987 | Yamaguchi et al. |
| 4,686,698 A | 8/1987 | Tompkins et al. |
| 4,691,347 A | 9/1987 | Stanley et al. |
| 4,710,917 A | 12/1987 | Tompkins et al. |
| 4,713,806 A | 12/1987 | Oberlander et al. |
| 4,716,585 A | 12/1987 | Tompkins et al. |
| 4,720,850 A | 1/1988 | Oberlander et al. |
| 4,739,509 A | 4/1988 | Bourg |
| 4,741,025 A | 4/1988 | Maruyama et al. |
| 4,786,741 A | 11/1988 | Sachs |
| 4,796,293 A | 1/1989 | Blinken et al. |
| 4,800,344 A | 1/1989 | Graham |
| 4,817,018 A | 3/1989 | Cree et al. |
| 4,837,798 A | 6/1989 | Cohen et al. |
| 4,847,829 A | 7/1989 | Tompkins et al. |
| 4,849,811 A | 7/1989 | Kleinerman |
| 4,850,009 A | 7/1989 | Zook et al. |
| 4,885,747 A | 12/1989 | Foglia |
| 4,888,795 A | 12/1989 | Ando et al. |
| 4,890,320 A | 12/1989 | Monslow et al. |
| 4,893,326 A | 1/1990 | Duran et al. |
| 4,914,586 A | 4/1990 | Swinehart et al. |
| 4,922,523 A | 5/1990 | Hashimoto |
| 4,931,872 A | 6/1990 | Stoddard et al. |
| 4,953,159 A | 8/1990 | Hayden et al. |
| 4,961,211 A | 10/1990 | Tsugane et al. |
| 4,965,819 A | 10/1990 | Kannes |
| 4,977,520 A | 12/1990 | McGaughey et al. |
| 4,987,492 A | 1/1991 | Stults et al. |
| 4,995,071 A | 2/1991 | Weber et al. |
| 4,995,078 A | 2/1991 | Monslow et al. |
| 4,998,243 A | 3/1991 | Kao |
| 5,003,532 A | 3/1991 | Ashida et al. |
| 5,010,399 A | 4/1991 | Goodman et al. |
| 5,012,509 A | 4/1991 | Nakamura et al. |
| 5,014,267 A | 5/1991 | Tompkins et al. |
| 5,016,976 A | 5/1991 | Horner et al. |
| 5,027,400 A | 6/1991 | Baji et al. |
| 5,042,062 A | 8/1991 | Lee et al. |
| 5,056,136 A | 10/1991 | Smith |
| 5,061,046 A | 10/1991 | Lee et al. |
| 5,072,442 A | 12/1991 | Todd |
| 5,073,926 A | 12/1991 | Suzuki et al. |
| 5,099,510 A | 3/1992 | Blinken, Jr. et al. |
| 5,109,515 A | 4/1992 | Laggis et al. |
| 5,109,517 A | 4/1992 | Houda et al. |
| 5,121,426 A | 6/1992 | Baumhauer, Jr. et al. |
| 5,127,041 A | 6/1992 | O'Sullivan |
| 5,130,399 A | 7/1992 | Ikeno et al. |
| 5,130,793 A | 7/1992 | Bordry et al. |
| 5,130,801 A | 7/1992 | Yamaguchi |
| 5,133,079 A | 7/1992 | Ballantyne et al. |
| 5,146,325 A | 9/1992 | Ng |
| 5,155,761 A | 10/1992 | Hammond |
| 5,157,491 A | 10/1992 | Kassatly |
| 5,170,427 A | 12/1992 | Guichard et al. |
| 5,190,586 A | 3/1993 | Mizuguchi et al. |
| 5,191,611 A | 3/1993 | Lang |
| 5,195,086 A | 3/1993 | Baumgartner et al. |
| 5,195,087 A | 3/1993 | Bennett et al. |
| 5,200,989 A | 4/1993 | Milone |
| 5,202,828 A | 4/1993 | Vertelney et al. |
| 5,202,957 A | 4/1993 | Serrao |
| 5,218,627 A | 6/1993 | Corey et al. |
| 5,224,094 A | 6/1993 | Maher |
| 5,231,492 A | 7/1993 | Dangi et al. |
| 5,239,466 A | 8/1993 | Morgan et al. |
| 5,249,218 A | 9/1993 | Sainton |
| 5,253,362 A | 10/1993 | Nolan et al. |
| 5,260,941 A | 11/1993 | Wilder et al. |
| 5,262,875 A | 11/1993 | Mincer et al. |
| 5,283,637 A | 2/1994 | Goolcharan |
| 5,293,619 A | 3/1994 | Dean |
| 5,303,343 A | 4/1994 | Ohya et al. |
| 5,315,633 A | 5/1994 | Champa |
| 5,319,795 A | 6/1994 | Hamabe et al. |
| 5,323,472 A | 6/1994 | Falk |
| 5,325,423 A | 6/1994 | Lewis |
| 5,333,133 A | 7/1994 | Andrews et al. |
| 5,333,299 A | 7/1994 | Koval et al. |
| 5,335,321 A | 8/1994 | Harney et al. |
| 5,341,374 A | 8/1994 | Lewen et al. |
| 5,345,258 A | 9/1994 | Matsubara et al. |
| 5,351,276 A | 9/1994 | Doll, Jr. et al. |
| 5,353,398 A | 10/1994 | Kitahara et al. |
| 5,363,441 A | 11/1994 | Feiner et al. |
| 5,363,507 A | 11/1994 | Nakayama et al. |
| 5,365,265 A | 11/1994 | Shibata et al. |
| 5,367,629 A | 11/1994 | Chu et al. |
| 5,373,549 A | 12/1994 | Bales et al. |
| 5,374,952 A | 12/1994 | Flohr |
| 5,375,068 A | 12/1994 | Palmer et al. |
| 5,379,374 A | 1/1995 | Ishizaki et al. |
| 5,382,972 A | 1/1995 | Kannes |
| 5,384,598 A | 1/1995 | Rodriguez et al. |
| 5,384,772 A | 1/1995 | Marshall |
| 5,386,581 A | 1/1995 | Suzuki et al. |
| 5,390,316 A | 2/1995 | Cramer et al. |
| 5,392,223 A | 2/1995 | Caci |
| 5,392,277 A | 2/1995 | Bernstein |
| 5,392,346 A | 2/1995 | Hassler et al. |
| 5,404,316 A | 4/1995 | Klingler et al. |
| 5,404,435 A | 4/1995 | Rosenbaum |
| 5,408,526 A | 4/1995 | McFarland et al. |
| 5,408,662 A | 4/1995 | Katsurabayashi |
| 5,410,595 A | 4/1995 | Park et al. |
| 5,416,618 A | 5/1995 | Juday |
| 5,422,883 A | 6/1995 | Hauris et al. |
| 5,432,525 A | 7/1995 | Maruo et al. |
| 5,440,624 A | 8/1995 | Schoof, II |
| 5,444,476 A | 8/1995 | Conway |
| 5,467,288 A | 11/1995 | Fasciano et al. |
| 5,471,318 A | 11/1995 | Ahuja et al. |
| 5,473,679 A | 12/1995 | La Porta et al. |
| 5,475,421 A | 12/1995 | Palmer et al. |
| 5,477,546 A | 12/1995 | Shibata et al. |
| 5,485,504 A | 1/1996 | Ohnsorge |
| 5,491,695 A | 2/1996 | Meagher et al. |
| 5,506,954 A | 4/1996 | Arshi et al. |
| 5,515,491 A | 5/1996 | Bates et al. |
| 5,517,652 A | 5/1996 | Miyamoto et al. |
| 5,526,024 A | 6/1996 | Gaglianello et al. |
| 5,550,966 A | 8/1996 | Drake et al. |
| 5,553,222 A | 9/1996 | Milne et al. |

| | | |
|---|---|---|
| 5,561,736 A | 10/1996 | Moore et al. |
| 5,565,910 A | 10/1996 | Rowse et al. |
| 5,581,702 A | 12/1996 | McArdle et al. |
| 5,590,128 A | 12/1996 | Maloney et al. |
| 5,594,495 A | 1/1997 | Palmer et al. |
| 5,602,580 A | 2/1997 | Tseng |
| 5,608,653 A | 3/1997 | Palmer et al. |
| 5,610,972 A | 3/1997 | Emery et al. |
| 5,623,690 A | 4/1997 | Palmer et al. |
| 5,659,369 A | 8/1997 | Imaiida |
| 5,689,553 A | 11/1997 | Ahuja et al. |
| 5,719,786 A | 2/1998 | Nelson et al. |
| 5,751,336 A | 5/1998 | Aggarwal et al. |
| 5,777,663 A | 7/1998 | Shibata et al. |
| 5,796,727 A | 8/1998 | Harrison et al. |
| 5,815,233 A | 9/1998 | Morokawa et al. |
| 5,864,844 A | 1/1999 | James et al. |
| 5,872,923 A | 2/1999 | Schwartz et al. |
| 5,881,168 A | 3/1999 | Takaoka et al. |
| 6,181,867 B1 | 1/2001 | Kenner et al. |
| 6,336,143 B1 | 1/2002 | Diedrich et al. |
| 6,343,314 B1 | 1/2002 | Ludwig et al. |
| 6,577,324 B1 | 6/2003 | Palmer et al. |
| 7,152,093 B2 | 12/2006 | Ludwig et al. |

FOREIGN PATENT DOCUMENTS

| | | |
|---|---|---|
| EP | 0 403 118 | 12/1990 |
| EP | 410378 | 1/1991 |
| EP | 0 414 222 | 2/1991 |
| EP | 0 436 345 | 7/1991 |
| EP | 0 453 128 | 10/1991 |
| EP | 0 497 022 | 8/1992 |
| EP | 0 516 371 | 12/1992 |
| EP | 0 523 618 | 1/1993 |
| EP | 0 523 626 | 1/1993 |
| EP | 0 535 601 | 4/1993 |
| EP | 0 548 597 | 6/1993 |
| EP | 561133 | 9/1993 |
| EP | 0 561 381 | 9/1993 |
| EP | 574138 | 12/1993 |
| EP | 0 604 053 | 6/1994 |
| JP | 62091045 | 4/1987 |
| JP | 1318136 | 12/1989 |
| JP | 2002441 | 1/1990 |
| JP | 2089482 | 3/1990 |
| JP | 2 285 759 | 11/1990 |
| JP | 5014525 | 1/1993 |
| JP | 6086276 | 3/1994 |
| WO | WO 9100664 | 1/1991 |
| WO | WO 9103116 | 3/1991 |
| WO | WO 9120149 | 12/1991 |
| WO | WO 9212583 | 7/1992 |
| WO | WO 9221211 | 11/1992 |
| WO | WO 9307703 | 4/1993 |
| WO | WO 9424803 | 10/1994 |

OTHER PUBLICATIONS

Addeo, et al., "An Experimental Multi–Media Bridging System", ACM 1988.

Addeo, et al., "Personal Multi–media Multi–point Communications Services for Broadband Networks", IEEE CH2535–3/88/0000–0053 1988.

Ahuja, et al., "Coordination and Control of Multimedia Conferencing," IEEE Communication Magazine, pp. 38–42, May 1992.

Ahuja, et al., "The Rapport Multimedia Conferencing System", Conference on Office Information Systems, Mar. 1988.

Ahuja, et al., A Comparison of Application Sharing Mechanisms in Real–Time Desktop Conferencing Systems, 1990.

Ahuja, et al., Networking Requirements of the Rapport Multimedia Conferencing System, 1988 IEEE.

Andersen, Plato People: Term–talk: PLATO's Instant Messaging, Dec. 19, 2002.

Anderson, D. P. and Homsy, G., "A Continuous Media I/O Server and Its Synchronization Mechanism", Oct. 1991, Computer 24, 10 (Oct. 1991), 51–57.

Banks, Michael A., "America Online: A Graphics–based Success" Link–Up, Jan./Feb. 1992.

Bellcore News, "IMAL Makes Media Merging Magic," 5(20), Nov. 9, 1988.

Belville, Sharon, "Zephyr on Athena," Massachusetts Institute of Technology, ver. 3, Sep. 10, 1991.

Biswas, et al., "Distributed Scheduling of Meetings: A Case Study in Prototyping Distributed Application," System Integration, 1992 2.sup.nd International Conference.

Boll, et al., "Suppression of Acoustic Noise in Speech Using Two Microphone Adaptive Noise Cancellation," IEEE Transactions on Acoustics, Speech, and Signaling Processing, vol. ASSP–28, No. 6, Dec. 1980.

Cheng, et al., "A model for secure distributed computations in a heterogeneous environment," Proc. Of the Aerospace Computer Security Applications Conference, Orlando, Dec. 12–16, 1988, Washington, IEEE Comp., Soc. Press, US, vol. Conf. 4, p. 233–241.

Chu, P.L., Picture Corporation, "Audio Compression and Echo Cancellation for Low Bit Rate Video Teleconferencing", Applications of Signal Process to Audio and Acoustics, Oct. 1991.

Cohen, et al., "Audio Windows for Binaural Telecommunication," EIC, Tokyo (Oct. 1991).

Cohen, et al., "Design and Control of Shared Conferencing Environments for Audio Telecommunication," Proceedings of the Second Int'l Symposium on Measurement and Control Robotics (ISMCR '92), Tsukuba Science City, Japan, (Nov. 15–19, 1992), pp. 405–412.

Ludwig, et al., "Laboratory For Emulation and Study of Integrated and Coordinated Media Communication," Bell Communications Research, 1988.

Ludwig, "Integration of CAD/CAE With Multimedia Teleconferencing and Messaging Via Broadband Networks and Shared Resource Servers", 1990 IEEE.

Ludwig, Lester, "A Threaded/Flow Approach to Reconfigurable Distributed Systems and Service Primitives Architectures," Frontiers in Computer Communications Technology, Sigcom '87 Workshop (Aug. 11–13, 1987).

Maeno, et al., Distributed Desktop Conferencing System (Mermaid) Based on Group Communication Architecture, The Transactions of the Institute of Electronics, Information and Comm. Engineers E74 (1991) Sep., No. 9, Tokyo, JP.

Maeno, K., et al., "Distributed Desktop Conferencing System (MERMAID) Based on Group Communication Architecture," IEEE, ICC '91 CH2984–3/91/0000–0520, pp. 0520–0525.

Marshak, Ronni T. "Beyond Mail for Windows—epitomizing the mail–enabled application", Patricia Seybold's Office Computing Report, Sep. 1992 v15 n9. (full text copy from Computer Select 1992 CD).

Martens, et al., "Principal Components Analysis and Resynthesis of Spectral Cues to Perceived Direction," Proc. Of the 1987 Int'l Computer Music Conference, Illinois.

Masaki, et al., "A Desktop Teleconferencing Terminal Based on B–ISDN: PMTC," NTT Review, 4 (4) :81–85, 1992.

Masaki, S., et al. "Multimedia Handling Scheme in a Groupware System for B–ISDN," Globecom '92 pp. 747–750, Dec. 1992.

Naganawa, et al., "A Study of Audio Communication Devices for ISDN," IEEE Transactions of Consumer Electronics, IEEE Inc. New York, vol. 36, No. 3, Aug. 1, 1990, p. 753–757.

Nakamura, et al., "Personal Multimedia Teleconferencing Terminal," IEEE, 1990.

Newman–Wolfe, et al., "A Brief Overview of the DCS Distributed Conferencing System", USENIX Summer 1991 Technical Conference Proceedings.

Nunokawa, et al., "Teleconferencing Using Stereo Voice and Electronic OHP", IEEE 1988.

Ohkubo, M., et al., "Design and implementation of a shared workspace by integrating individual workspaces," Conferencing on Supporting Group Work Proceedings of the conference on Office information systems, pp. 142–146, 1990.

Ohmori, et al., "Distributed Cooperative Control for Sharing Applications Based on Multiparty and Multimedia Desktop Conferencing System", IEEE 1992.

P. V. Rangan and H. M. Vin, "Designing file systems for digital video and audio", 1991, in: Proc. of the Thirteenth ACM Symposium on Operating System Principles, pp. 81–94.

P. V. Rangan, et al., "Designing an On–Demand Multimedia Service", Jul. 1992, IEEE Communications Magzine, vol. 30, No. 7, pp. 56–65.

Pagani, et al., "Bringing Media Spaces into the Real World", Proceedings of the 3rd European Conference on Computer–Supported Cooperative Work 1993.

Pascoe, R.A., "Interactive Computer Conference Server" IBM Technical Disclosure Bulletin, vol. 34, No. 7A, Dec. 1991.

Pate "Trends in Multimedia Applications and The Network Models to Support Them", Globecom's 90:, 1990.

Perkins, "Spider: An investigation in collaborative technologies and their effects on network performance" 1991.

Poggio, et al., "CCWS: A Computer–Based, Multimedia Information System Computer"—Oct. 1985.

Rangan, et al. "Media synchronization in distributed multimedia file systems," Multimedia Communications, 1992 pp. 315–328.

Rangan, et al., "A Window–Based Editor for Digital Video and Audio," System Sciences, 1992 Hawaii Int'l Conference (1992).

Rangan, et al., "Software Architecture for Integration of Video Services in the, etherphone System," IEEE Journal on Selected Areas in Communications, vol. 9, No. 9, Dec. 1991, pp. 1395–1404.

Reinhart, Andy, "Video Conquers the Desktop," Byte, Sep. 1993, p. 64–80.

Rowe, L. and Smith, B., "A Continuous Media Player", Nov. 1992, In Proc. 3rd Int. Workshop on Network and Operating System Support for Digital Audio and Video, pp. 376–386.

Sakata, "B–ISDN Multimedia Workstation Architecture", IEEE 1993.

Sakata, et al., "Development and Evaluation of an In–House Multimedia Desktop Conference System," NEC Research & Development No. 98, pp. 107–117, Jul. 1990.

Sammartino, et al., "Desktop Multimedia Communications—Breaking the Chains," IEEE, 1991.

Saunders, S., "Economical Video Network Uses Unshielded Twisted–Pair Wiring," Data Communications, McGraw Hill., New York, vol. 19, No. 10, p. 103–104, Aug. 1, 1990.

Schooler, Eve M., "A Distributed Architecture for Multimedia Conference Control," ISI/RR–91–289, USC/Information Sciences Institute, Nov. 1991.

Schooler, Eve M., Steven L. Casner, "A Packet–switched Multimedia Conferencing System," ACM SIGOIS Bulletin, vol. 1, No. 1, pp. 12–22, Jan. 1989.

Shepherd, et al., "Strudel–An Extensible Electronic Conversation Toolkit", Proceedings of the Conference on Computer–Supported Cooperative Work, Oct. 1990.

Soares, et al., "LAN Based Real Time Audio–Graphics Conferencing System", IEEE Infocom 1989 Proceedings, vol. II.

Stefik, et al. "Beyond the Chalkboard: Computer Support for Collaboration and Problem Solving," Communications of the ACM, vol. 30, No. 1, Jan. 1987.

Stevens, A. I., "The LOTUS Open Message Interface," Dr. Dobbs Journal, Mar. 1992.

Swinehart, Daniel C. "Systems Support Requirements for Multi–Media Workstations," Xerox PARC, CSL–89–2, 1989.

Swinehart, Daniel C. "Telephone Management in the Etherphone System," Xerox PARC, CSL–89–2, May 1989, pp. 1–5.

Tanigawa, H., et al. "Personal Multimedia–Multipoint Teleconference System," Proc. IEEE INFOCOM '91, pp. 1127–1134, 1991.

Terry and Swinehart, "Managing Stored Voice in the Etherphone System," Xerox PARC, CSL–89–2, 1989.

The Challenges of Networking Video Applications, Starlight Networks, Inc., Feb. 1992.

Velthuijsen, Hugo, "Distributed Artificial Intelligence for Runtime Feature–Interaction Resolution," Computer, vol. 26, No. 8, Aug. 1993, p. 48–55.

Vin, et al. "Multimedia Conferencing in the Etherphone Environment", Computer Magazine V.24 Iss. 10 pp. 69–79, Oct. 1991.

Vin, et al. Heirarchical Conferencing Architecture for Inter–Group Multimedia Collaboration, Multimedia Laboratory Department of Computer Science and Engineering University of California at San Diego, La Jolla, 1991.

Watabe, et al., "A Distributed Multiparty Desktop Conferencing System and Its Architecture", IEEE 1990.

Watabe, et al., "Distributed Desktop Conferencing System with Multiuser Multimedia Interface", IEEE Journal on Selected Areas in Communications, vol. 9, No. 4, May 1991, pp. 531–539.

Watabe, K., et al., "Distributed Multiparty Desktop Conferencing System: MERMAID," CSCW 90 Proceedings, pp. 27–38, Oct. 1990.

Weiss, C., "Desk Top Video Conferencing—An Important Feature of Future Visual Communications," ICC 90, pp. 134–139, 1990 Munich—West Germany.

Whitmyer, Claude, "Groupware: The Software for Collaborative Computing," The Office, Jun. 1989, p. 28.

Zellweger, "Active Paths through Multimedia Documents," Xerox PARC, CSL–89–2, 1989.

Zellweger, et al., "An Overview of the Etherphone System and Its Applications", 1988, In Proceedings of the 2nd IEEE Conference on Computer Workstations, p. 160–168.

Zimmerman, The Finger User Information Protocol, RFC 1288, Dec. 1991.

Ahuja, S.R., Ensor, J. Robert, and Horn, David N., The Rapport Multimedia Conferencing System, ACM Proceedings Conference on Office Information Systems, pp. 1–8 (1988).

Ahuja, S.R., Ensor, J.R., and Luco, S.E., A Comparison of Application Sharing Mechanisms in Real–Time Desktop Conferencing Systems, Communications of the ACM, pp. 238–248 (1990).

Ensor, J.R., Ahuja, S.R., Connaghan, R.B., Pack, M., and Seligmann, D.D., The Rapport Multimedia Conferencing System (Demonstration), CHI '92, May 3–7, pp. 581–582 (1992).

Ahuja, S.R. and Ensor, J.R., Coordination and Control of Multimedia Conferencing, IEEE Communications Magazine, pp. 38–43 (May 1992).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-38 and 39 are cancelled.

* * * * *